United States Patent
Ta et al.

(10) Patent No.: US 12,452,829 B2
(45) Date of Patent: *Oct. 21, 2025

(54) WIRELESS SIGNALS FOR LOCATION DETERMINATION

(71) Applicant: Juniper Networks, Inc., Sunnyvale, CA (US)

(72) Inventors: Cuong Ta, Santa Clara, CA (US); Randall Frei, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 18/067,223

(22) Filed: Dec. 16, 2022

(65) Prior Publication Data

US 2023/0119490 A1    Apr. 20, 2023

Related U.S. Application Data

(63) Continuation of application No. 17/196,402, filed on Mar. 9, 2021, now Pat. No. 11,576,144, which is a (Continued)

(51) Int. Cl.
*H04W 64/00* (2009.01)
*H04W 4/029* (2018.01)
(Continued)

(52) U.S. Cl.
CPC ......... *H04W 64/006* (2013.01); *H04W 4/029* (2018.02); *H04W 24/10* (2013.01); *H04B 17/318* (2015.01)

(58) Field of Classification Search
CPC ... H04W 64/006; H04W 4/029; H04W 24/10; H04W 4/33; H04W 4/023; H04B 17/318; G01S 5/0294; G01S 5/14; G01S 5/013
See application file for complete search history.

(56) References Cited

U.S. PATENT DOCUMENTS 7,305,245 B2    12/2007  Alizadeh-Shabdiz et al.
9,253,596 B2    2/2016   Sridhara et al.
(Continued)

FOREIGN PATENT DOCUMENTS

CN    101364915 A    2/2009
CN    101365246 A    2/2009
(Continued)

OTHER PUBLICATIONS

Response to Communication pursuant to Article 94(3) EPC dated Oct. 31, 2022, from counterpart European Application No. 19219641.8 filed Feb. 27, 2023, 6 pp.
(Continued)

*Primary Examiner* — Ankur Jain
(74) *Attorney, Agent, or Firm* — Shumaker & Sieffert, P.A.

(57) ABSTRACT

Methods and apparatus relating to the detection of one or more devices in zones, e.g., non-overlapping areas, are described. Individual device locations are made based on RSSI information. Whether a user is determined to be in a zone or not is determined based on location determinations corresponding to the device. Thresholds used to determine whether a device is to be considered as being within a zone differs depending on whether the device is newly detected in the zone or is already determined to be in the zone. In some embodiments it is easier to be determined to be in a zone than to be determined to have left a zone. A device may be determined to be in two non-overlapping zones at the same time thereby increasing the chance that devices in edge areas will be counted with regard to the number of devices for which resources should be provided.

20 Claims, 42 Drawing Sheets

Related U.S. Application Data continuation of application No. 16/676,812, filed on Nov. 7, 2019, now Pat. No. 10,986,607.

(60) Provisional application No. 62/827,959, filed on Apr. 2, 2019.

(51) Int. Cl.
*H04W 24/10* (2009.01)
*H04B 17/318* (2015.01)

(56) References Cited

U.S. PATENT DOCUMENTS

| | | | |
|---|---|---|---|
| 9,310,465 | B2 | 4/2016 | Yang et al. |
| 10,986,607 | B2 | 4/2021 | Ta et al. |
| 11,576,144 | B2 | 2/2023 | Ta et al. |
| 2005/0136845 | A1 | 6/2005 | Masuoka et al. |
| 2008/0225810 | A1 | 9/2008 | Buchwald et al. |
| 2009/0280827 | A1 | 11/2009 | Michaud |
| 2011/0103360 | A1 | 5/2011 | Ku et al. |
| 2014/0045519 | A1* | 2/2014 | Imafuku ............... G01S 19/52 455/456.1 |
| 2014/0243013 | A1 | 8/2014 | Liu et al. |
| 2016/0323717 | A1 | 11/2016 | Friday et al. |
| 2017/0364901 | A1 | 12/2017 | Chandrasekaran et al. |
| 2018/0146343 | A1* | 5/2018 | Lee ........................ A63F 13/35 |
| 2018/0234937 | A1 | 8/2018 | Yoon et al. |
| 2020/0322916 | A1 | 10/2020 | Ta et al. |

FOREIGN PATENT DOCUMENTS

| | | |
|---|---|---|
| CN | 101438270 A | 5/2009 |
| CN | 104813189 A | 7/2015 |
| CN | 105612430 A | 5/2016 |
| CN | 107923970 A | 4/2018 |
| CN | 111796237 A | 10/2020 |
| EP | 1986457 A1 | 10/2008 |
| JP | 2020169973 A | 10/2020 |
| KR | 20050005690 A | 1/2005 |
| WO | 2010120264 A1 | 10/2010 |

OTHER PUBLICATIONS

Cai et al., "On Location Algorithm of Cluster Filtering Based on WiFi Signal Features", vol. 30, No. 5, China Academic Journal Electronic Publishing House, Oct. 31, 2018, 5 pp., Translation provided for only the Abstract.

Feng et al., "Research on passive and device-free sensing of wireless sensor networks based on RSSI", Journal of Guangxi University, vol. 43, No. 2, China Academic Journal Electronic Publishing House, Apr. 30, 2018, 8 pp., Translation provided for only the Abstract.

Second Office Action and Search Report, and translation thereof, from counterpart Chinese Application No. 201911410135.4 dated Jun. 7, 2024, 8 pp.

Yang et al., "Indoor localization algorithm based on threshold classification and signal strength weighting", Journal of Computer Applications, China Academic Journal Electronic Publishing House, Oct. 31, 2013, 4 pp., Translation provided for only the Abstract.

"Australian Application Serial No. 2019284151, First Examination Report mailed Aug. 27, 2020", 5 pgs.

"European Application Serial No. 19219641.8, Extended European Search Report mailed May 13, 2020", 7 pgs.

Communication pursuant to Article 94(3) EPC from counterpart European Application No. 19219641.8 dated Oct. 31, 2022, 4 pp.

Office Action from counterpart Canadian Application No. 3,065,997 dated Apr. 29, 2021, 4 pp.

Prosecution History from U.S. Appl. No. 16/676,812, now U.S. Pat. No. 10,986,607, dated Jun. 1, 2020, through Apr. 7, 2021, 63 pp.

Prosecution History from U.S. Appl. No. 17/196,402, now U.S. Pat. No. 11,576,144, dated May 18, 2022 through Jan. 5, 2023, 45 pp.

Response to Extended Search Report dated May 13, 2020, from counterpart European Application No. 19219641.8, filed Apr. 7, 2021, 16 pp.

First Office Action and Search Report, and translation thereof, from counterpart Chinese Application No. 201911410135.4 dated Jan. 18, 2024, 14 pp.

\* cited by examiner

| ACTUAL DEVICE 1 LOCATION (IDENTIFIED BY ELEMENT REF NUMBER) 602 | DETERMINED DEVICE 1 LOCATION (IDENTIFIED BY ELEMENT REF NUMBER) 604 | ZONE IN WHICH DETERMINED DEVICE 1 LOCATION IS LOCATED 606 | NUMBER OF DETERMINED LOCATIONS IN ZONE 2 (WITHIN WINDOW OF SIZE 10) 608 | DETERMINED THRESHOLD NUMBER FOR ZONE 2 610 | ZONE 2 DEVICE 1 PRESENCE DETERMINATION 612 | NUMBER OF DETERMINED LOCATIONS IN ZONE 4 (WITHIN WINDOW OF SIZE 10) 614 | DETERMINED THRESHOLD NUMBER FOR ZONE 4 616 | ZONE 4 DEVICE 1 PRESENCE DETERMINATION 618 |
|---|---|---|---|---|---|---|---|---|
| 504 | 505 | 2 | | | | | | |
| 506 | 507 | 2 | | | | | | |
| 508 | 509 | 2 | | | | | | |
| 510 | 511 | 2 | | | | | | |
| 512 | 513 | 2 | | | | | | |
| 514 | 515 | 2 | | | | | | |
| 516 | 517 | 2 | | | | | | |
| 518 | 519 | 2 | | | | | | |
| 520 | 521 | 2 | | 7 | NOT PRESENT | | | |
| 522 | 523 | 2 | 10 | 2 | PRESENT | 0 | 7 | NOT PRESENT |
| 524 | 525 | 2 | 10 | 2 | PRESENT | 0 | 7 | NOT PRESENT |
| 526 | 527 | 4 | 9 | 2 | PRESENT | 1 | 7 | NOT PRESENT |
| 528 | 529 | 2 | 9 | 2 | PRESENT | 1 | 7 | NOT PRESENT |
| 530 | 531 | 4 | 8 | 2 | PRESENT | 2 | 7 | NOT PRESENT |
| 532 | 533 | 2 | 8 | 2 | PRESENT | 2 | 7 | NOT PRESENT |
| 534 | 535 | 2 | 8 | 2 | PRESENT | 2 | 7 | NOT PRESENT |
| 536 | 537 | 2 | 8 | 2 | PRESENT | 2 | 7 | NOT PRESENT |
| 538 | 539 | 2 | 8 | 2 | PRESENT | 2 | 7 | NOT PRESENT |
| 540 | 541 | 2 | 8 | 2 | PRESENT | 2 | 7 | NOT PRESENT |
| 542 | 543 | 2 | 8 | 2 | PRESENT | 2 | 7 | NOT PRESENT |
| 544 | 545 | 2 | 8 | 2 | PRESENT | 2 | 7 | NOT PRESENT |

FIGURE 6

| ACTUAL DEVICE 1 LOCATION (IDENTIFIED BY ELEMENT REF NUMBER) 802 | DETERMINED DEVICE 1 LOCATION (IDENTIFIED BY ELEMENT REF NUMBER) 804 | ZONE IN WHICH DETERMINED DEVICE 1 LOCATION IS LOCATED 806 | NUMBER OF DETERMINED LOCATIONS IN ZONE 2 (WITHIN WINDOW OF SIZE 10) 808 | DETERMINED THRESHOLD NUMBER FOR ZONE 2 810 | ZONE 2 DEVICE 1 PRESENCE DETERMINATION 812 | NUMBER OF DETERMINED LOCATIONS IN ZONE 1 (WITHIN WINDOW OF SIZE 10) 814 | DETERMINED THRESHOLD NUMBER FOR ZONE 1 816 | ZONE 1 DEVICE 1 PRESENCE DETERMINATION 818 |
|---|---|---|---|---|---|---|---|---|
| 526 | 527 | 4 | 9 | 2 | PRESENT | 0 | 7 | NOT PRESENT |
| 528 | 529 | 2 | 9 | 2 | PRESENT | 0 | 7 | NOT PRESENT |
| 530 | 531 | 4 | 8 | 2 | PRESENT | 0 | 7 | NOT PRESENT |
| 532 | 533 | 2 | 8 | 2 | PRESENT | 0 | 7 | NOT PRESENT |
| 534 | 535 | 2 | 8 | 2 | PRESENT | 0 | 7 | NOT PRESENT |
| 536 | 537 | 2 | 8 | 2 | PRESENT | 0 | 7 | NOT PRESENT |
| 538 | 539 | 2 | 8 | 2 | PRESENT | 0 | 7 | NOT PRESENT |
| 540 | 541 | 2 | 8 | 2 | PRESENT | 0 | 7 | NOT PRESENT |
| 542 | 543 | 2 | 8 | 2 | PRESENT | 0 | 7 | NOT PRESENT |
| 544 | 545 | 2 | 9 | 2 | PRESENT | 0 | 7 | NOT PRESENT |
| 704 | 705 | 2 | 10 | 2 | PRESENT | 0 | 7 | NOT PRESENT |
| 706 | 707 | 2 | 10 | 2 | PRESENT | 0 | 7 | NOT PRESENT |
| 708 | 709 | 2 | 10 | 2 | PRESENT | 0 | 7 | NOT PRESENT |
| 710 | 711 | 2 | 9 | 2 | PRESENT | 1 | 7 | NOT PRESENT |
| 712 | 713 | 1 | 8 | 2 | PRESENT | 2 | 3 | NOT PRESENT |
| 714 | 715 | 1 | 7 | 2 | PRESENT | 3 | 3 | NOT PRESENT |
| 716 | 717 | 1 | 7 | 2 | PRESENT | 3 | 3 | NOT PRESENT |
| 718 | 719 | 1 | 6 | 2 | PRESENT | 4 | 3 | PRESENT |
| 720 | 721 | 1 | 5 | 2 | PRESENT | 5 | 2 | PRESENT |
| 722 | 723 | 1 | 4 | 2 | PRESENT | 6 | 2 | PRESENT |
| 724 | 725 | 1 | 3 | 2 | PRESENT | 7 | 2 | PRESENT |
| 726 | 727 | 1 | 2 | 2 | NOT PRESENT | 8 | 2 | PRESENT |
| 728 | 729 | 1 | 1 | 2 | NOT PRESENT | 9 | 2 | PRESENT |
| 730 | 731 | 1 | 0 | 2 | NOT PRESENT | 10 | 2 | PRESENT |

FIGURE 8

WIRELESS SIGNALS FOR LOCATION DETERMINATION

CROSS REFERENCE TO RELATED APPLICATIONS

This application is a continuation of U.S. patent application Ser. No. 17/196,402, filed 9 Mar. 2021, which is a continuation of U.S. patent application Ser. No. 16/676,812, filed 7 Nov. 2019, which claims the benefit of U.S. Provisional Patent Application No. 62/827,959, filed 2 Apr. 2019, the entire content of each application is incorporated herein by reference.

FIELD

The present application relates to use of wireless signals and, more particularly, to methods and/or apparatus for utilizing wireless signals in location determination operations and/or various control operations.

BACKGROUND

Wireless signals are often transmitted between a user device, such as a mobile cell phone, personal data assistant, laptop computer or other device, and a base station which is sometimes also referred to as an access point. User devices are sometimes referred to as User Equipment (UEs). Base stations are also referred to commonly as access points (APs) since they normally provide network connectivity for one or more mobile devices. Base stations may take a wide variety of forms and may be, e.g., WiFi base stations, macro base stations such as those of an LTE network, Bluetooth Low Energy (BLE) base stations or base stations of any of a variety of other communications devices.

A UE can measure the strength of signals received from one or more APs and either report the signal strength, in the form of a received signal strength indicator (RSSI) strength to an AP or another device such as a location determination device. Similarly an AP can measure the received signal strength of a signal from a UE and report information on the signal strength to another device such as the location determination device.

Location determination devices can determine the location of a UE based on the received signal strength indicator (RSSI) information relating to the UE and the locations of the APs which transmitted the signals to the UE or which reported the receipt of signals and RSSI information from a UE. While a location determination may be made, it may be subject to reliability issues and in thus some cases may be viewed as an estimate of a location.

BRIEF DESCRIPTION OF THE FIGURES

FIG. 2, comprises the combination of FIG. 2A, FIG. 2B and FIG. 2C.

FIG. 3, comprises the combination of FIG. 3A, FIG. 3B and FIG. 3C.

FIG. 6 is a drawing of a table used to illustrate exemplary zone presence threshold number determinations and exemplary zone presence determinations, corresponding the example of FIG. 5, in accordance with an exemplary embodiment.

FIG. 8 is a drawing of a table used to illustrate exemplary zone presence threshold number determinations and exemplary zone presence determinations, corresponding the example of FIG. 7, in accordance with an exemplary embodiment.

FIG. 10 comprises the combination of FIG. 10A, FIG. 10B, FIG. 10C, FIG. 10D and FIG. 10E.

FIG. 16 comprises the combination of FIG. 16A, FIG. 16B, FIG. 16C, FIG. 16D and FIG. 16E.

DETAILED DESCRIPTION

Figure 1:
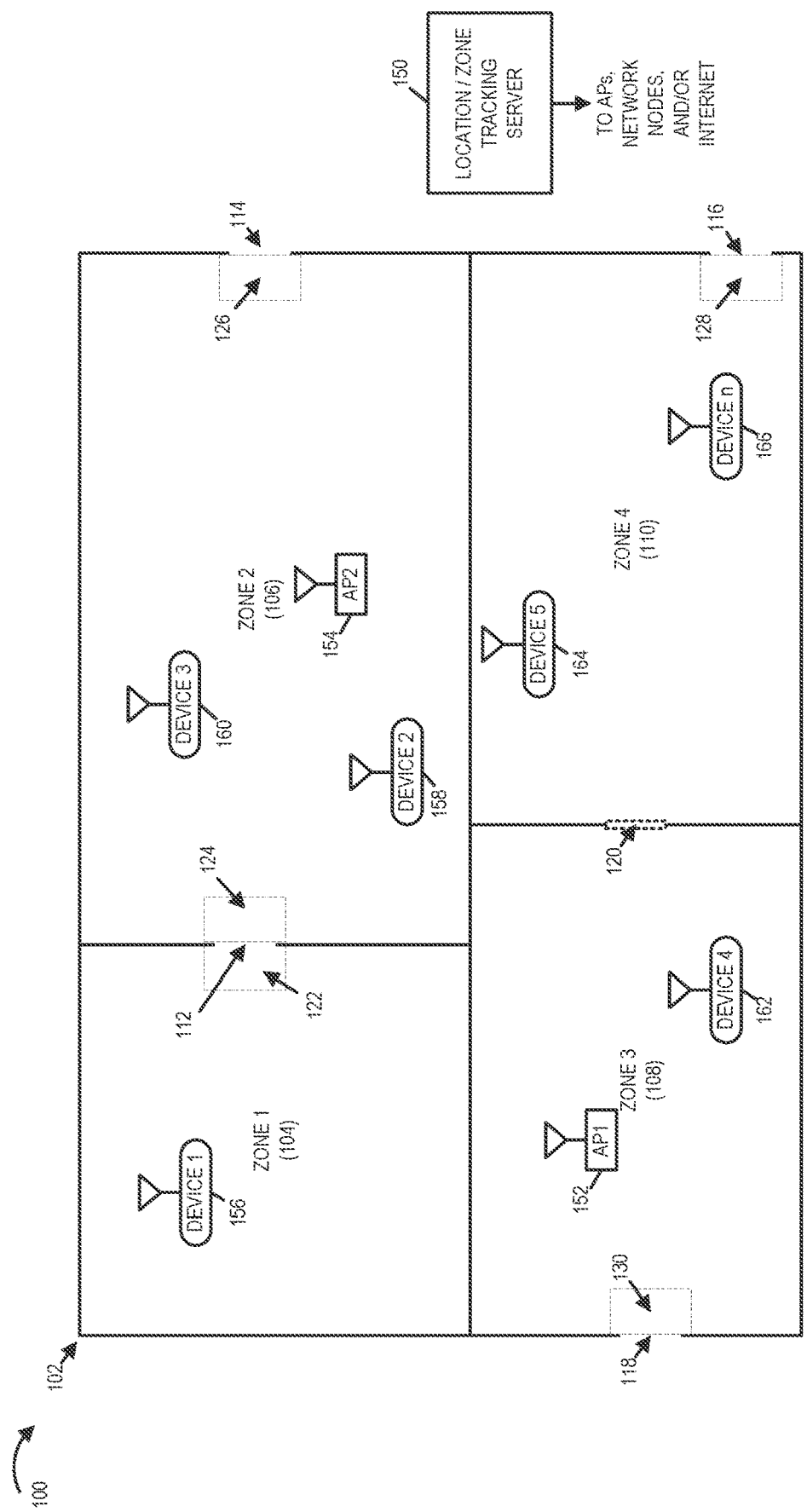
FIG. 1 is a drawing of an exemplary communications system in accordance with an exemplary embodiment.

Location determinations for a UE can be made relatively frequently for a UE, e.g. at intervals of less than a second to many seconds, based on RSSI information corresponding to the UE. Unfortunately, RSSI values can change relatively frequently for reasons other than changes in UE location. For example, signal interference, UE device orientation relative to an AP and/or other factors may cause fluctuations or changes in reported RSSI information even though the location of a UE does not change. The changes in determined location for a UE in a short period of time which may be due in many cases to factors other than motion of the UE, results in what is sometimes referred to as jitter in the determined UE location. As a result of such jitter a UE may appear to be at different locations at different, e.g., closely spaced, times even though the device may not have moved.

In some cases, the reliability of a location determination can be increased if knowledge of the physical structure of the location, e.g., location of doors between rooms, is taken into consideration. Unfortunately, in many cases information about doorway location is not available to a device trying to determine the location of a UE from signal strength information which may include received signal power level or other information indicating a received signal strength.

For purposes of providing services and/or control operations it is often desirable to know with respect to an area, e.g., zone, if a UE device is present in the zone and/or the number of devices in the zone. Unfortunately the uncertainty associated with an individual signal based location determination for an individual UE and/or the lack of knowledge about the physical layout, e.g., doorway locations, often makes it difficult in many cases for radio signal based location determinations to be reliably determine at a given time if an individual UE is in a particular zone and/or the total number of devices in a zone.

In view of the above it would be desirable if methods and/or apparatus could be developed which can determine whether a wireless device, e.g., UE, is in a particular zone, the position of the device within the zone and/or the total number of devices in a zone at a given time despite the location of radio signals that may occur as part of normal changes in signal strength that may introduce jitter into a location determination process. Similarly, it may be desirable to be able to determine, with a predetermined level of certainty, when a device such as UE, has left a specific zone.

While not necessary for all embodiments, it would be desirable if in at least some embodiments the locations of doorways could be determined and used to increase the reliability of location determinations and/or device counts with respect to devices in one or more zones.

Methods and apparatus relating to the detection of one or more devices in one or more zones, e.g., non-overlapping areas, are described. The zones may be geographic regions. The regions may, and sometimes are, regions within a building, e.g., regions on an individual floor of a building. However, zones need not be limited to indoor zones and can include outside areas. In some embodiments a user can define zones of interest of a user specified size or the zones may be of a default size, e.g., determined by regions of a map grid, depending on the particular embodiment and/or application.

In various embodiments determinations of individual device locations are made on an ongoing basis, e.g., every second or at some other time interval which may or may not be a periodic time interval. Individual device location determinations are made based on RSSI information corresponding to the device in some embodiments.

Device location information is tracked, e.g., stored. Presence within a zone is determined based on the device location information and in some embodiments information on the devices in a zone and the total number of devices in a zone is stored and updated as new location determinations are made.

In some embodiments whether or not a device is considered to be within a zone at a given time is based on one or more device location determinations. Being based on RSSI information the location determinations with regard to an individual device may be subject to jitter with the location of the device changing, e.g., switching over time between one location and another location, in the absence of device movement. In some specific cases when the size of the location jitter is greater than the physical size of the given zone, determining whether a user has left that specific zone can be challenging.

Whether a user is determined to be in a zone or not is determined based on one or more location determinations corresponding to the device. The total number of users that are determined to be in a zone at a given time is summed and used in some embodiments as a determined number of devices in the zone.

In some, but not necessarily all embodiments, the determination of whether a device is to be considered as being within a zone differs depending on whether the device is newly detected in the zone or has been previously detected in the zone. In some embodiments devices which are newly detected to be in a zone are considered to be present in the zone, e.g., in response to determining that the device is at a location in the zone a first number of times within a first-time window. Once having been determined to be in a first zone, in some embodiments the device will continue to be considered to be within the first zone until the location of the device is determined to be in another different zone a second number of times within a second time window. The second time window can be the same or different from the first-time window.

While the first and second number of times used to determine whether a device is initially in a zone or is to be considered as having left a zone, respectively, can be the same in some embodiments the number of times a device must be detected outside the first zone, i.e., in another zone, before the device is removed, e.g., considered to have left the first zone, is different from the number of times device needs to be detected as having been in the first zone to be determined as being in the first zone.

In some instances, the first and second numbers and/or corresponding first and second time windows are intentionally selected to be different with the second number being larger than the first number in at least some cases where the first and second time windows are the same size. Thus in at least some embodiments it is easier for a device to be initially determined to be within a zone than it is for the device to be determined to have left a zone and no longer present in the zone.

In accordance with yet another embodiment, a device, e.g., a UE, is considered as being in a zone if the location engine determines that the device was present in the zone a predetermined number of times either within a specific time window, or a predetermined number of consecutive times. In some but not necessarily all embodiments, to ensure that a device has left that zone the location engine uses a more rigorous test. Specifically, a device is considered as being out of a zone if the location engine determines that the device is a specific distance away from that zone. Thus in this embodiment it is easier for a device to be initially determined to be within a zone than it is for the device to be determined to have left a zone and no longer present in the zone.

The determination as to whether a device is in a zone is performed on a per zone basis. As the result of it being easier for a device to be initially determined as being in a zone than having been determined to no longer be present after having been found to be in a zone, e.g., to have left the zone, a device may be and sometimes is determined to be in two non-overlapping zones at the same time.

While this can result in an over count of devices in a zone, the over count tends to be for device at or near the edge of zone. For many applications involving providing of service to devices and/or users of devices it is often error on the side of over counting by including devices at an edge of the zone to allow for service to devices at the edge rather than denying them services. Thus, the methods and apparatus disclosed are well suited to applications where counts are used to control one or more device settings or deployment of hardware to provide services. For example, receivers and/or transmitters of a base station which provide coverage to a zone may be turned on or the transmit power controlled based on the number of devices to which the base station is expected to provide service. In such a case including devices on the edge of zone that may drift in and out of the zone in the device count can be useful in determining the number of devices to which service may need to be provided at a given time.

In the case of the controlling of doors and/or other physical devices in a zone as in the case of the wireless example it can be useful to count devices that are detected as transition in and out of the zone, e.g., due to location jitter, as being in a given zone to make sure that enough doors are unlocked to enable safe exit for the number of people that may be in an area or to provide adequate service for individuals in the zone where the number of individuals in the zone maybe and sometimes is determined based on the number of devices determined to be in the zone or based on the number of devices determined to be in a zone.

While individual counts of devices in zones are generated and updated for one or more zones based on the individual location determinations that maybe subject to jitter, in some embodiments device location determinations are made at a time of interest based on the zone or zones the device is determined to be located in at a given time. For example, if a device is determined to be located in a single zone at the time of interest, its location is determined to be within the zone. However, if the device is determined to be in multiple zones at a given time, the device is determined to be at or near a boundary between the zones in which the device is determined to be located. The proximity of the device to the zone boundary and/or which side of a zone boundary a device is located on maybe and sometimes is determined based on the relative number of times a device was determined to be at a position in one zone as opposed to the other zone in a given time window. Thus, even when a device has been determined to be in multiple zones it is possible to determine a more specific location than the combined total area of the two or more zones in which the device has been determined to be located in a given time window.

In various embodiments in addition to determining the number of devices in a zone at a given time, various features relate to determining the location of openings, e.g., doorways or other passageways between zones. In various embodiments the location where devices are first detected within a zone, e.g., indicating a zone entry point corresponding to a passageway, are stored and used to identify a passage way between two specific zones, e.g., physically adjacent zones.

Once one or more passageways between zones are identified, in some but not all embodiments the location of the passageway is taken into consideration in some embodiments to improve the reliability of determinations of whether or not a device is in a zone. In some embodiments an initial location determination of a device being in a zone in which the device was not previously located is disregarded if the initial location determination in the zone corresponds to a location other than that of a passageway area. In this way the risk of false determinations of a device being in a zone is reduced. While an initial location determination in a zone may be disregarded, repeated location determinations in the zone will not be disregarded and the device will be counted as being present in the zone. In this way devices which are powered on or move at a very fast speed between zones will properly considered in a zone but the risk of false zone presence determinations based on RSSI information that is unreliable for a short period of time is reduced as compared to systems which do not take into account passageway positions when making determinations of whether a device should initially be considered as being within a zone.

An exemplary method in accordance with some embodiments comprises: determining, for each of several consecutive time periods a location of a first device, the determined locations forming a set of device location information; storing the device location information for said consecutive time periods in memory; determining a first zone threshold number of location determinations to use in determining whether the first device is present in the first zone; and using the determined first threshold number of location determinations and said stored location information to determine if the first device is present in the first zone.

While various embodiments have been discussed in the summary above, it should be appreciated that not necessarily all embodiments include the same features and some of the features described above are not necessary for all embodiments. Numerous additional features, embodiments and benefits of various embodiments are discussed in the detailed description which follows.

FIG. 1 is a drawing of an exemplary communications system 100 in accordance with an exemplary embodiment. Exemplary system 100 includes a location/zone tracking server 150, and a plurality of access points (access point 1 (AP1) 152, access point 2 (AP2) 154), which are coupled together, e.g., via a backhaul network, an Ethernet and/or the Internet. Exemplary communications system 100 further includes a plurality of wireless devices (device 1 156, device 2 158, device 3 160, device 4 162, device 5 164, . . . , device n 166). The wireless devices (156, 158, 160, 162, 164, . . . , 166) are mobile devices which may move throughout the system 100 and may be tracked in terms of location and zone presence by the location/zone tracking server. The wireless devices (156, 158, 160, 162, 164, . . . , 166) may communicate with the APs (152, 154) via wireless signals. Wireless devices may transmit signals, e.g. reference signals, which are detected and measured by the APs (150, 152), e.g., obtaining RSSI information. An AP, e.g., AP1 152 may transmit signal, e.g., wireless signals, e.g., reference signals, which are detected and measured by a wireless device, e.g., device 1 156, e.g., obtaining RSSI information. RSSI measurement information from APs and/or wireless devices, are sent to the location/zone tracking server 150, which uses the information to make location determinations for one or more of the devices (156, 158, 160, 162, 164, . . . , 166). The locations/zone tracking server 150 uses the determined locations, e.g., a sliding window of predetermined size of recent determined locations for the device, known information about the zones, e.g., including geographic location information corresponding to the boundaries of each zone and a set of known zone entry locations for each zone, and threshold criteria to determine if a particular device is present in a zone. When evaluating whether or not to determine that a device is present in a particular zone, a threshold is determined based on one of more or all of: i) whether or not the device was previously determined to be present in the zone, and ii) whether or not the device has just entered a location known to be a zone entry location (associated with the current zone in which a device is located and a neighboring zone that is physically adjacent the current zone). In accordance with a feature of various embodiments, the location and tracking server 150 may, and sometimes does, determine that a device, e.g. device 1 156, is present in two zones at the same time. In various embodiments, the location/zone tracking server maintains a list of the devices determined to be present in each zone and the number of devices determined to be present in each zone. The location/zone tracking server takes action with respect to an individual zone based on the number of devices determined to be present in the individual zone.

FIG. 1 further includes a floor plan layout of an exemplary building 102 which has been subdivided into four (4) zones, zone 1 104, zone 2 106, zone 3 108, zone 4 110. The building includes four door (door 1 112, door 2 114, door 3 116, and door 4 118), which are typically accessible to a device, e.g., device 1 156 may, and sometimes does, go through a door (112, 114, 116, 118). Corresponding to door 112 there is a doorway location 122 within zone 1 104, via which a device, e.g. device 1 156 may enter zone 1 104. Corresponding to door 112 there is also a doorway location 124 within zone 2 106, via which a device, e.g. device 1 156, may enter zone 2 106. Corresponding to door 116 there is a doorway location 128 within zone 4 110, via which a device, e.g. device 1 156 may enter zone 4 110. Corresponding to door 118 there is a doorway location 130 within zone 3 108, via which a device, e.g. device 1 156, may enter zone 3 108. The location/zone tracking server 150 includes stored information corresponding to the floor plan including information specifying the locations of each zone, the locations of each door (112, 114, 116, 118) and the locations of each doorway location, e.g., entry location area, (122, 124, 126, 128, 130).

In FIG. 1, there is also another potential zone entry point 120, e.g. a door that is normally locked or a newly installed door 120. Information about potential zone entry point 120 is not known or stored in the location/zone tracking server 150; however, if the potential zone entry point 120 is used by a device, e.g., device 1 156, the location/zone tracking server 150 may identify the entry point as a new entry point and add the areas adjacent to the entry point 120 to a set of known entry point locations which is being maintained and used by the location zone tracking server 150. For sake of simplicity FIG. 1 describes a configuration with only two APs. Those skilled in the art should recognize that a typical location estimation and tracking system may employ more or less APs with many systems using three or more APs.

Figure 2A:
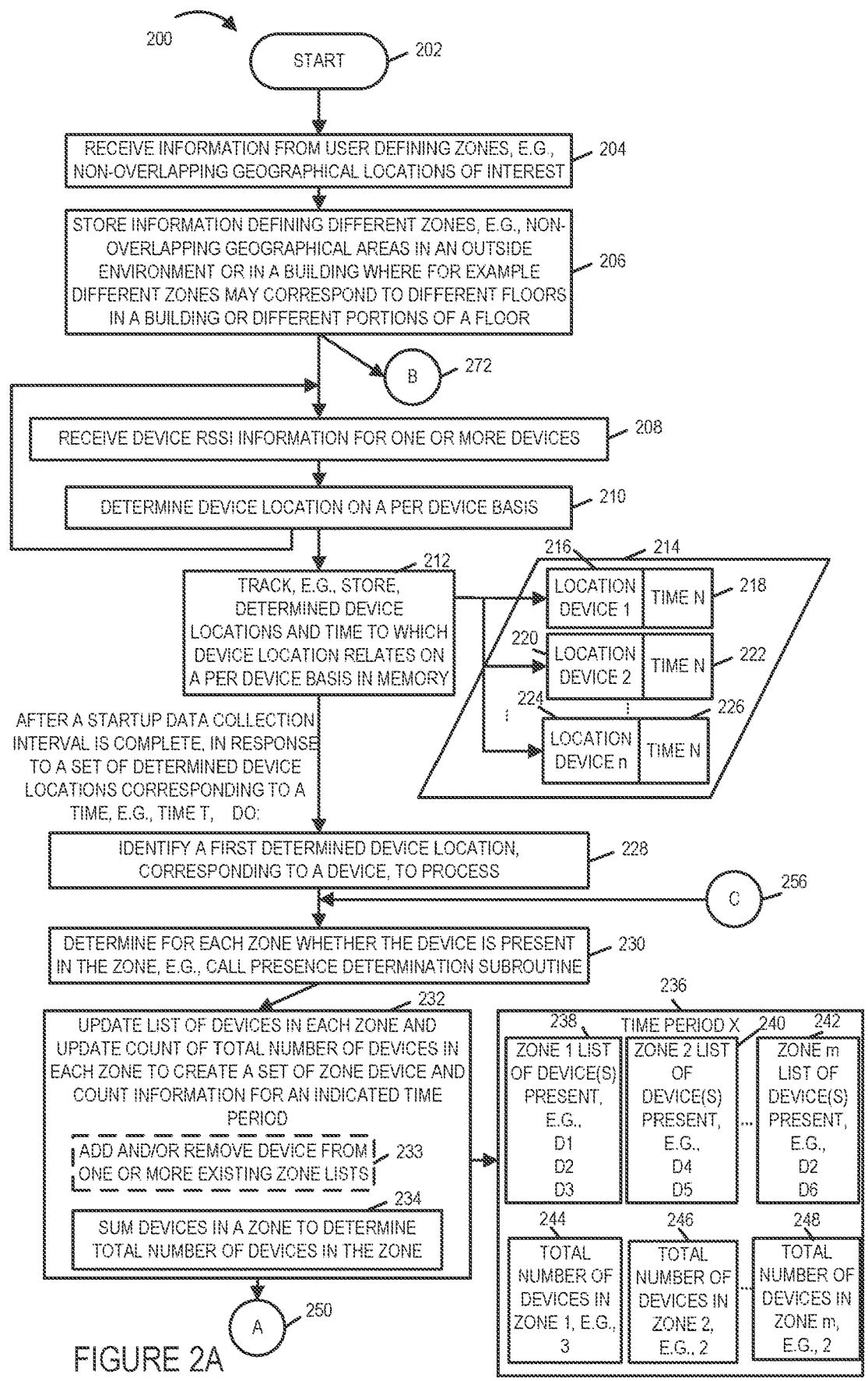
FIG. 2A is a first part of flowchart of an exemplary method of operating a location/zone tracking server in accordance with an exemplary embodiment.
Figure 2B:
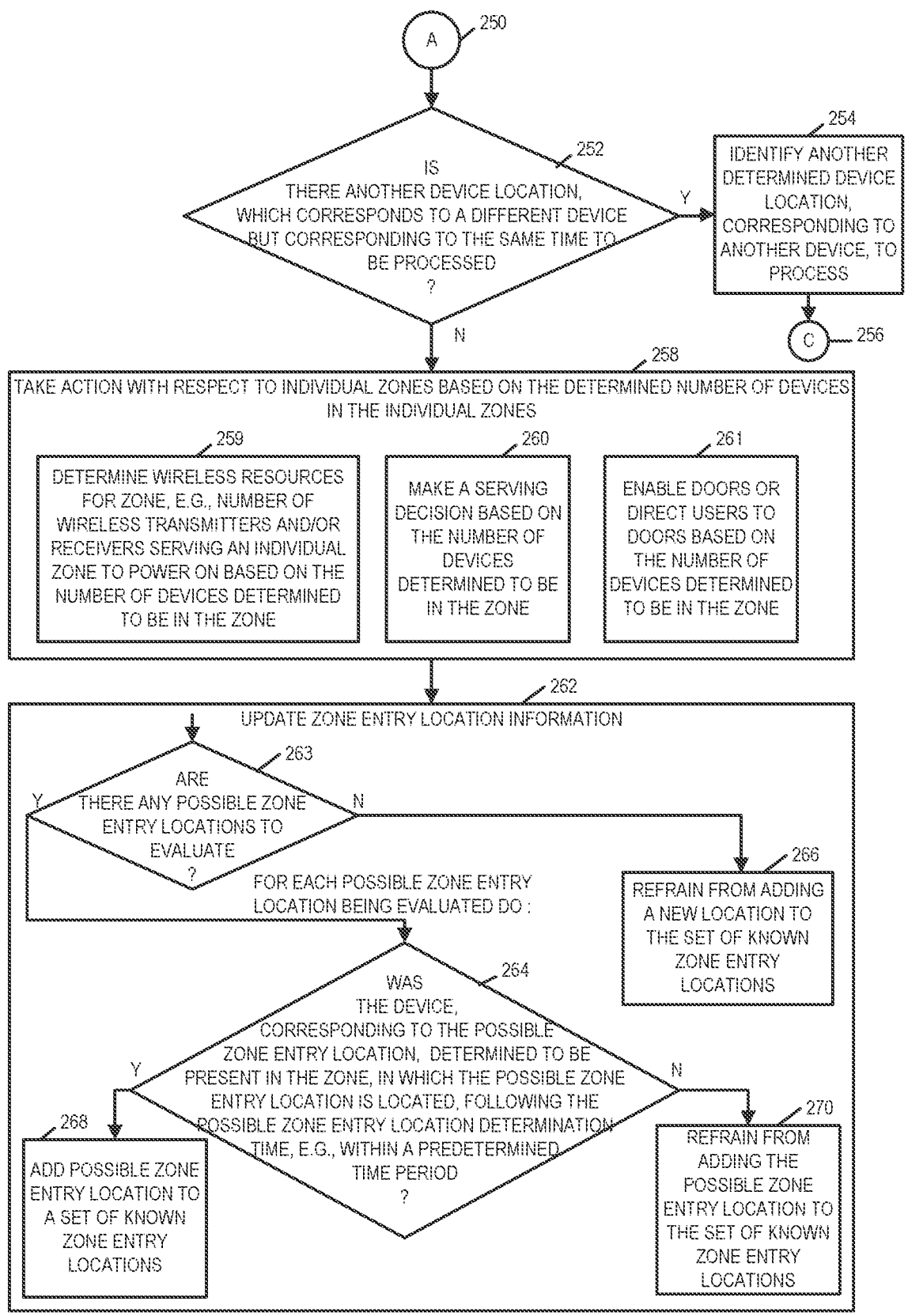
FIG. 2B is a second part of flowchart of an exemplary method of operating a location/zone tracking server in accordance with an exemplary embodiment.
Figure 2C:
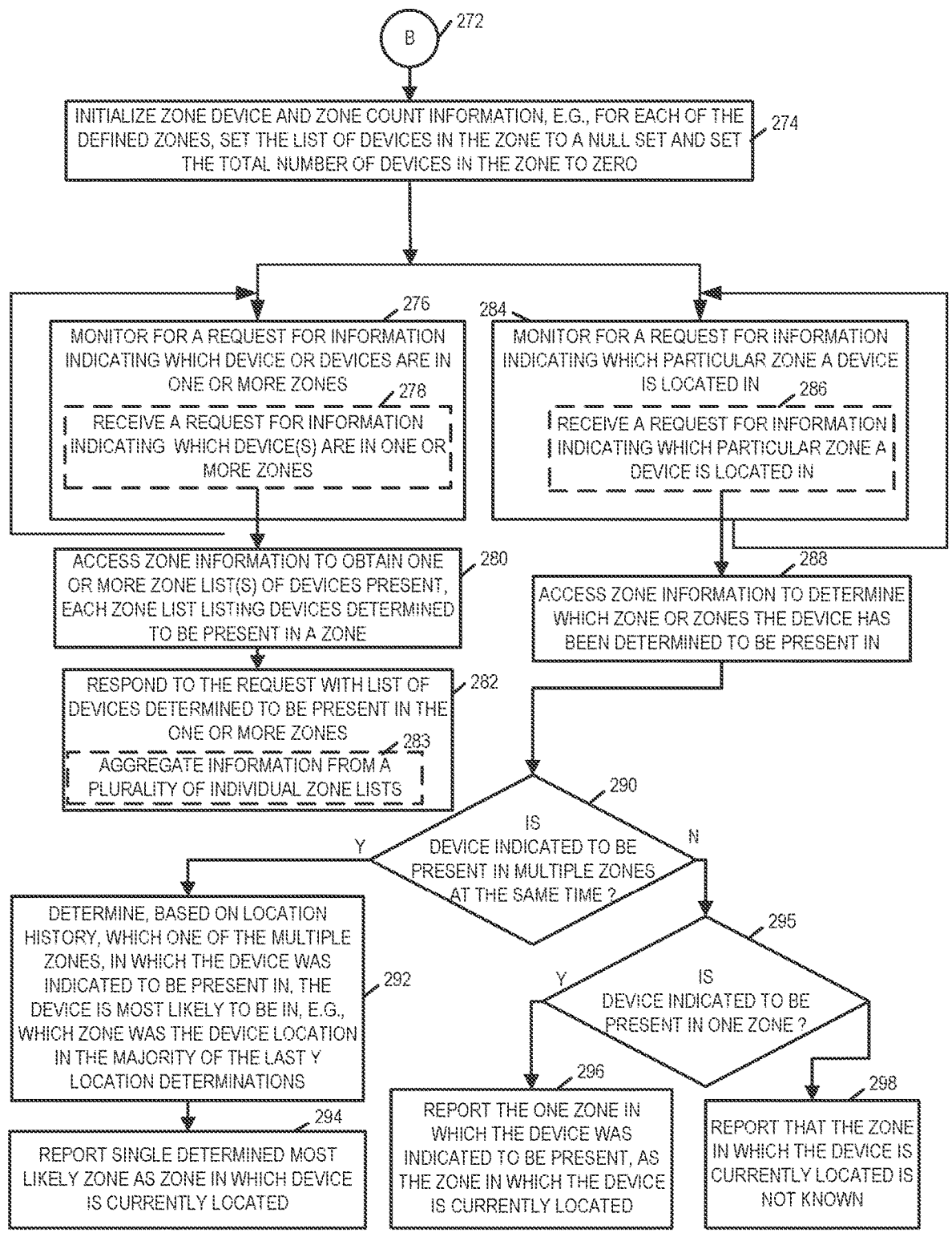
FIG. 2C is a third part of flowchart of an exemplary method of operating a location/zone tracking server in accordance with an exemplary embodiment.

FIG. 2, comprising the combination of FIG. 2A, FIG. 2B and FIG. 2C is a flowchart 200 of an exemplary method of operating a location/zone tracking server in accordance with an exemplary embodiment.

Operation starts in step 202 in which the location/zone tracking server is powered on and initialized. Operation proceeds from start operation 202 to operation 204 in which the location/zone tracking server receives information from a user defining zones, e.g., non-overlapping geographical locations of interest. Operation proceeds from operation 204 to operation 206. In operation 206, the location/zone tracking server stores information defining different zones, e.g., non-overlapping geographical areas in an outside environment and/or in a building, where for example, different zones may correspond to different floors of a building or different portions of a floor. Operation proceeds from operation 206 to operation 208, and operation proceeds from operation 206, via connecting node B 272, to operation 274. In operation 274, location/zone tracking server initializes zone device and zone count information, e.g., for each of the defined zones the location/zone tracking server sets the list of devices in the zone to a null set and sets the total number of devices present in the zone to zero. Operation proceeds from operation 274 to operations 276 or operation 284.

Returning to operation 208, in operation 208, the location/zone tracking server receives device received signal strength indicator (RSSI) information for one or more devices. Operation proceeds from operation 208 to operation 210. In operation 210 the location/zone tracking server determines device location for each of the one of more devices, for which RSSI information was received, on a per device basis. Operations 208 and 210 are performed repeatedly, e.g. on an ongoing basis.

In response to each iteration of operation 210, operation proceeds from operation 210 to operation 212. In operation 212 the location/zone tracking server tracks, e.g., stores, the determined device locations, from operation 210, and time to which the device locations relate on a per device basis in memory. Memory portion 214 includes exemplary determined device locations and corresponding time information, e.g., for one iteration of operation 210 corresponding to exemplary time N. Memory portion 214 includes the determined location of device 1 216 and time information 218, e.g., a time tag value, indicating time N; the determined location of device 2 220 and time information 222, e.g., a time tag value, indicating time N; . . . ; and the determined location of device n 224 and time information 226, e.g., a time tag value, indicating time N.

After, a start up data collection interval is complete, operation proceeds from an iteration of operation 212 to operation 228. Thus, after a start up data collection interval is complete, in response to a set of determined device locations corresponding to a time, e.g. time N, operation proceeds from operation 212 to operation 228.

In operation 228 the location/zone tracking server identifies a first determined device location corresponding to a device to process, e.g., identifies determined location device 1 216 corresponding device 1. Operation proceeds from operation 228 to operation 230.

In operation 230 the location/zone tracking server determines for each zone whether the device is present in the zone. For example, in one exemplary embodiment, in operation 230 the location/zone tracking server calls a presence determination subroutine. In one such embodiment, the presence determination subroutine implements the method of flowchart 300 of FIG. 3.

Figure 3A:
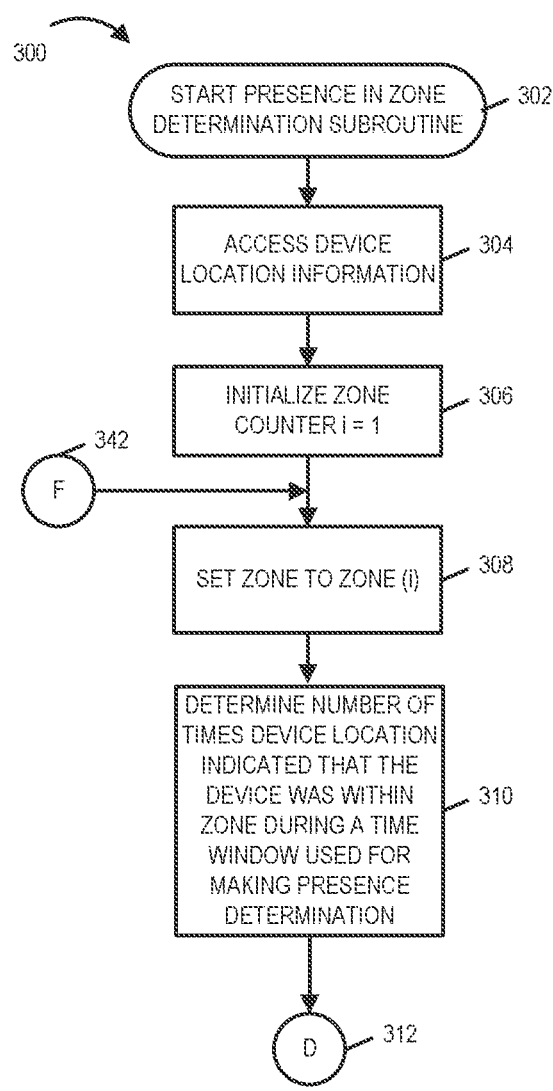
FIG. 3A is a first part of a flowchart of an exemplary method of determining the presence of a device, e.g., a mobile wireless device, in one or more zones.
Figure 3B:
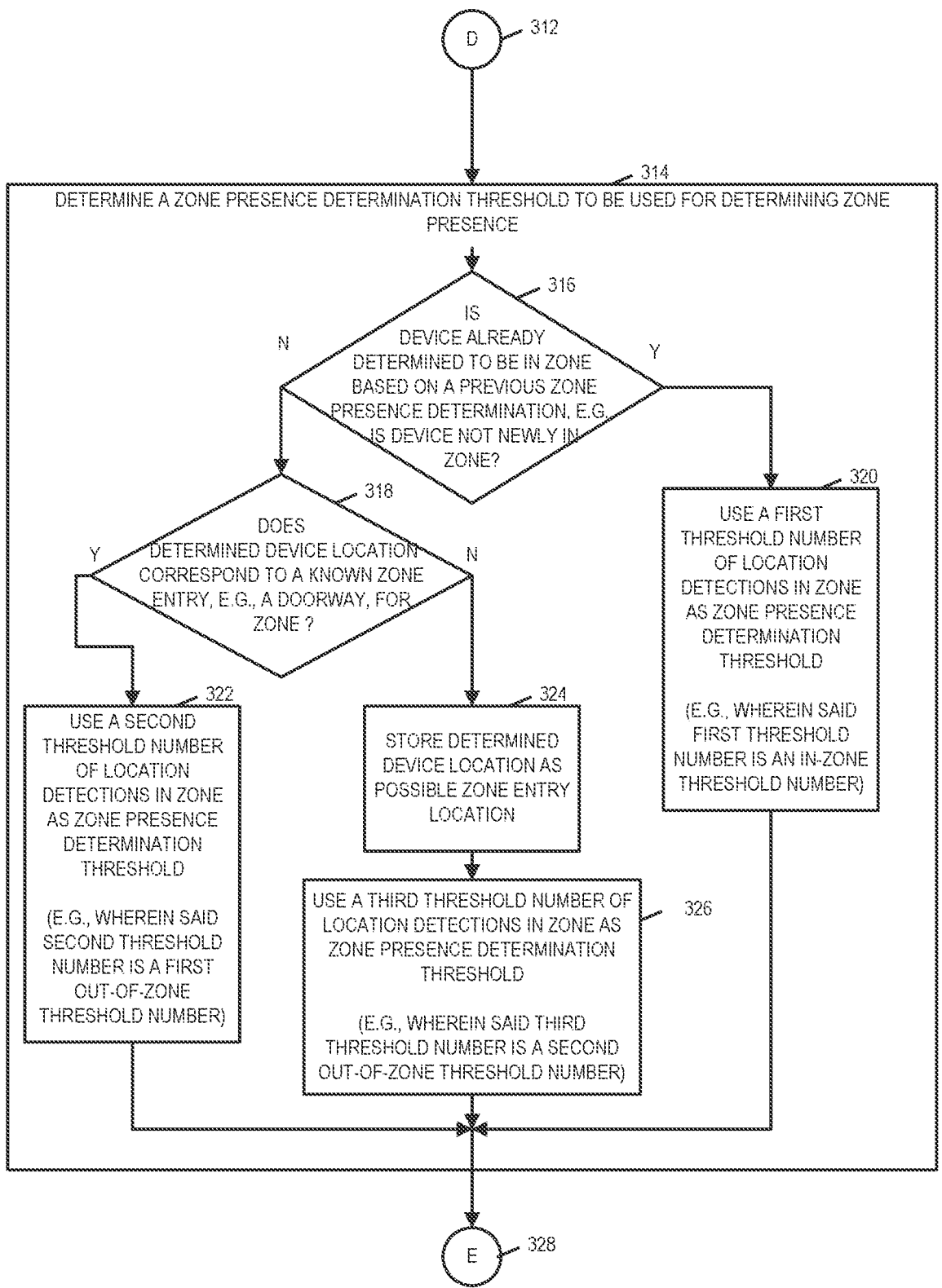
FIG. 3B is a second part of a flowchart of an exemplary method of determining the presence of a device, e.g., a mobile wireless device, in one or more zones.
Figure 3C:
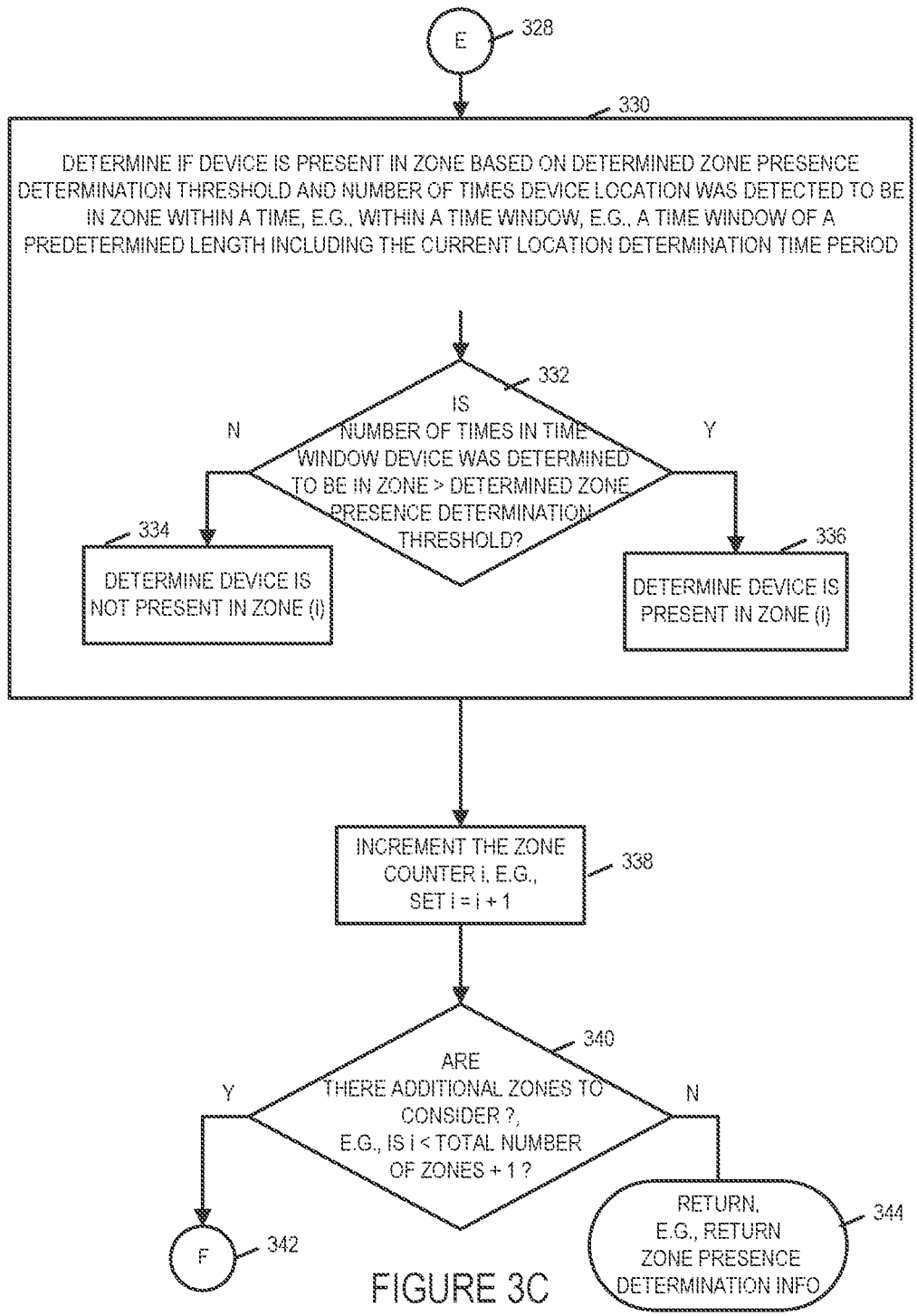
FIG. 3C is a first part of a flowchart of an exemplary method of determining the presence of a device, e.g., a mobile wireless device, in one or more zones.

FIG. 3, comprising the combination of FIG. 3A, FIG. 3B and FIG. 3C, is a flowchart 300 of an exemplary method of determining the presence of a device in one or more zones. Operation of the exemplary method starts in operation 302 and proceeds to operation 304. In operation 304 the location/zone tracking server accesses device location information, e.g., the stored device location determinations from multiple prior iterations of operation 210 and 212 which correspond to a particular device, e.g. device 1. Operation proceeds from operation 304 to operation 306. In operation 306 the location/zone tracking server initializes the zone counter i=1. Operation proceeds from operation 306 to operation 308, in which the location/zone tracking server sets the zone to zone (i). Thus, for the first iteration of operation 308, the zone being evaluated for presence is zone 1. Operation proceeds from operation 308 to operation 310.

In operation 310, the location/zone tracking server determines the number of times the device location indicated that the device was within the zone during a time window used for making the presence determination. Operation proceeds from operation 310, via connecting node D 312, to operation 314.

In operation 314, the location/zone tracking server determines a zone presence determination threshold to be used for determining zone presence. Operation 314, includes operations 316, 318, 320, 322, 324, and 326. In operation 316 the location/zone tracking server determines if the device is already determined to be in the zone based on a previous zone presence determination, e.g., is the device not newly in the zone. If the determination is that the device has already been determined to be present in the zone, e.g., based on a previous iteration of the presence determination for the device corresponding to the zone, then operation proceeds from operation 316 to operation 320 in which the location/zone tracking server uses a first threshold number of location detection in the zone, within a predetermined time-window, as the zone presence determination threshold. However, if the determination is that the device has not already been determined to be present in the zone, e.g., the device is newly in the zone, then operation proceeds from operation 316 to operation 318.

In operation 318 the location/zone tracking server checks to determine if the determined device location, e.g., the most recently determined device location for the device, corresponds to a known zone entry, e.g., a doorway, for the zone. If the determination of operation 318 is that the determined device location corresponds to a known zone entry for the zone, then operation proceeds from operation 318 to operation 322, in which the location/zone tracking server uses a second threshold number of location detections in zone, within a predetermined time window, as the zone presence determination threshold. However, if the determination of operation 318 is that the determined device location does not correspond to a known zone entry for the zone, then operation proceeds from operation 318 to operation 324, in which the location/zone tracking server stores the determined device location as a possible zone entry location. Operation proceeds from operation 324 to operation 326. In operation 326, the location/zone tracking server uses a third threshold number of location detections in zone, within a predetermined time-window, as the zone presence determination threshold.

In some embodiments, the first threshold number is referred to as an in-zone threshold number, the second threshold number is referred to as a first out-of-zone threshold number, and the third threshold number is referred to as a second out-of-zone threshold number.

In one exemplary embodiment, the first threshold number of location detections is less than the second threshold number of locations detections, and the second threshold number of locations detections is less than the third number of location detections. In one exemplary embodiment, the first threshold number is 2, the second threshold number is 3, and the third threshold number is 7. Operation proceeds from operation 320, operation 322 or operation 326, via connecting node E 328, to operation 330.

In operation 330, the location/zone tracking server determines if the device is present in the zone based on the determined zone presence determination threshold and number of times the device location was detected to be in zone within a time window, e.g., a time window if a predetermined length including the current location determination time period. Alternatively, rather than count the number of times a device is determined to be in a specific zone within a specific time window, the system makes its determination based on the number of consecutive detection of device being within a zone being greater than a predetermined threshold.

Operation 330 includes operations 332, 334 and 336. In operation 332, the location/zone tracking server determines if the number of times in the time window that the device was determined to be in the zone is greater than the determined zone presence determination threshold. If the determination of operation 332 is that the number of times in the time window that the device was determined to be in the zone is not greater than the determined zone presence determination threshold, then operation proceeds from operation 332 to operation 334, in which the location/zone tracking server determines that the device is not present in zone (i).

However, if the determination of operation 332 is that the number of times in the time window that the device was determined to be in the zone is greater than the determined zone presence determination threshold, then operation proceeds from operation 332 to operation 336, in which the location/zone tracking server determines that the device is present in zone (i). In accordance with another embodiment, the determination in operations 332 is made based on whether the number of consecutive times that the device was determined to be in the zone is greater than the determined zone presence determination threshold rather than based on whether the number of times in the time window that the device was determined to be in the zone is greater than the determined zone presence determination threshold. Operation proceeds from operation 330 to operation 338.

In operation 338, the location/zone tracking server increments the zone counter i, e.g., the location/zone tracking server sets i=i+1. Operation proceeds from operation 338 to operation 340. In operation 340 the location/zone tracking server determines if there are additional zones to consider, e.g., determines if the current value of the variable i is less than the total number of zones+1. If the determination is that there are additional zones to consider, e.g. i is less than the total number of zones+1, then operation proceeds from operation 340, via connecting node F 342 to operation 308, in which the zone is changed to the next zone, based on the incremented value of i from operation 338.

However, if the determination of operation 340 is that there are not additional zones to consider, e.g. the value of variable i is not less than the total number of zones+1, then operation proceeds from operation 340 to return operation 344, in which the subroutine 300 returns zone presence determination information, e.g. returns an indication as to whether or not the device has been determined to be present in each of the zones. A device may be, and sometimes is, determined to be present in more than one zone.

Thus, in some embodiment, in operation 230 the location/zone tracking server obtains zone presence determination information for the device from the called presence determination subroutine. Operation proceeds from operation 230 to operation 232.

In operation 232 the location/zone tracking server updates, based on the zone presence determination results of operation 230, a list of devices in each zone and updates a count of total number of devices in each zone to create a set of zone device and count information for an indicated time period. In some embodiments, operation 232 includes operation 233 in which the location/zone tracking server adds and/or removes a device from one or more existing zone lists. Operation 232 includes operation 234 in which the location/zone tracking server sums devices determined to be present in a zone to determine the total number of devices which are present in a zone.

Operation proceeds from operation 232, via connecting node A 250, to operation 252. In operation 252, the location/zone tracking server determines if there is another device location, which corresponds to a different device, but corresponds to the same time, which is to be processed. If the determination of operation 252 is that there is another device location, which corresponds to a different device, but corresponds to the same time, which is to be processed, then operation proceeds from operation 252 to operation 254, in which the location/zone tracking server identifies another determined location, corresponding to another device to process. Operation proceeds from operation 254, via connecting node C 256, to operation 230. In operation 230 the location/zone tracking server determines for each zone whether the another device is present in the zone, e.g. calls the presence determination subroutine which processes input device location determination data corresponding to the another device and returns device zone presence determinations for each of the zones. Then operation proceeds from operation 230 to operation 232, in which the lists of devices determined to be present in each zone is updated and the total number of devices in each zone is updated.

Zone presence information 236 corresponding to time period X, represents an exemplary presence determination results after the operations 230 and 232 have been repeated n times, e.g., where n=6, to evaluate the presence of devices in zones for the n devices. In one example, the time period X includes time N, time N−1, time N−2, time N−3, time N−4, time N−5, time N−6, time N−7, time N−8 and time N−9. Exemplary zone presence information 236 includes: zone 1 list of device determined to be present in zone 1 238, which, e.g., includes devices D1, D2 and D3, a total number of devices determined to be present in zone 1 244, e.g., 3 devices, zone 2 list of device determined to be present in zone 2 240, which, e.g., includes devices D4 and D5, a total number of devices determined to be present in zone 2 246, e.g., 2 devices, zone m list of device determined to be present in zone m 242, which, e.g., includes devices D2 and D6, and a total number of devices determined to be present in zone m 248, e.g., 2 devices.

Returning to operation 252, if the determination of operation 252 is that there is not another device location, which corresponds to a different device, but corresponds to the same time, which is to be processed, then the presence determinations for the time period are complete, and operation proceeds from operation 252 to operation 258.

In operation 258 the location/zone tracking server takes action with respect to individual zones based on the determined number of devices in the individual zones. Operation 258 includes one or more of all of operations 259, 260 and 261. In operation 259 the location/zone tracking server determines wireless resources for a zone, e.g., a number of wireless transmitter and/or wireless receivers serving an individual zone to power on based on the number of devices determined to be in the zone. In operation 260 the location/zone tracking server makes a serving decision based on the number of devices determined to be the zone. In operation 261 the location/zone tracking server enables doors or directs users to doors based on the number of devices determined to be in the zone.

Operation proceeds from operation 258 to operation 262. In operation 262, the location/zone tracking server updates zone entry information. Operation 262 includes operations 263, 264, 266, 268 and 270. In operation 263 the location/zone tracking server determines if there are any possible zone entry locations to evaluate. In some embodiments, for a possible zone entry location to be evaluated a predetermined amount of time needs to have past since the possible zone entry location was identified, e.g., in an iteration of operation 324. If the determination of operation 263 is that there are not any possible zone entry locations to evaluate, then operation proceeds from operation 263 to operation 266 in which the location/zone tracking server is operated to refrain from adding a new location to the set of known zone entry locations. However, if the determination of operation 263 is that there is at least one possible zone entry location to evaluate, then operation proceeds from operation 263 to operation 264 for each possible zone entry location being evaluated. In operation 264 the location/zone tracking server determines if the device, corresponding to the possible zone entry location being evaluated, was determined to be present in the zone, in which the possible zone entry location is located, following the possible zone entry location determination time, e.g., within a determined time period. If the determination of operation 264 is that the device was in the zone following the possible zone entry location determination, then operation proceeds from operation 264 to operation 268 in which the location/zone tracking server adds the possible zone entry location to a set of known zone entry locations. However, if the determination of operation 264 is that the device was not in the zone following the possible zone entry location determination, then operation proceeds from operation 264 to operation 270 in which the location/zone tracking server refrains from adding the possible zone entry location to the set of know zone entry locations.

Returning to operation 276 of FIG. 2C, in operation 276 the location/zone tracking server monitors for a request for information indicating which device or devices are in one or more zones. Operation 276 is performed on an ongoing basis, e.g., repetitively. Operation 276 may, and sometimes does include operation 278, in which the location/zone tracking server receives a request for information indicating which device(s) are in one or more zones. In response to operation 278, operation proceeds from operation 278 to operation 280. In operation 280 the location/zone tracking server access zone information to obtain one or more lists of devices present, each zone listing devices determined to be present in a zone. Operation proceeds from operation 280 to operation 282. In operation 282 the location/zone tracking server responds to the request with a list of devices determined to be present in the one or more zones. In some embodiment, operation 282 may, and sometimes does, include operation 283 in which the location/zone tracking server aggregates device presence information from a plurality of individual zone lists.

Returning to operation 284, in operation 284 the location/zone tracking server monitors for a request for information indicating which particular zone a device is located in. Operation 284 is performed on an ongoing basis, e.g., repetitively. Operation 284 may, and sometimes does include operation 286, in which the location/zone tracking server receives a request for information indicating which particular zone a device is located in. In response to operation 286, operation proceeds from operation 286 to operation 288. In operation 288 the location/zone tracking server accesses zone presence information to determine which zone or zones the device has been determined to be present in. Operation proceeds from operation 288 to operation 290.

In operation 290 the location/zone tracking server determines if the device is indicated to be present in multiple zones at the same time. If the determination of operation 290 indicates that the device is indicated to be present in multiple zones, then operation proceeds from operation 290 to operation 292. In operation 292 the location/zone tracking server determines, based on device location history, which of the multiple zones that the device was indicated to be present in, the device is most likely to be in, e.g., which zone was the device location in the majority of the last Y location determinations. In accordance with yet another embodiment, the system calculates the probability of the device being in each one of the zones by dividing the number of times the device was in a specific zone by the total number of location determinations. Operation proceeds from operation 292 to operation 294 in which the location/zone tracking server reports the single determined most likely zone as the zone in which the device is currently located. In according to another embodiment, the location/zone tracking server reports the most likely k, e.g., 3, locations and their associated probability.

If the determination of operation 290 indicates that the device is not indicated to be present in multiple zones, then operation proceeds from operation 290 to operation 295. In operation 295 the location/zone tracking server determines if the device is indicated to be present in one zone. If the determination of operation 295 is that the device is currently indicated to be present in one zone, then operation proceeds from operation 295 to operation 296. In operation 296 the location/zone tracking server reports the one zone in which the device was indicated to be present, as the zone in which the device is currently located. However, if the determination of operation 295 is that the device is not currently indicated to be present in any zone, then operation proceeds from operation 295 to operation 298. In operation 298 the location/zone tracking server reports that the zone is which the device is currently located is not known. In some embodiments, when the location/zone tracking server does not know the current zone in which the device is located, instead of or in addition to performing operation 298, the location/zone tracking server accesses the most recent zone information corresponding to an instance in which the device was determined to be present in at least one zone, and then uses that information to find the most likely zone that the device was in at that time, and reports the most likely zone with time information indicating that the presence information is stale.

Figure 4:
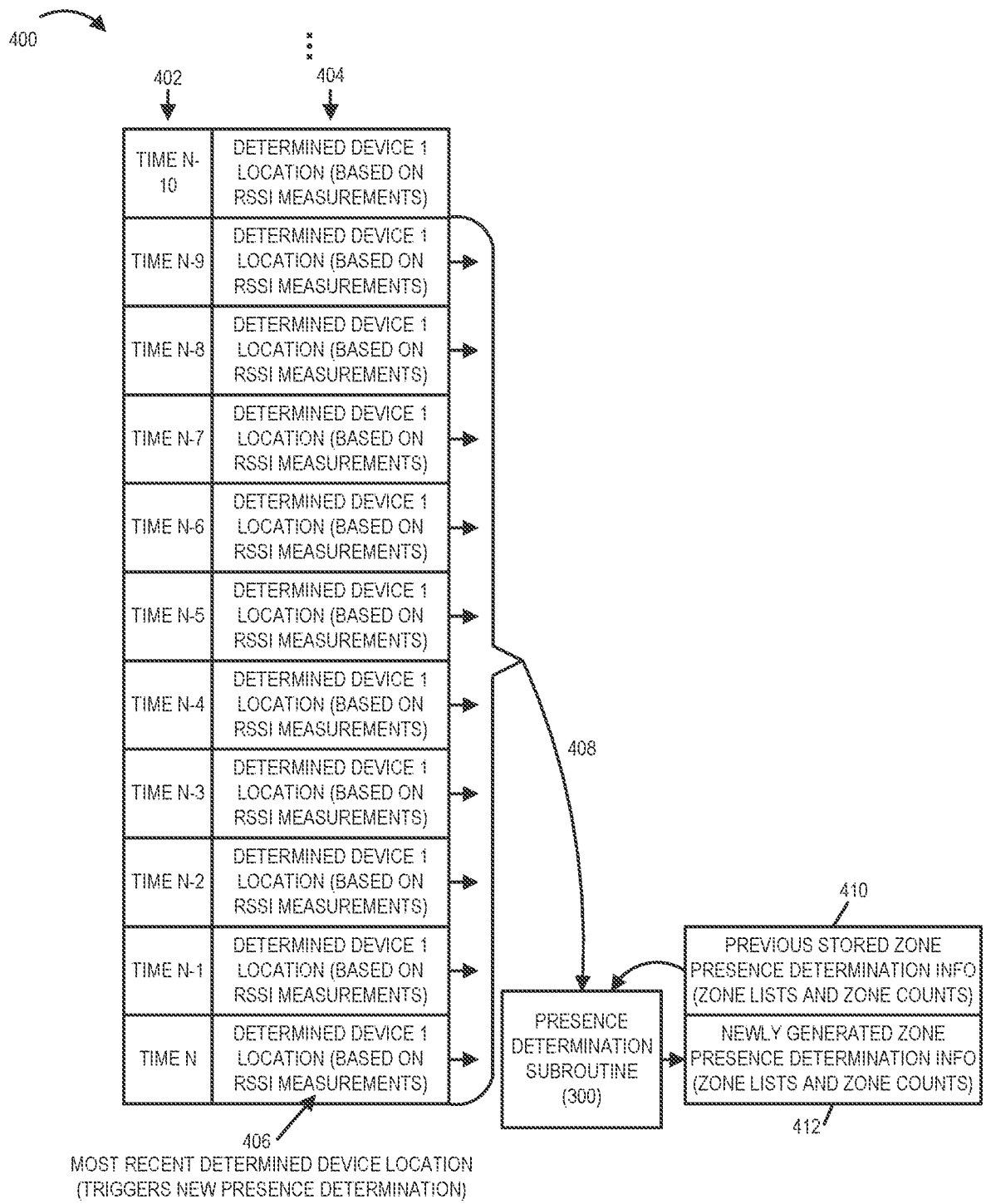
FIG. 4 is a drawing used to illustrate exemplary zone presence determination features in accordance with an exemplary embodiment.

FIG. 4 is a drawing 400 used to illustrate exemplary zone presence determination features in accordance with an exemplary embodiment. Column 402 of FIG. 4 illustrates exemplary times (N−10, N−9, N−8, N−7, N−6, N−5, N−4, N−3, N−2, N−1, N), e.g., time slots, and column 404 illustrates corresponding exemplary estimated device 1 locations for each of the indicated times. Each estimated device 1 location in column 404 is based on RSSI measurements, e.g., corresponding to the time slot. Each determined device 1 location is a location within one of a plurality of predetermined zones. Typically, when the jitter is smaller than the distance of a device from zone boundary, a determined device 1 location maps to the same zone in which device 1 is actually located at the time. However, when the jitter is larger than the distance of a device from zone boundary, some determined device 1 locations may, and sometimes do, map to a different zone than the zone in which device 1 is actually located at the time of measurement; for example, device 1 may be actually located near the boundary between 2 zones and noise and/or reflections cause the determined device 1 location to be inaccurate. Some determined device 1 locations may correspond to known entry locations for a zone, e.g., a determined device 1 location may be within a known area which is an entry area, e.g., a doorway between a zone in which the device was most recently determined to be and a neighboring zone.

In the example of FIG. 4 the most recent determined device 1 location 406, corresponding to time N, triggers a new presence determination. The results from a previous presence determination 410, which were previous stored, are used as an input to the presence determination subroutine. In this example, a set of device 1 locations corresponding to a window of 10 time slots including the most recent time slot is also used as input to the presence determination subroutine. The presence determination subroutine implementing the method of flowchart 300 of FIG. 3 determines for a zone, a zone presence determination threshold as a function of: i) whether or not the previously stored zone presence information 410 indicates that device 1 is in the zone; and ii) whether or not the most recently determined device 1 location 406 corresponds to a known zone entry. The presence determination subroutine 300 counts the number of instances in the set of 10 determined device 1 locations in the window 408 which are locations mapping within the zone. As previously explained, in accordance with another embodiment, the system counts the number of consecutive occurrences that the device was estimated to be within the said zone. Then, the presence determination subroutine 300 compares the count of the number of instances to the determined zone presence determination threshold and determines whether or not device 1 is to be determined to be present in the zone, e.g., if the count of the number of instance exceeds the threshold, device 1 is determined to be present in the zone. The results are stored in the newly generated presence determination information 412. The procedure is repeated for each of the zones and for each of the devices, e.g., mobile terminals being evaluated.

In some embodiments, newly generated zone presence determination information 412 is generated as a new set of data. In some other embodiments, the previously stored zone presence information 410 is revised to generate newly generated zone presence information 412, e.g., device 1 may be added to a previous zone presence member list, device 1 may be removed from a previous zone presence member list, or device 1 may be allowed to remain on a previous zone 1 member list. The zone count information is updated based on the new window which is evaluated. In some embodiments removal from a list of presence within a zone depends on the device being detected a distance D away from the zone from which it is being removed or being out of the zone for a minimum set period of time, e.g., a predetermined time period.

The example, of FIG. 4 has described presence determination for one device, device 1; however, it should be appreciated that the presence determination subroutine implementing the method of the flowchart 300 of FIG. 3, in general, processes determined location information corresponding to a plurality of devices, e.g., device 1, device 2, . . . , device n, e.g., as described with respect to FIGS. 2 and 3.

Figure 5:
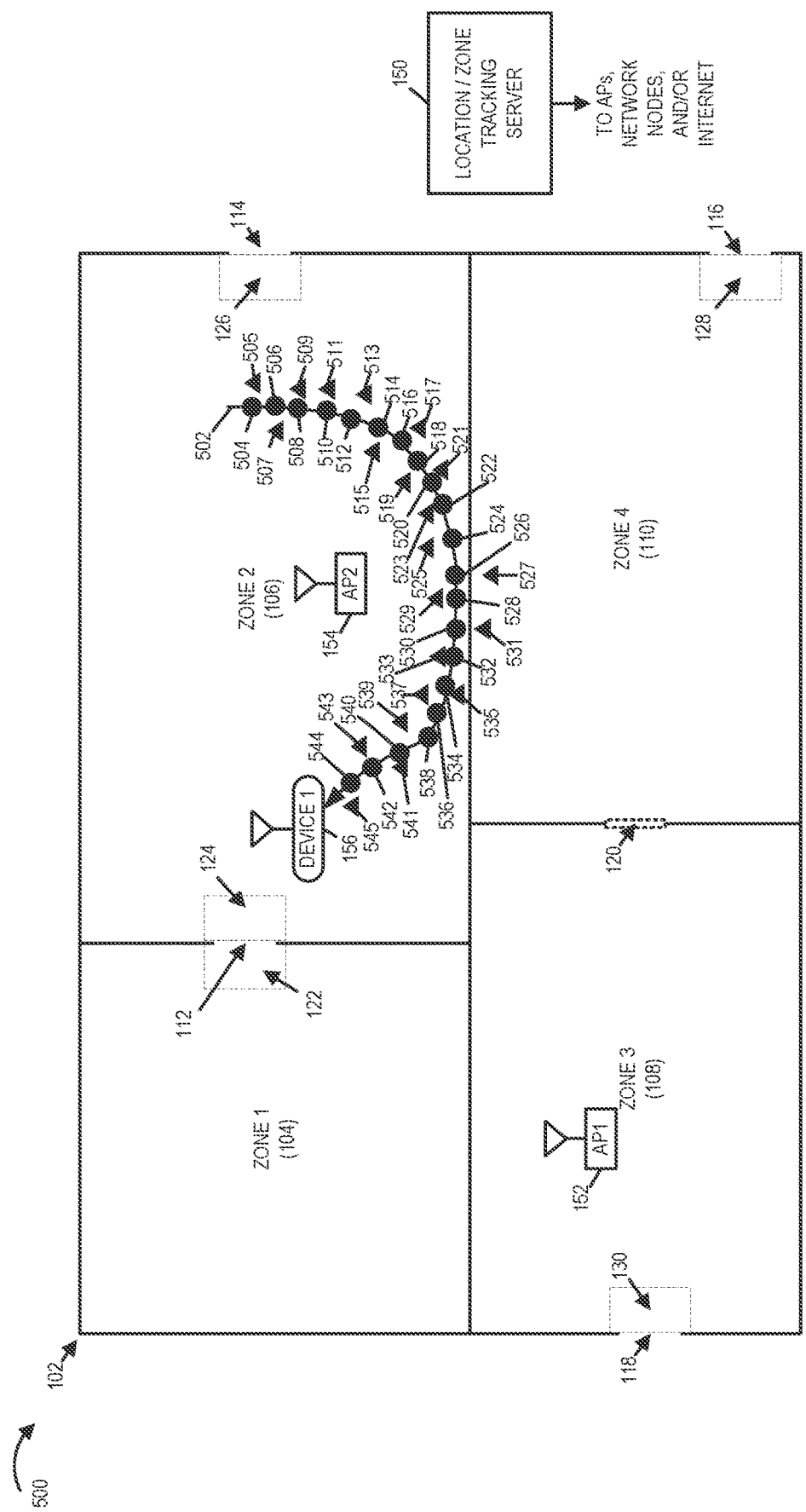
FIG. 5 is a drawing illustrating exemplary device moving within a zone, actual locations of the device, and RSSI based location determinations, which are used to make zone presence determinations in accordance with an exemplary embodiment.

FIG. 5 is a drawing 500 illustrating exemplary device 1 156 moving within zone 2 106, actual locations of device 156, and RSSI based location determinations, which are used to make zone presence determinations in accordance with an exemplary embodiment. Drawing 500 illustrates device 1 156 moving within building 102 of system 100 along path 502. Small black circles (504, 506, 508, 510, 512, 514, 516, 518, 520, 522, 524, 526, 528, 530, 532, 534, 536, 538, 540, 542, 544) along path 502 identify actual location of device 1 156 at different times. Small black triangles (505, 507, 509, 511, 513, 515, 517, 519, 521, 523, 525, 527, 529, 531, 533, 535, 537, 539, 541, 543, 545) are determined RSSI based device 1 locations corresponding to actual device 1 locations (504, 506, 508, 510, 512, 514, 516, 518, 520, 522, 524, 526, 528, 530, 532, 534, 536, 538, 540, 542, 544), respectively. The location/zone tracking server 150 makes the location determinations based on received RSSI information corresponding to device 1. In the example, of FIG. 5, device 1 156 remains in zone 2 106; however, two location determination (527, 531) corresponding to actual locations (526, 530), respectively are within zone 4 110.

FIG. 6 is a drawing of a table 600 used to illustrate exemplary zone presence threshold number determinations and exemplary zone presence determinations, corresponding the example of FIG. 5, in accordance with an exemplary embodiment. Table 600 includes: a first column 602 including actual device 1 locations (each entry is identified by the element reference number of FIG. 6), and a second column 604 including determined device 1 locations (each entry identified by the element reference number of FIG. 6). Entries in columns 602 and 604 represent, e.g., GPS information, e.g. GSP coordinates, or latitude/longitude coordinates or predetermined grid coordinates. Third column 606 in table 600 identifies the zone in which the determined device 1 location of column 604 is located in. Fourth column 608 in table 600 identifies the number of determined locations in zone 2 within a window of size 10. Fifth column 610 in table 600 identifies the determined threshold number for a zone 2 presence determination for device 1. Sixth column 612 in table 600 identifies zone 2 device 1 presence determination results. Seventh column 614 in table 600 identifies the number of determined locations in zone 4 within a window of size 10. Eighth column 616 in table 600 identifies the determined threshold number for a zone 4 presence determination for device 1. Ninth column 618 in table 600 identifies zone 4 device 1 presence determination results.

In this example, the location/zone tracking server 150 collects a window of 10 RSSI location determinations before making zone presence determinations based on the data. The zone presence determinations are initialized to a not present state as indicated the entries of columns 612 and 618 of row 620.

Exemplary value determinates for row 621 will now be described. The number of determined locations in zone 2 (row 621, column 608) is determined by counting the number of counting the number of instances in the first 10 entries of column 606 in which the zone number is 2, which is 10. The determined threshold number for zone 2 (row 621, column 608) is determined based on the previous zone presence determination (row 620, column 612), which indicates not present, and whether or not the most recent RSSI based location determination (row 621, column 604) is located within a known zone entry area, which it is not. Therefore the determined threshold number for zone 2 is set to 7. The zone 2 device 1 presence determination entry (row 621, column 612) is determined to be present since the number of determined locations in zone 2 within the window (row 621, column 608), which is 10 is greater than the threshold (row 621, column 610), which is 7.

The number of determined locations in zone 4 (row 621, column 614) is determined by counting the number of instances in the first 10 entries of column 606 in which the zone number is 4, which is 0. The determined threshold number for zone 4 (row 621, column 616) is determined based on the previous zone presence determination (row 620, column 618), which indicates not present, and whether or not the most recent RSSI based location determination (row 621, column 604) is located within a known zone entry area, which it is not. Therefore the determined threshold number for zone 4 is set to 7. The zone 4 device 1 presence determination entry (row 621, column 618) is determined to be not present since the number of determined locations in zone 4 within the window (row 621, column 614), which is 0 is not greater than the threshold (row 621, column 616), which is 7.

Exemplary value determinates for row 622 will now be described. The number of determined locations in zone 2 (row 622, column 608) is determined by counting the number of counting the number of instances in the second through eleventh entries of column 606 in which the zone number is 2, which is 10. The determined threshold number for zone 2 (row 622, column 608) is determined based on the previous zone presence determination (row 621, column 612), which indicates present, and whether or not the most recent RSSI based location determination (row 622, column 604) is located within a known zone entry area, which it is not. Therefore the determined threshold number for zone 2 (row 622, column 610) is set to 2. The zone 2 device 1 presence determination entry (row 622, column 612) is determined to be present since the number of determined locations in zone 2 within the window (row 622, column 608), which is 10 is greater than the threshold (row 622, column 610, which is 2.

The number of determined locations in zone 4 (row 622, column 614) is determined by counting the number of instances in the second through eleventh entries of column 606 in which the zone number is 4, which is 0. The determined threshold number for zone 4 (row 622, column 616) is determined based on the previous zone presence determination (row 621, column 618), which indicates not present, and whether or not the most recent RSSI based location determination (row 622, column 604) is located within a known zone entry area, which it is not. Therefore the determined threshold number for zone 4 (row 622, column 616) is set to 7. The zone 4 device 1 presence determination entry (row 622, column 618) is determined to be not present since the number of determined locations in zone 4 within the window (row 622, column 614), which is 0 is not greater than the threshold (row 622, column 616), which is 7.

Exemplary value determinates for row 623 will now be described. The number of determined locations in zone 2 (row 624, column 608) is determined by counting the number of counting the number of instances in the third through twelfth entries of column 606 in which the zone number is 2, which is 9. The determined threshold number for zone 2 (row 623, column 608) is determined based on the previous zone presence determination (row 622, column 612), which indicates present, and whether or not the most recent RSSI based location determination (row 623, column 604) is located within a known zone entry area, which it is not. Therefore the determined threshold number for zone 2 (row 623, column 610) is set to 2. The zone 2 device 1 presence determination entry (row 623, column 612) is determined to be present since the number of determined locations in zone 2 within the window (row 623, column 608), which is 9 is greater than the threshold (row 623, column 610), which is 2.

The number of determined locations in zone 4 (row 624, column 614) is determined by counting the number of instances in the third through twelfth entries of column 606 in which the zone number is 4, which is 1. The determined threshold number for zone 4 (row 623, column 616) is determined based on the previous zone presence determination (row 622, column 618), which indicates not present, and whether or not the most recent RSSI based location determination (row 623, column 604) is located within a known zone entry area, which it is not. Therefore the determined threshold number for zone 4 (row 623, column 616) is set to 7. The zone 4 device 1 presence determination entry (row 623, column 618) is determined to be not present since the number of determined locations in zone 4 within the window (row 623, column 614), which is 1 is not greater than the threshold (row 623, column 616), which is 7.

The process repeats for the additional rows of table 600. It may be observed that once a device has been determined to be present, it needs a relatively larger number of out of zone location determinations in the sliding window being evaluated to be declared no longer present in the zone. It may also be observed that it is relatively difficult for a device which is determined to not be present to be determined present in a zone when the entry location is not within the known set of entry locations. This intentional selection of different threshold values for determining presence facilitates stability in the zone presence determination and allows for rejection of spurious location determinations.

Figure 7:
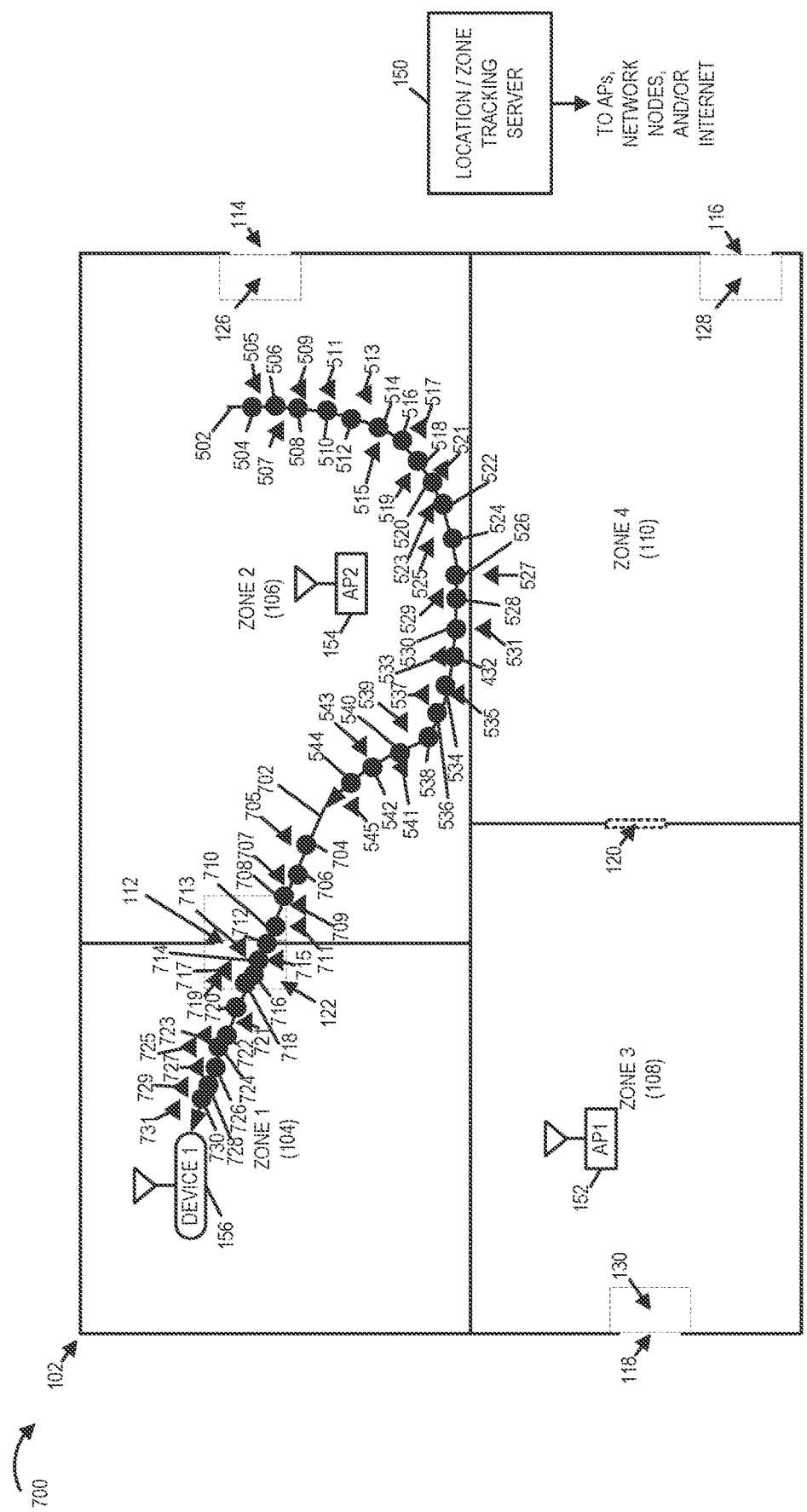
FIG. 7 is a drawing illustrating exemplary device moving from zone 2 to zone 1 via a known entry location area, e.g., a doorway for door, actual locations of the device, and RSSI based location determinations for the device, which are used to make zone presence determinations in accordance with an exemplary embodiment.

FIG. 7 is a drawing 700 illustrating exemplary device 1 156 moving from zone 2 106 to zone 1 104 via a known entry location area 122, e.g., a doorway for door 112 between zone 1 and zone 2, actual locations of device 156, and RSSI based location determinations for device 156, which are used to make zone presence determinations in accordance with an exemplary embodiment. Drawing 700 illustrates a continuation of the motion of FIG. 5. Drawing 700 illustrates device 1 156 moving within building 102 of system 100 along path 702, which a continuation of path 502 of FIG. 5. Small black circles (504, 506, 508, 510, 512, 514, 516, 518, 520, 522, 524, 526, 528, 530, 532, 534, 536, 538, 540, 542, 544, 704, 706, 708, 710, 712, 714, 716, 718, 720, 722, 724, 726, 728, 730) along paths 502 and 702 identify actual location of device 1 156 at different times. Small black triangles (505, 507, 509, 511, 513, 515, 517, 519, 521, 523, 525, 527, 529, 531, 533, 535, 537, 539, 541, 543, 545, 705, 707, 709, 711, 713, 715, 717, 719, 721, 723, 725, 727, 729, 731) are determined RSSI based device 1 locations corresponding to actual device 1 locations (504, 506, 508, 510, 512, 514, 516, 518, 520, 522, 524, 526, 528, 530, 532, 534, 536, 538, 540, 542, 544, 704, 706, 708, 710, 712, 714, 716, 718, 720, 722, 724, 726, 728, 730), respectively. The location/zone tracking server 150 makes the location determinations based on received RSSI information corresponding to device 1. In the example of FIG. 7, device 1 156 moves from zone 2 106 to zone 1 104, with the device passing through door 112 and entering known zone 1 entry area 122 (passage way between zone 1 and zone 2).

FIG. 8 is a drawing of a table 800 used to illustrate exemplary zone presence threshold number determinations and exemplary zone presence determinations, corresponding the example of FIG. 7, in accordance with an exemplary embodiment. Table 800 includes: a first column 802 including actual device 1 locations (each entry is identified by the element reference number of FIG. 8), and a second column 804 including determined device 1 locations (each entry identified by the element reference number of FIG. 8). Entries in columns 802 and 804 represent, e.g., GPS information, e.g. GSP coordinates, or latitude/longitude coordinates or predetermined grid coordinates. Third column 806 in table 800 identifies the zone in which the determined device 1 location of column 804 is located in. Fourth column 808 in table 800 identifies the number of determined locations in zone 2 within a window of size 10. Fifth column 810 in table 800 identifies the determined threshold number for a zone 2 presence determination for device 1. Sixth column 812 in table 800 identifies zone 1 device 1 presence determination results. Seventh column 814 in table 800 identifies the number of determined locations in zone 1 within a window of size 10. Eighth column 816 in table 800 identifies the determined threshold number for a zone 1 presence determination for device 1. Ninth column 818 in table 800 identifies zone 1 device 1 presence determination results.

The values in table 800 of FIG. 8 are determined in a similar manner to those described with respect to table 600 of FIG. 8. Some difference, illustrating various features will now be described. The determined threshold number for zone 1 (row 850, column 816) is determined to be 3, since the previous presence determination (row 849, column 818) indicates not present, the zone in which the determined device 1 location is located (row 850, column 806) indicates zone 1, and the determined device 1 location (row 850, column 804), (FIG. 7 reference number 713) is located within zone 1 entry area 122, and the location/zone tracking server is aware that the location 713 is within entry area 122 for zone 1, and determines to use value 3, rather than value 7, for the threshold. This lower threshold value facilitates rapid presence determination in the new zone since the entry is through a known entry area, and the likelihood that the device has entered the new zone is high in comparison to when the device shows up in a new zone via an area which is not known to be an entry area for the zone.

In row 856 it may be observed that the zone 1 device 1 presence determination changes to present, since the number of determined location in zone 1 within the sliding window of size 10 is 4 which is greater than the threshold of 3. In row 858 it may be observed that the determined threshold number for zone 1 changes to 2, previously determined presence determination for zone 1 (row 856, column 818) indicates present.

It may also be observed that in the example of FIGS. 7 and 8, there is an overlap time interval corresponding to rows (856, 858, 860 and 862) in which device 1 is determined to be present in two zones (zone 2 and zone 1) at the same time.

Figure 9:
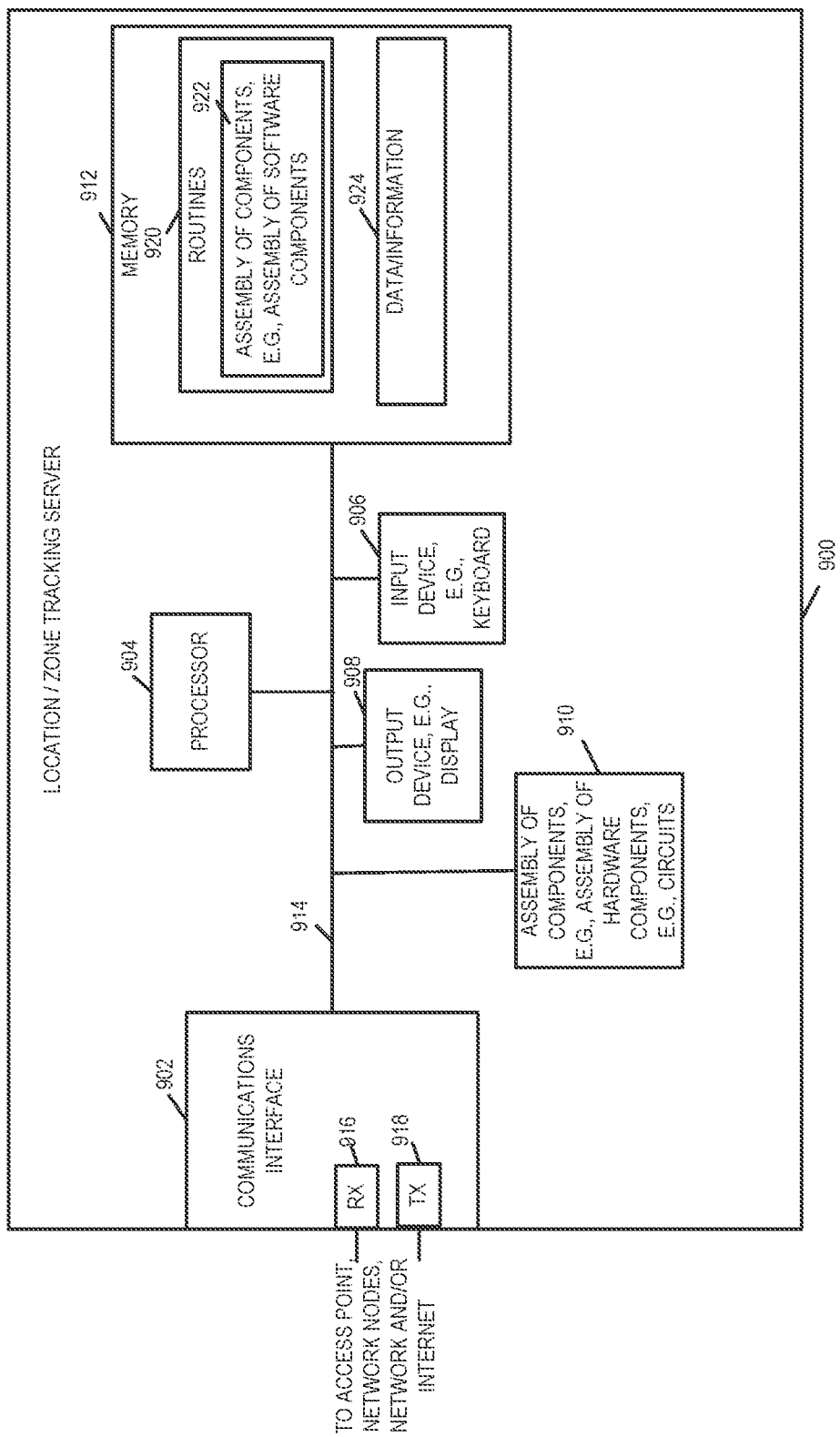
FIG. 9 is a drawing of an exemplary location/zone tracking server in accordance with an exemplary embodiment.
Figure 10A:
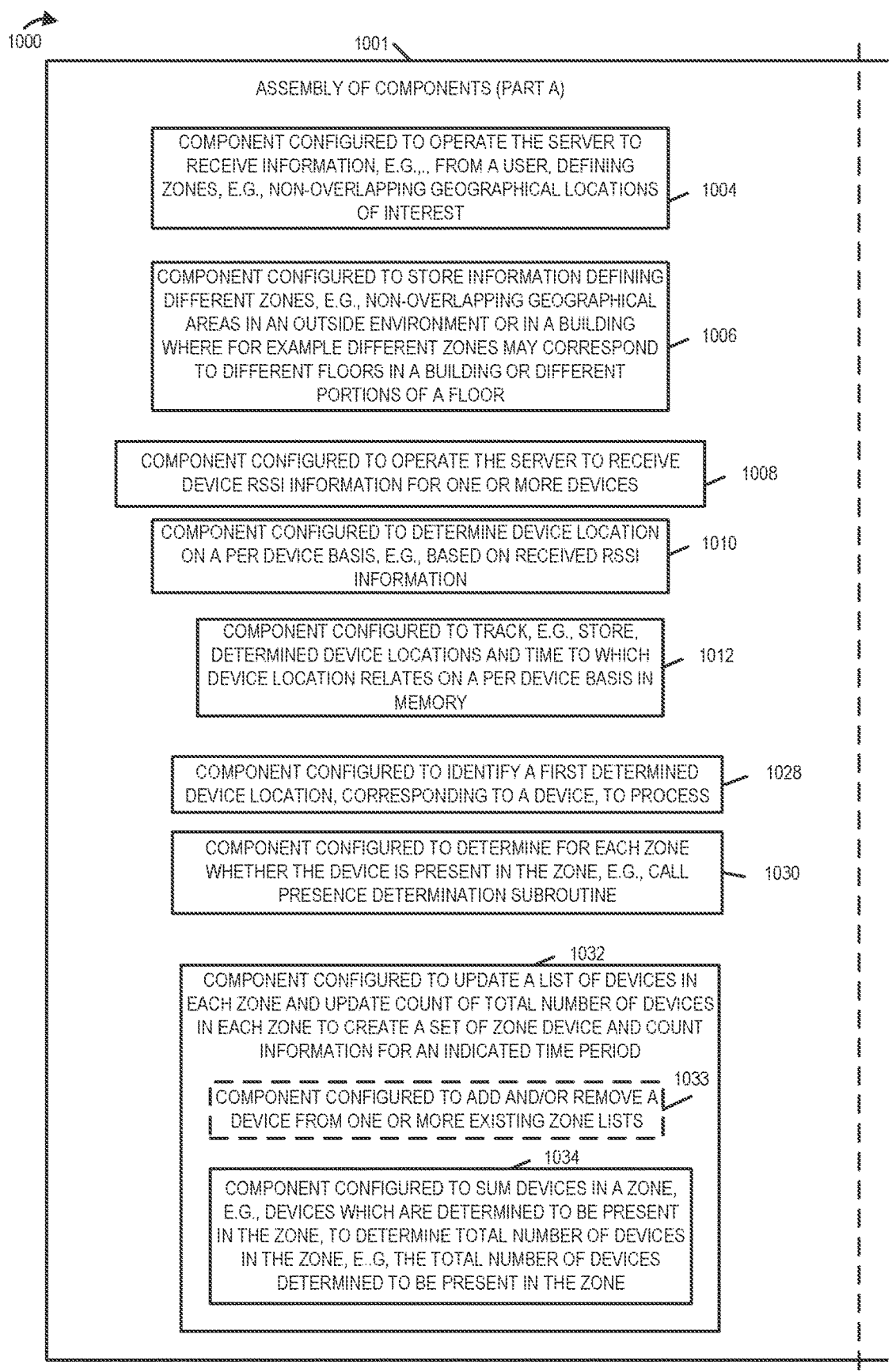
FIG. 10A is a drawing of a first part of an exemplary assembly of components, which may be included in a location/zone tracking server, in accordance with an exemplary embodiment.
Figure 10B:
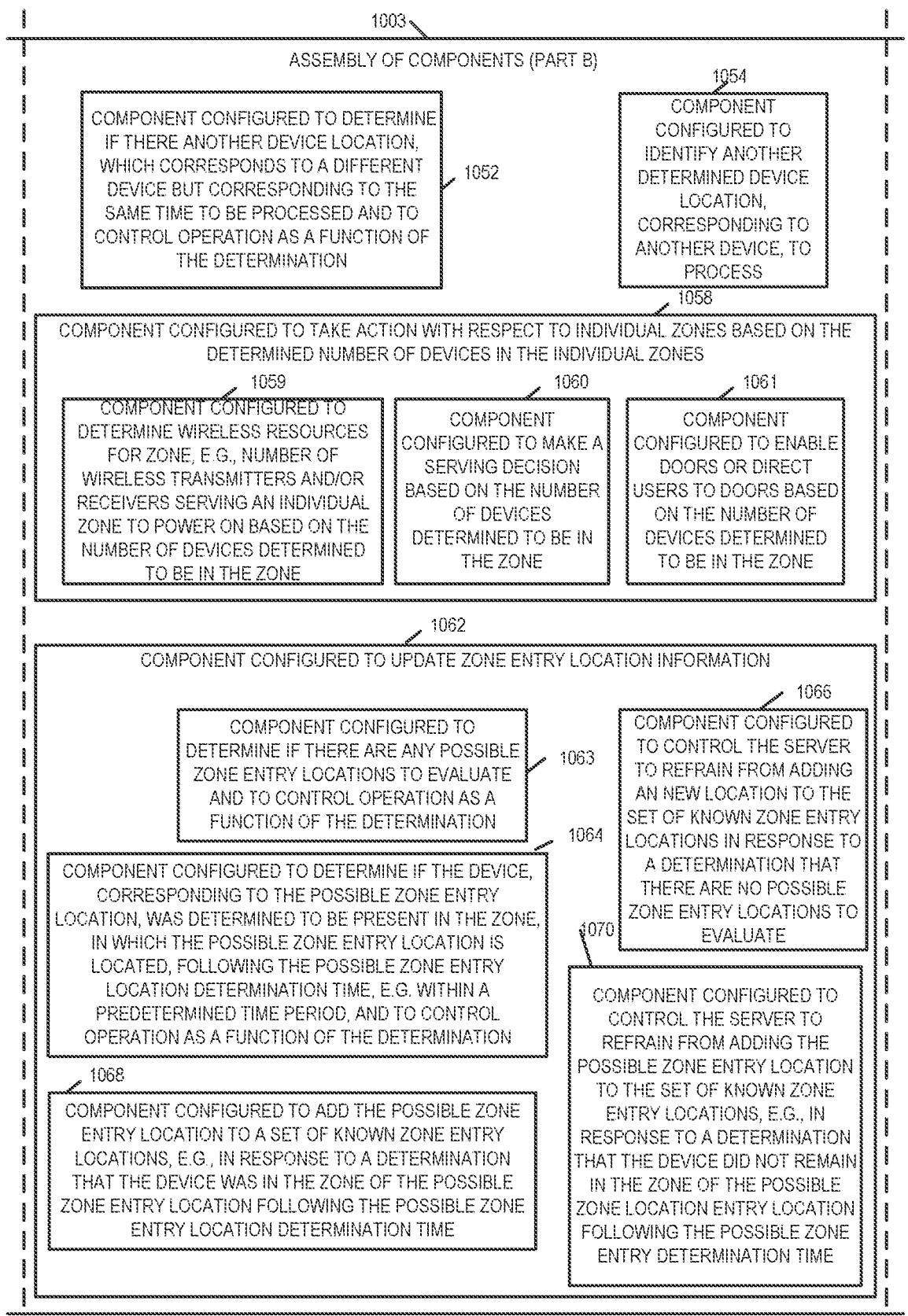
FIG. 10B is a drawing of a second part of an exemplary assembly of components, which may be included in a location/zone tracking server, in accordance with an exemplary embodiment.
Figure 10C:
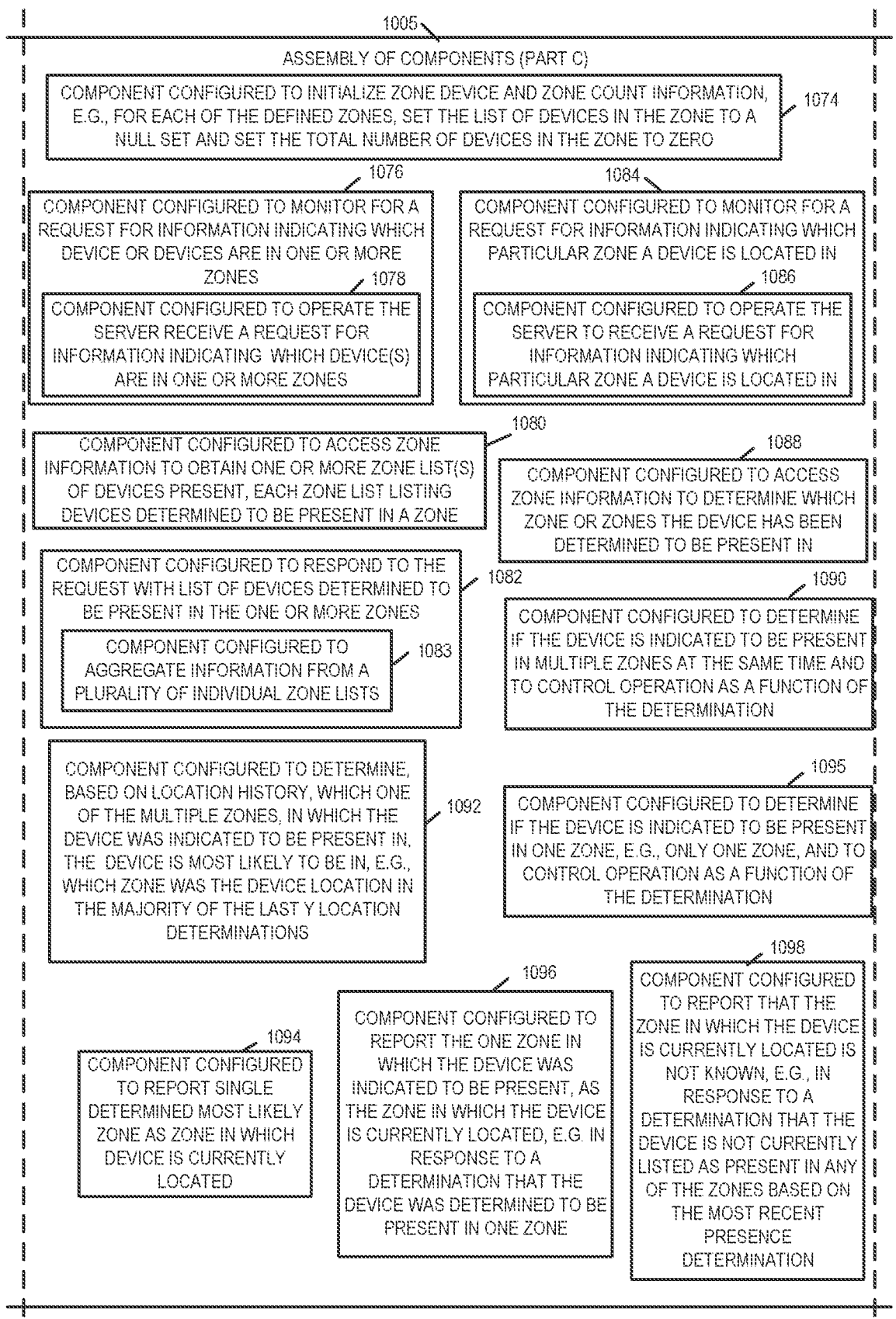
FIG. 10C is a drawing of a third part of an exemplary assembly of components, which may be included in a location/zone tracking server, in accordance with an exemplary embodiment.
Figure 10D:
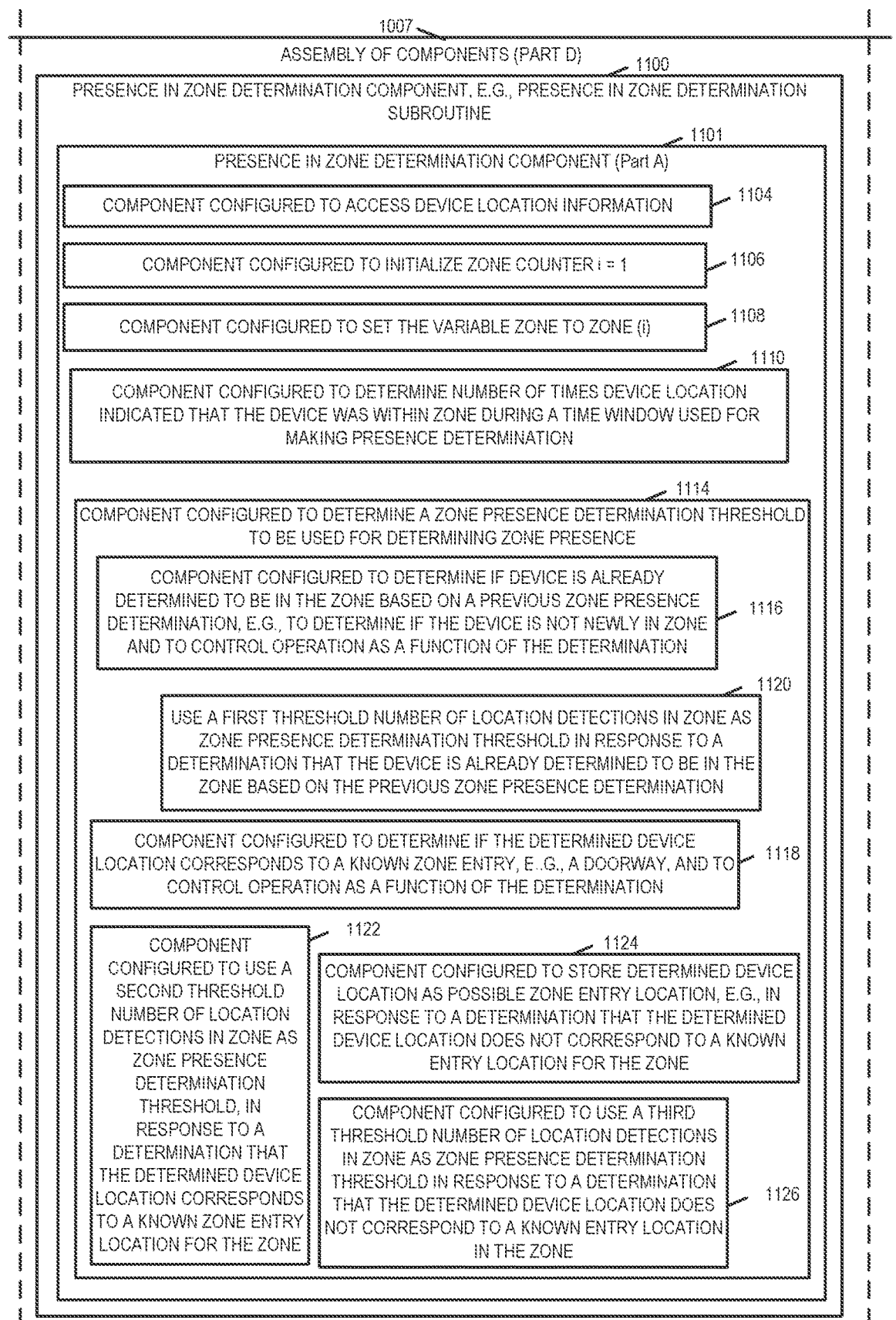
FIG. 10D is a drawing of a fourth part of an exemplary assembly of components, which may be included in a location/zone tracking server, in accordance with an exemplary embodiment.
Figure 10E:
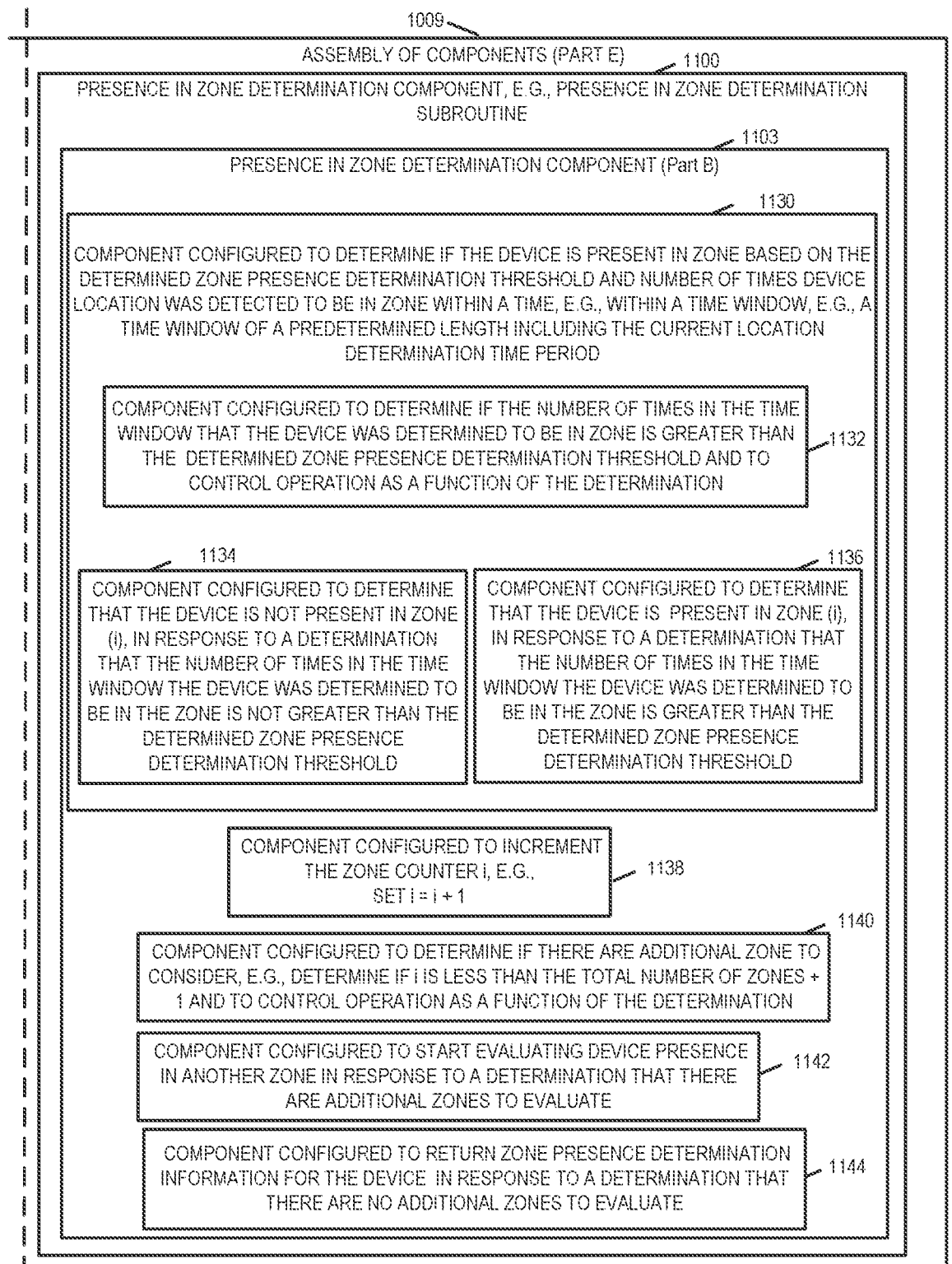
FIG. 10E is a drawing of a fifth part of an exemplary assembly of components, which may be included in a location/zone tracking server, in accordance with an exemplary embodiment.

FIG. 9 is a drawing of an exemplary location/zone tracking server 900 in accordance with an exemplary embodiment. Location/zone tracking server 900 is, e.g., location/zone tracking server 150 of FIG. 1, FIG. 5, and/or FIG. 7. Server 900 includes a communications interface 902, a processor 904, e.g., a CPU, an input device 906, e.g., a keyboard, an output device 908, e.g., a display, and assembly of components 910, e.g., an assembly of hardware components, e.g., circuits, and memory 912 coupled together via bus 914 over which the various elements (902, 904, 906, 908, 910, 912) of the server 900 may interchange data and information. Communications interface 902 includes a receiver 916, via which the server 900 may receive signals including messages from other devices, e.g. access points, other networks nodes, etc., and a transmitter 918, via which the server may send signals including messages to other devices. Communications interface 902, e.g. an Ethernet interface, a Power over Ethernet interface, or another interface, couples the server 900 to access points, network nodes, other nodes, one or more networks, and/or the Internet. Exemplary received signals received via receiver 916 include signals communicating information defining zones, a signal communicating device RSSI information corresponding to a wireless device, a signal communicating a request for information indicating which device or devices are in one or more zones, and a signal communicating a request for information indicating a request for information indicating which particular zone a device is located in. Exemplary transmitted signals sent via transmitter 918 include signals communicating a report communicating the single determined most likely zone in which a device is currently located, and signals communicating a list of devices determined to be in one or more zones.

Memory 912 includes routines 920 and data/information 924. Routines 920 includes assembly of components 922, e.g., an assembly of software components.

FIG. 10, comprising the combination of FIG. 10A, FIG. 10B, FIG. 10C, FIG. 10D and FIG. 10E, is a drawing of an exemplary assembly of components 1000, comprising Part A 1001, Part B 1003, Part C 1005, Part D 1007 and Part E 1009, in accordance with an exemplary embodiment. Assembly of components 1000 is, e.g., included in location/zone tracking server 150 of FIGS. 1, 5, and 7 and/or in location/zone tracking server 900 of FIG. 9.

Exemplary assembly of components 1000 may be in server, e.g. server 900, and implement steps of an exemplary method, e.g., steps of the method of the flowchart 200 of FIG. 2 and/or flowchart 300 of FIG. 3.

The components in the assembly of components 1000 can, and in some embodiments are, implemented fully in hardware within the processor 904, e.g., as individual circuits. The components in the assembly of components 1000 can, and in some embodiments are, implemented fully in hardware within the assembly of components 910, e.g., as individual circuits corresponding to the different components. In other embodiments some of the components are implemented, e.g., as circuits, within the processor 904 with other components being implemented, e.g., as circuits within assembly of components 910, external to and coupled to the processor 904. As should be appreciated the level of integration of components on the processor and/or with some components being external to the processor may be one of design choice. Alternatively, rather than being implemented as circuits, all or some of the components may be implemented in software and stored in the memory 912 of the server 900, with the components controlling operation of the server to implement the functions corresponding to the components when the components are executed by a processor, e.g., processor 904. In some such embodiments, the assembly of components 1000 is included in the memory 912 as assembly of components 922. In still other embodiments, various components in assembly of components 1000 are implemented as a combination of hardware and software, e.g., with another circuit external to the processor 904 providing input to the processor 904 which then under software control operates to perform a portion of a component's function. While processor 904 is shown in the FIG. 9 embodiment as a single processor, e.g., computer, it should be appreciated that the processor 904 may be implemented as one or more processors, e.g., computers.

When implemented in software the components include code, which when executed by the processor 904, configure the processor 904 to implement the function corresponding to the component. In embodiments where the assembly of components 1000 is stored in the memory 912, the routines 920 are computer program product comprising a computer readable medium comprising code, e.g., individual code for each component, for causing at least one computer, e.g., processor 904, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the server 900, or elements therein such as the processor 904, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method, e.g., steps of the method of flowchart 200 of FIG. 2 and/or the steps of the method of flowchart 300 of FIG. 3, which are performed by the server 900, and/or described or shown with respect to any of the other figures.

Assembly of components 1000 includes a component 1004 configured to operate the server to receive, e.g., via receiver 916 or via input device 606, information, e.g., from a user, defining zones, e.g., non-overlapping geographical locations of interest, and a component 1006 configured to store information defining different zones, e.g., non-overlapping geographical locations, e.g., areas, of interest, e.g., in an outside environment and/or in a building where, e.g., different zones may correspond to different floors or different portions of a floor. Assembly of components 1000 further includes a component 1008 configured to operate the server to receive, e.g., via receiver 916, device RSSI information for one or more devices, a component 1010 configured to determine device location on a per device basis, e.g., based on the received RSSI information, and a component 1012 configured to track, e.g., store, determined device locations and a time to which each determined device locations relates on a per device basis in memory. Assembly of components further includes a component 1028 configured to identify a first determined device location corresponding to a device to process 1028, said first determined location being included in a time window of determined locations corresponding to the device, said window of determined locations for the device are to be used to determine zone presence for the device. Assembly of components 1000 further includes a component 1030 configured to determine for each zone whether the device is present in the zone, e.g., a component configured to call a presence determinate routine, e.g., presence in zone determination subroutine 1100, and to receive presence determination results corresponding to the device which are returned from the presence determination routine.

Assembly of components 1000 further includes a component 1032 configured to update a list of devices in each zone and update counts of the total number of devices in each zone to create a set of zone device and count presence information for an indicated time period, e.g., a list of devices determined to be present in for each zone and a number of devices determined to be present in each zone. In some embodiments, component 1032 includes a component 1033 configured to add and/or remove a device from one or more existing zone lists, e.g., existing zone lists corresponding a previous time period for which presence information was determined. In some embodiments, complete new lists are determined for each time period in which device presence is evaluated. Component 1032 includes component 1034 configured to sum devices determined to sum devices in a zone, e.g., sum devices which are determined to be present in the zone, to determine the total number of devices in the zone, e.g., the total number of devices determined to be present in the zone.

Assembly of components 1000 includes a component 1052 configured to determine if there is another device location which corresponds to a different device but corresponding to the same time to be processed and to control operation as a function of the determination, and a component 1054 configured to identify another determined device location, corresponding to another device, to process.

Assembly of components 1000 further includes a component 1058 configured to take action with respect to individual zones based on the determined number of devices in the individual zones. Component 1058 includes a component 1059 configured to determine wireless resources for a zone, e.g., a number of wireless transmitters and/or wireless receivers serving an individual zone to power on based on the number of devices determined to be in the zone, e.g., determined to be present in the zone, a component 1060 configured to make a serving decision based on the number of devices determined to be in the zone, e.g., determined to be present in the zone, and a component 1061 configured to enable door or direct uses to doors based on the number of devices determined to be in the zone, e.g., determined to be present in the zone.

Assembly of components 1000 further includes a component 1062 configured to update zone entry location information. Component 1062 includes a component 1063 configured to determine if there are any possible zone entry location to evaluate and to control operation as a function of the determination, a component 1064 configured to determine if the device, corresponding to the possible zone entry location, was determined to be present in the zone, in which the possible zone entry location is located, following the possible zone entry location determination time, e.g., within a predetermined time period, and to control operation as a function of the determination. Component 1062 further includes a component 1068 configured to add the possible zone entry location to a set of known zone entry locations, e.g., in response to a determination that the device was in the zone in which the possible zone entry location is located following the possible zone entry location determination time. Component 1062 further includes a component 1066 configured to control the server to refrain from adding a new location to the set of known zone entry locations in response to a determination that there are no possible zone entry locations to evaluate and a component 1070 configured to control the server to refrain from adding the possible zone entry location being evaluated to the set of known zone entry locations, e.g. in response to a determination that the device did not remain in the zone of the possible zone entry location following the possible zone entry determination time.

Assembly of components 1000 further includes a component 1074 configured to initialize zone device and zone count information, e.g., for each of the defined zones, set the list of devices in the zone to a null set and set the total number of devices in the zone to zero. Assembly of components 1000 further includes a component 1076 configured to monitor for a request for information indicating which device or devices are in one or more zones. Component 1078 includes a component configured to operate the server to receive a request for information indicating which device or devices are in one or more zones. Assembly of components 1000 further includes a component 1080 configured to access zone information to obtain one or more zone list(s) of devices present, each zone list listing devices determined to be present in a zone, and a component 1082 configured to respond to the request list with a list of devices determined to be present in the one or more zones. Component 1082 includes a component 1083 configured to aggregate information from a plurality of individual zone lists. In some embodiments component 1082 is configured to operate the server 900 to generate a response message including the list of devices determined to be present in response to a previously received request and to transmit the response message via transmitter 918.

Assembly of components 1000 further includes a component 1084 configured to monitor for a request for information indicating which particular zone a device is located in. Component 1084 includes a component 1086 configured to operate the server to receive, e.g. via receiver 916, a request for information indicating which particular zone a device is located in. Assembly of components 1000 further includes a component 1088 configured to access zone information to determine which zone a device or devices has been determined to be in, e.g., based on the most recent zone determinations corresponding to the device. Assembly of components 1000 further includes a component 1090 configured to determine if the device is indicated to be present in multiple zones at the same time and to control operation as a function of the determination, a component 1092 configured to determine, based on the location history, which one of the multiple zones, in which the device was indicated to be present in, the device is most likely to be in, e.g. which zone was the device location in the majority of the last Y location determinations, and a component 1094 configured to report the single determined most likely zone as the zone in which the device is currently located. In some embodiments, component 1094 is configured to generate a response message and operate a transmitter, e.g., transmitter 918, to send the generated response message, said generated response message reporting the single determined most likely zone in which the device is currently located.

Assembly of components 1000 further includes a component 1095 configured to determine if the device is indicated to be present in one zone, e.g., only one zone, and to control operation as a function of the determination, a component 1096 configured to report the one zone in which the device was determined to be present, as the zone in which the device is currently located, e.g., in response to a determination that the device was determined to be present in one zone, and a component 1098 configured to report that the zone in which the device is currently located is not known, e.g., in response to a determination that the device is not currently listed as present in any of the zones based on the most recent presence determination.

Assembly of components 1000 further includes a presence in zone determination component 1100, e.g., a presence in zone determination subroutine, comprising Part A 1101 and Part B 1103. Presence in zone determination component 1100 includes a component 1104 configured to access device location information, a component 1106 configured to initialize zone counter i=1, a component 1108 configured to set the variable zone to zone(i), a component 1110 configured to determine the number of time device location indicated that the device was within zone during a time window used for making zone presence determination, and a component 1114 configured to determine a zone presence determination threshold to be used for determining zone presence. Component 1114 includes a component 1116 configured to determine if the device is already in the zone based on a previous zone presence determination, e.g. to determine if the device is not newly in the zone and to control operation as a function of the determination, a component 1120 configured to use a first threshold number of location detections in zone as the zone presence determination threshold in response to a determination that the device is already determined to be in the zone based on the previous zone presence determination, a component 1118 configured to determine if the determined device location corresponds to a known zone entry location, e.g., a doorway, and to control operation as a function of the determination, a component 1122 configured to use a second threshold number of location detections in zone as the zone presence determination threshold, in response to a determination that the determined device location corresponds to a known zone entry location for the zone, a component 1124 configured to store the determined device location as a possible zone entry location, e.g. in response to a determination that the determined device location does not correspond to a known entry location for the zone, and a component 1126 configured to use a third threshold number of location detections in zone as the zone presence determination threshold in response to a determination that the determined device location does not correspond to a known entry location in the zone.

Component 1100 further includes a component 1130 configured to determine if the device is present in zone based on the determined zone presence determination threshold and the number of times the device location was detected to be in zone within a time, e.g., within a time window, e.g., a time window of a predetermined time including the current location determination time period. Component 1130 includes a component 1132 configured to determine if the number of times in the time window that the device was determined to be in zone is greater than the determined zone presence determination threshold and to control operation as a function of the determination, a component 1134 configured to determine that the device is not present in the zone(i) in response to a determination that the number of times the device was determined to be in the zone is not greater than the determined zone presence determination threshold, and a component 1136 configured to determine that the device is present in the zone(i) in response to a determination that the number of times the device was determined to be in the zone is greater than the determined zone presence determination threshold.

Component 1100 further includes a component 1138 configured to increment the zone counter i, e.g., set i=i+1, a component 1140 configured to determine if there are additional zones to consider, e.g., determine if the zone counter variable i is less than the total number of zones+1, and to control operation as a function of the determination, a component 1142 configured to start evaluating device presence in another zone in response to a determination that there are additional zones to evaluate, and a component 1144 configured to return zone presence determination information for the device in response to a determination that there are not additional zones to evaluate.

Figure 11:
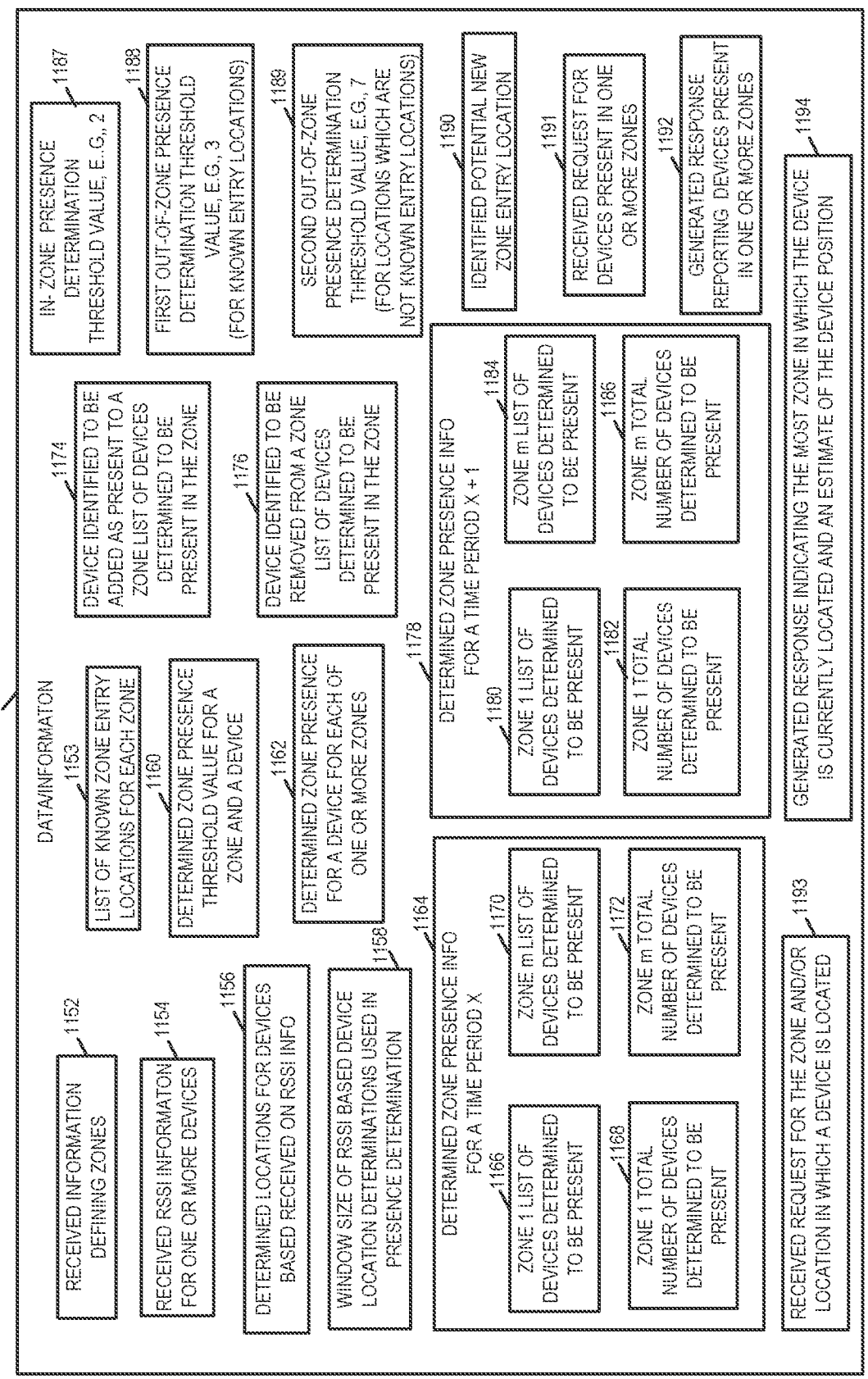
FIG. 11 is a drawing of exemplary data/information that may be included in a location/zone tracking server in accordance with an exemplary embodiment.

FIG. 11 is a drawing of exemplary data/information 1150, which may be included in a location/zone tracking server in accordance with an exemplary embodiment. Data/information 1150 is, e.g., data/information 924 or included in data/information 924, of location/zone tracking server 900 of FIG. 9. Data/information 1150 includes received information defining zones 1152, a list of known zone entry locations for each zone 1153, received RSSI information for one or more devices 1154, determined locations for devices based on the received RSSI information 1156, e.g., a table including determined location for each of a plurality of wireless devices being tracked, e.g., with location determinations being performed at predetermined time intervals and/or in accordance with a predetermined schedule. Data/information 1150 further includes a window size of RSSI based location determinations used in device presence determinations 1158. In some embodiments, the window size is a function of the type of device and/or the speed of the device.

Data/information 1150 further includes a determine zone presence threshold value for a zone and a device 1160, e.g., which is an intermediate value determined and used by a zone presence determination subroutine, and determined zone presence for a device for each of one or more zones 1162, e.g., output information from a zone presence determination subroutine.

Data/information 1150 further includes determined zone presence information for a time period X 1164. Determined zone presence information for a time period X 1164 includes information corresponding to a plurality of zones ((zone 1 list of devices determined to be present in zone 1 1166, a zone 1 total number of devices determined to be present 1168), . . . , (zone m list of devices determined to be present in zone m 1170, a zone m total number of devices determined to be present 1172)). Data/information 1150 further includes information identifying a device, which was determined, to be added as present to a zone list of devices determined to be present in the zone 1174, and information identifying a device, which was determined to be removed from a zone list of devices determined to be present in the zone 1176. Data/information 1150 further includes determined zone presence information for a time period X+1 1178. Determined zone presence information for a time period X+1 1178 includes information corresponding to a plurality of zones ((zone 1 list of devices determined to be present in zone 1 1180, a zone 1 total number of devices determined to be present 1182), . . . , (zone m list of devices determined to be present in zone m 1184, a zone m total number of devices determined to be present 1186)).

Data/information 1150 further includes an in-zone presence determination threshold value 1187, e.g., a value of 2, a first out-of-zone presence determination threshold value 1188, e.g., a value to be used for known zone entry locations, e.g., a value of 3, and a second out-of-zone presence determination threshold value 1189, e.g., a value to be used for locations which are not known zone entry locations, e.g., a value of 7. Data/information 1150 further includes an identified potential new zone entry location 1190, a received request for devices present in one or more zones 1191, a generated response reporting devices present in one or more zones 1192, a received request for the zone and/or location, e.g. precise location within the zone, in which the device is located 1193, and a generated response indicating the most likely zone in which the device is currently located and an estimate of the device position 1194, e.g., based on a predetermined number of recent device location determinations.

Figure 12:
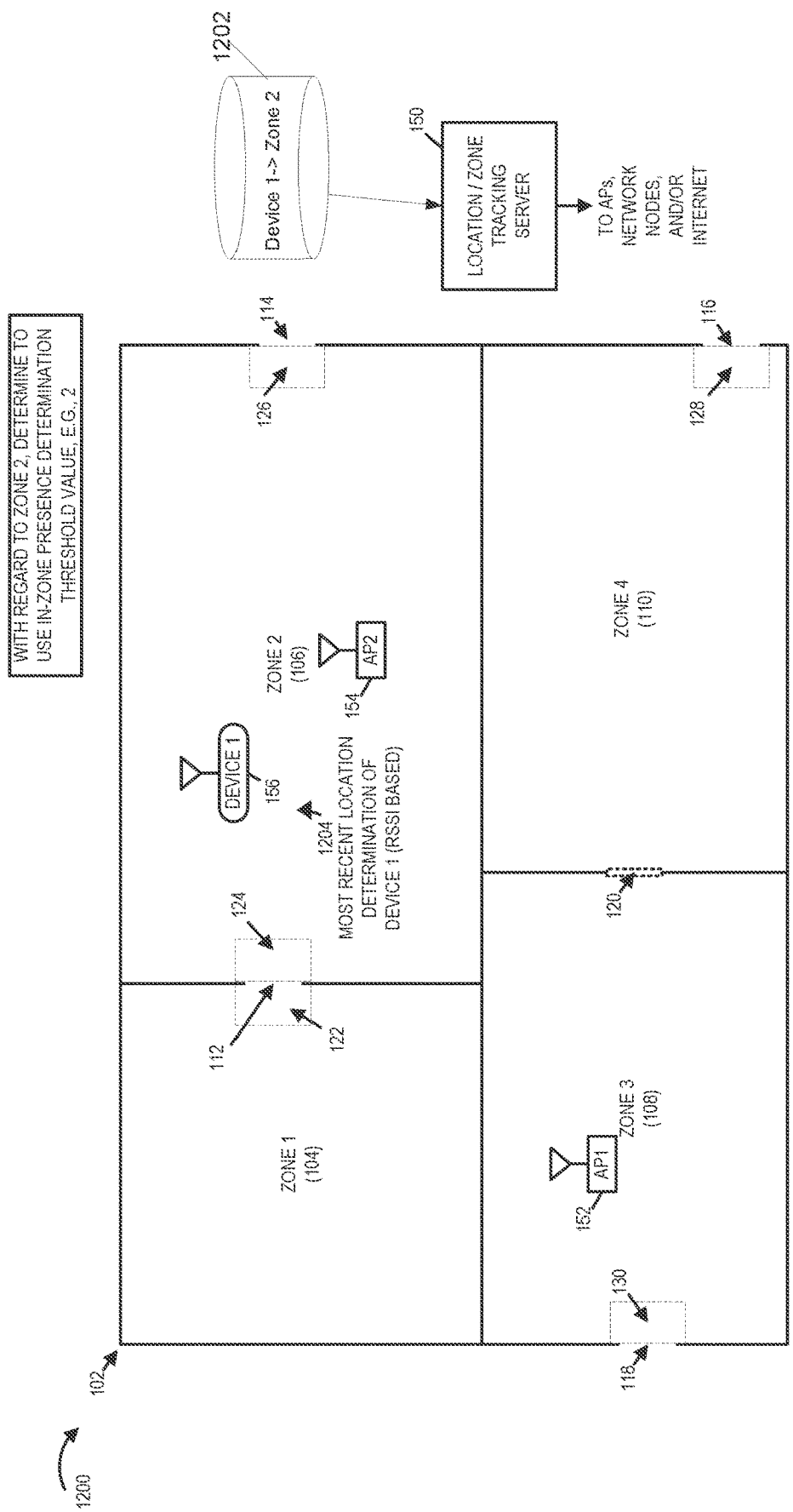
FIG. 12 is a drawing illustrating a first zone present determination threshold being used by a device, said first zone presence determination threshold being an in-zone threshold.

FIG. 12 is a drawing 1200 illustrating a first zone present determination threshold being used by a device, said first zone presence determination threshold being an in-zone threshold. Drawing 1200 illustrates exemplary device 1 156 of system 100 of FIG. 1, which has been located in zone 2 106 for a long time, e.g., greater than a threshold number of RSSI based location determination times. Location/zone tracking server 150 has previously determined that device 1 156 is present in zone 2, is not present in zone 1, is not present in zone 3, and is not present in zone 4. Stored zone presence information 1202, e.g., stored in location/zone tracking server 150 or in the illustrated data store, indicates that device 1 156 is only present in zone 2. A most recent RSSI based location determination of device 1 156, performed by location/zone tracking server 150, is indicated by solid black triangle 1204, and the determined location 1204 is located within zone 2 106. The location/zone tracking server 150 is aware that determined location 1204 is within zone 2 106 since the server includes information, e.g. geographical information, corresponding to the zones. In this example, the location/zone tracking server 150 determines to use an in-zone presence determination threshold, e.g., a value of 2, with regard to performing a new zone presence determination corresponding to zone 2, since the stored zone presence information indicates that device 1 156 is present in zone 2.

Figure 13:
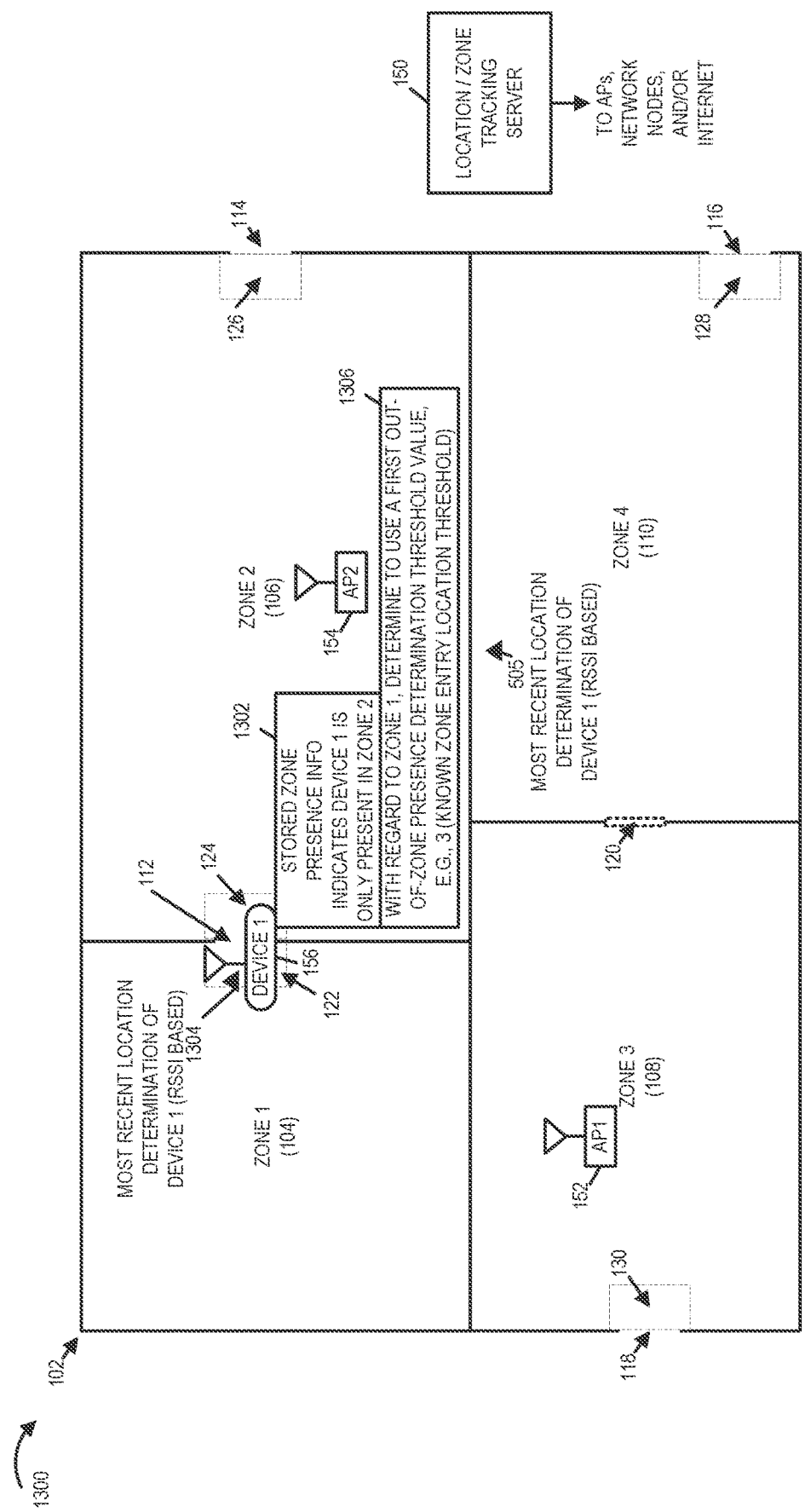
FIG. 13 is a drawing illustrating a second zone presence determination threshold being used by the device, said second zone presence determination threshold being a first out-of-zone threshold corresponding to a determined device location being within a known zone entry area.

FIG. 13 is a drawing 1300 illustrating a second zone presence determination threshold being used by the device, said second zone presence determination threshold being a first out-of-zone threshold corresponding to a determined device location being within a known zone entry area. Drawing 1300 illustrates exemplary device 1 156 of system 100 of FIG. 1, which has been located in zone 2 106 for a long time, e.g., greater than 10 RSSI based location determination times. Location/zone tracking server 150 has previously determined that device 1 156 is present in zone 2, is not present in zone 1, is not present in zone 3, and is not present in zone 4. Stored zone presence information, e.g., stored in location/zone tracking server 150, indicates that device 1 156 is only present in zone 2, as indicated by box 1302. The most recent RSSI based location determination of device 1 156, performed by location/zone tracking server 150, is indicated by solid black triangle 1304, and the determined location 1304 is located within zone 1 106. The location/zone tracking server 150 is aware that determined location 1304 is within zone 1 104 since the server includes information, e.g. geographical information, corresponding to the zones. Determined location 1304 is within known zone entry area 122, which is a zone entry area of zone 1 104. The location/zone tracking server 150 is also aware that determined location 1304 is within a known zone entry area for zone 1 104 since the server includes information, e.g. geographical information corresponding to known zone entry locations. In this example, the location/zone tracking server 150 determines to use a first out-of-zone presence determination threshold, e.g., a value of 3, with regard to performing a new zone presence determination corresponding to zone 1 104, since the stored zone presence information indicates that device 1 156 is not present in zone 1, and the most recent RSSI based location determination for device 1 1304 is located within a known zone entry area for zone 2, which is area 122.

Figure 14:
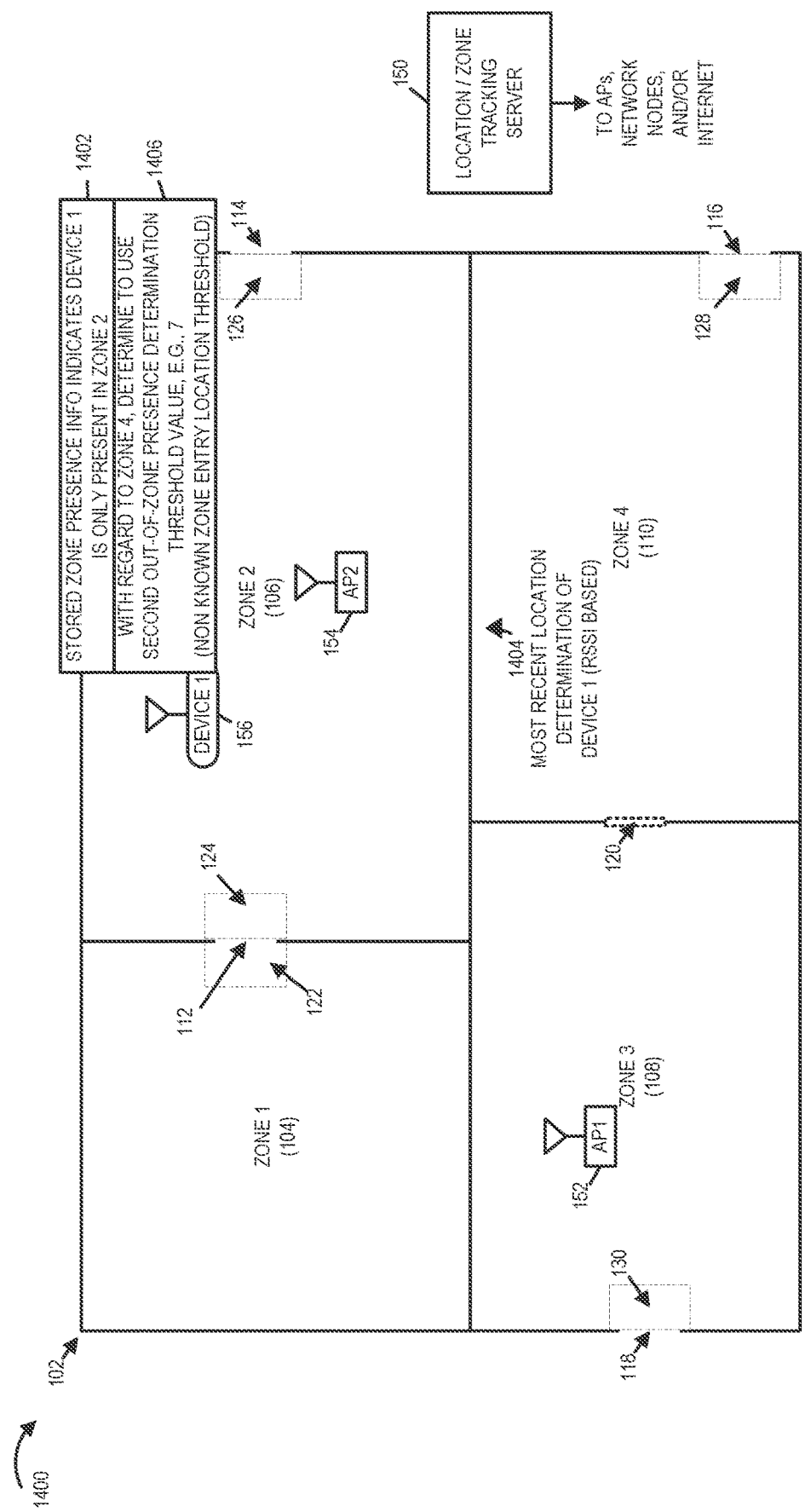
FIG. 14 is a drawing illustrating a third zone presence determination threshold being used by the device, said third zone presence determination threshold being a second out-of-zone threshold corresponding to a determined device location being outside known zone entry area within the zone.

FIG. 14 is a drawing 1400 illustrating a third zone presence determination threshold being used by the device, said third zone presence determination threshold being a second out-of-zone threshold corresponding to a determined device location being outside known zone entry area within the zone. Drawing 1400 illustrates exemplary device 1 156 of system 100 of FIG. 1, which has been located in zone 2 106 for a long time, e.g., greater than 10 RSSI based location determination times. Location/zone tracking server 150 has previously determined that device 1 156 is present in zone 2, is not present in zone 1, is not present in zone 3, and is not present in zone 4. Stored zone presence information, e.g., stored in location/zone tracking server 150, indicates that device 1 156 is only present in zone 2, as indicated by box 1402. The most recent RSSI based location determination of device 1 156, performed by location/zone tracking server 150, is indicated by solid black triangle 1404, and the determined location 1404 is located within zone 4 110. The location/zone tracking server 150 is aware that determined location 1404 is within zone 4 110 since the server includes information, e.g. geographical information, corresponding to the zones. The location/zone tracking server 150 is also aware that determined location 1404 is not within a known zone entry area for zone 4 110 since the server includes information, e.g. geographical information corresponding to known zone entry locations. In this example, the location/zone tracking server 150 determines to use a second out-of-zone presence determination threshold, e.g., a value of 7, with regard to performing a new zone presence determination corresponding to zone 4 110, since the stored zone presence information indicates that device 1 156 is not present in zone 4 110, and the most recent RSSI based location determination for device 1 1404 is not located within a known zone entry area for zone 4 110.

Figure 15:
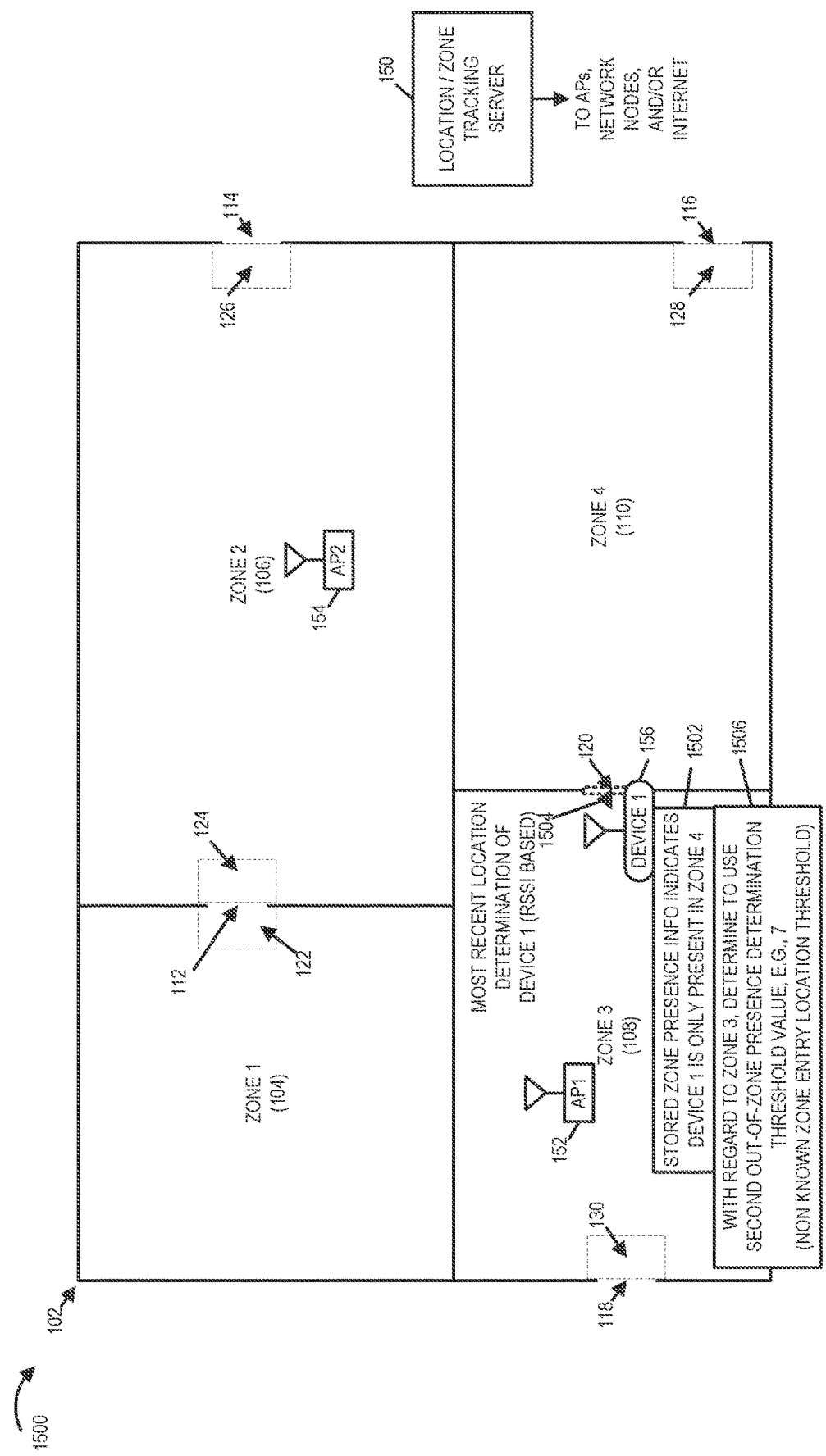
FIG. 15 is a drawing illustrating another example of the third zone presence determination threshold being used by the device, said third zone presence determination threshold being a second out-of-zone threshold corresponding to a determined device location being outside known zone entry area within the zone.
Figure 16A:
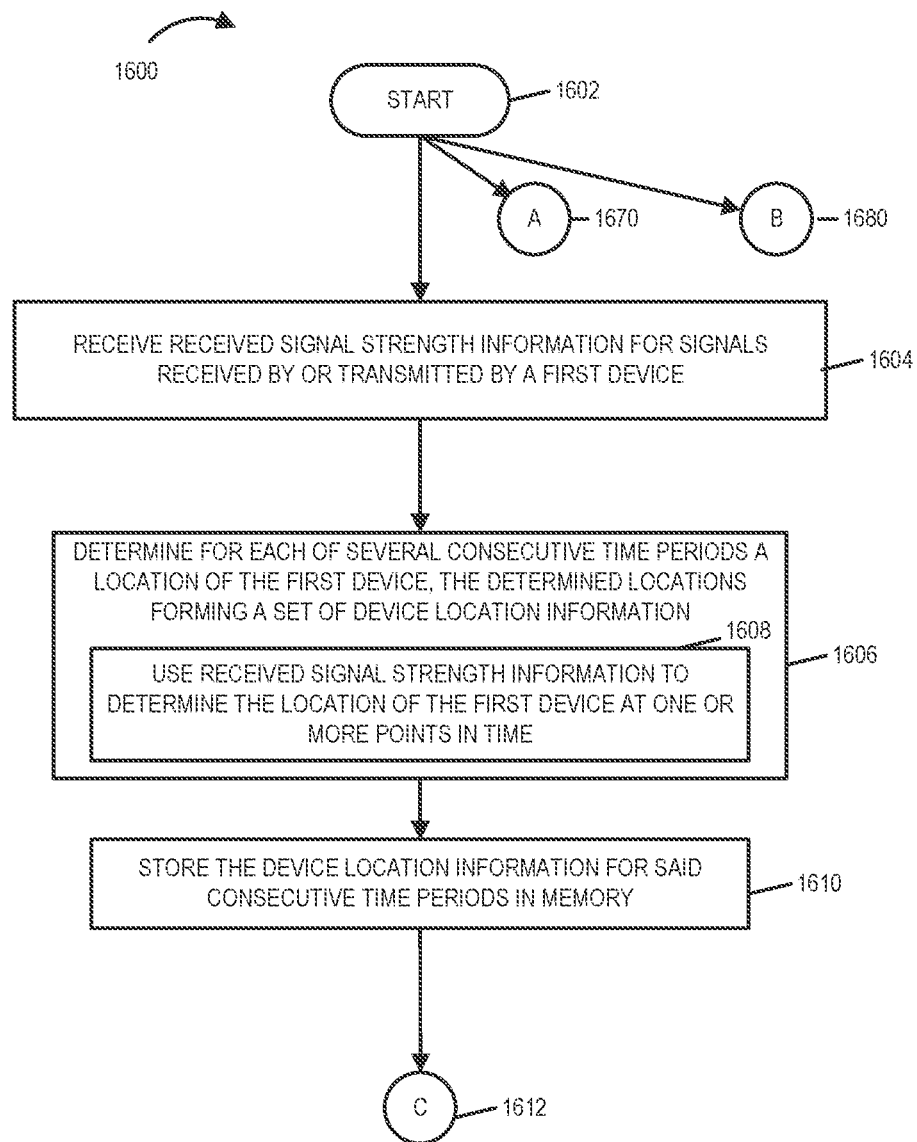
FIG. 16A is a first part of a flowchart of an exemplary method of operating a device, e.g., a server, e.g., a location/zone tracking server, in accordance with an exemplary embodiment.
Figure 16B:
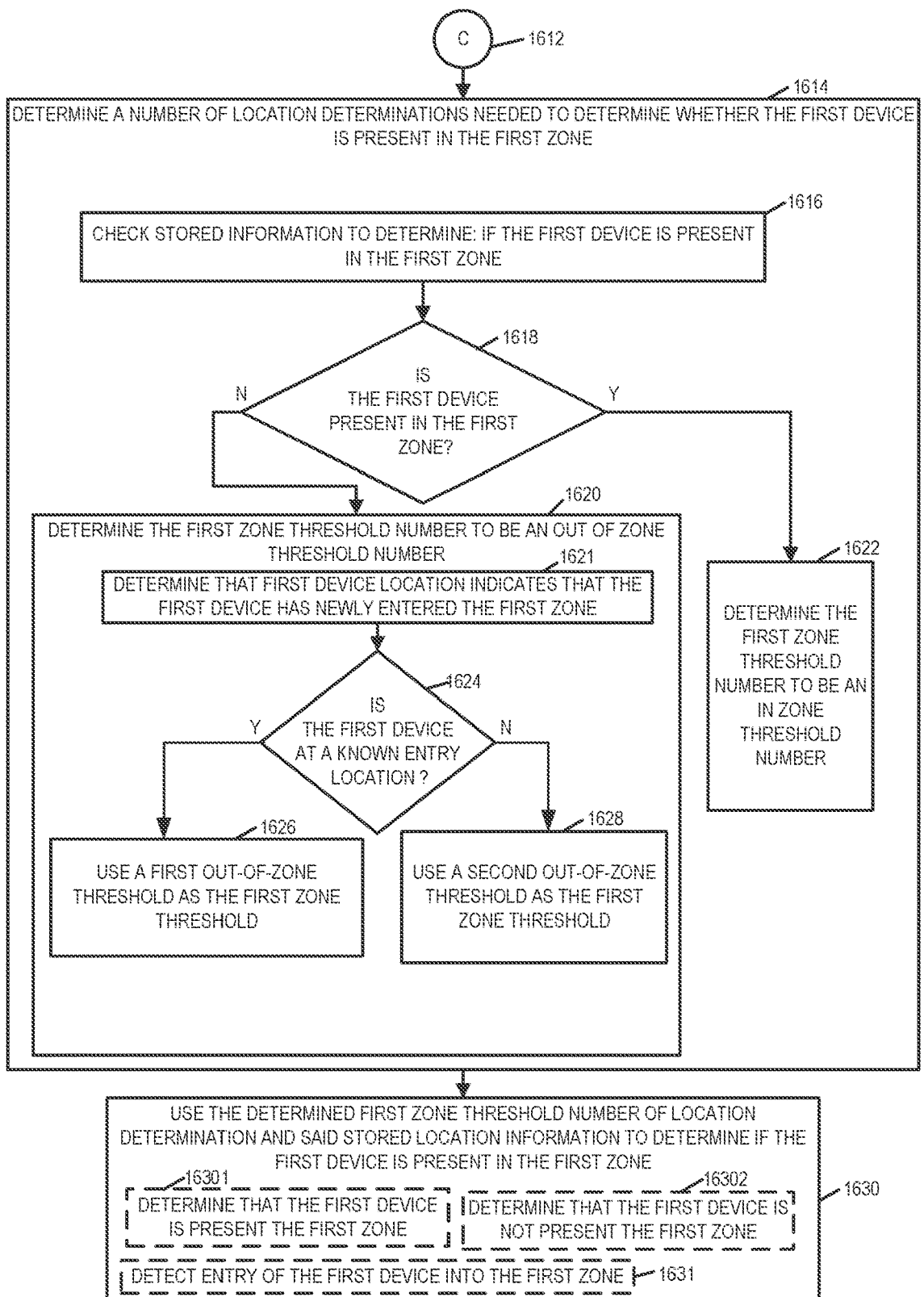
FIG. 16B is a second part of a flowchart of an exemplary method of operating a device, e.g., a server, e.g., a location/zone tracking server, in accordance with an exemplary embodiment.
Figure 16C:
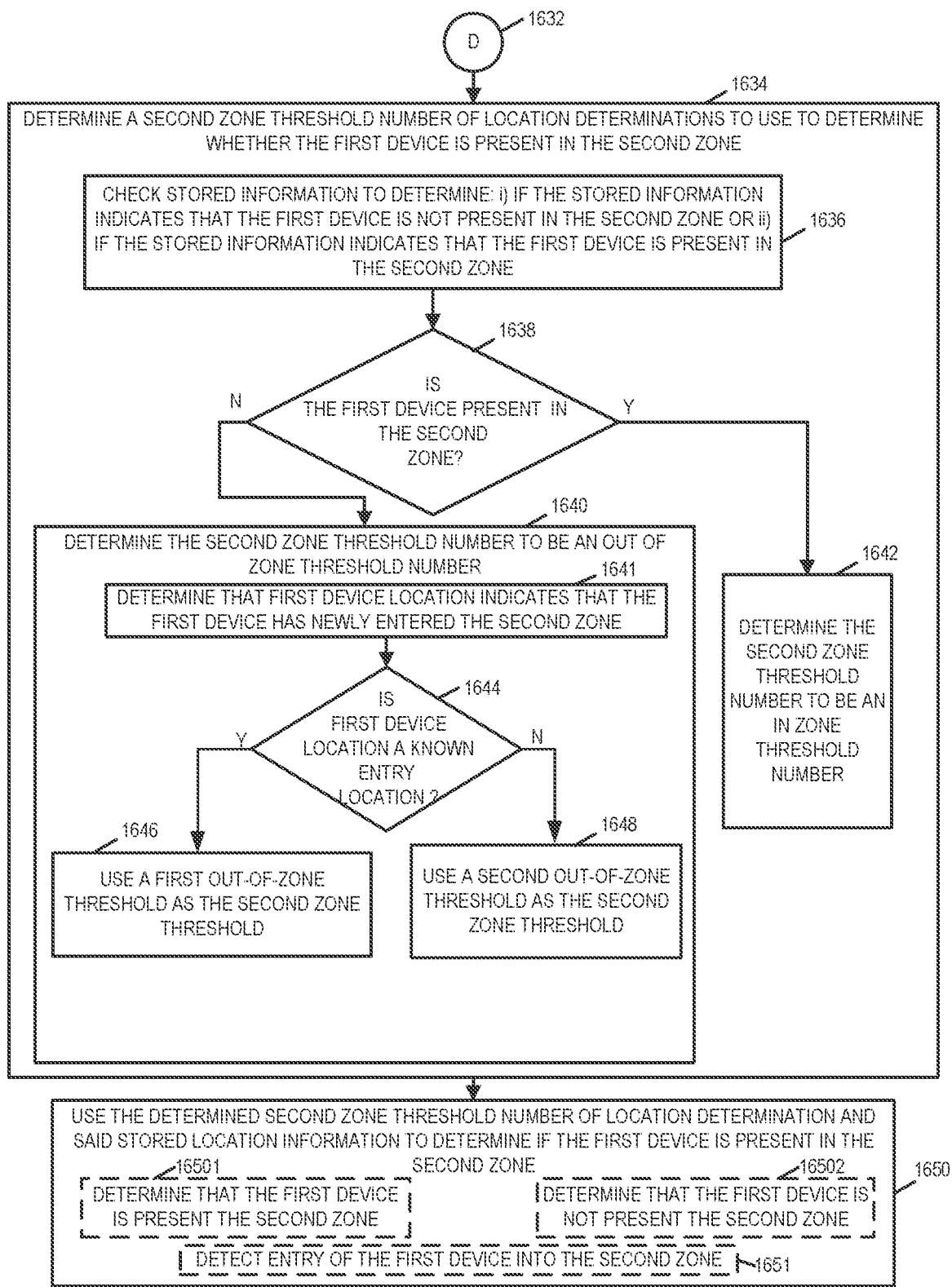
FIG. 16C is a third part of a flowchart of an exemplary method of operating a device, e.g., a server, e.g., a location/zone tracking server, in accordance with an exemplary embodiment.
Figure 16D:
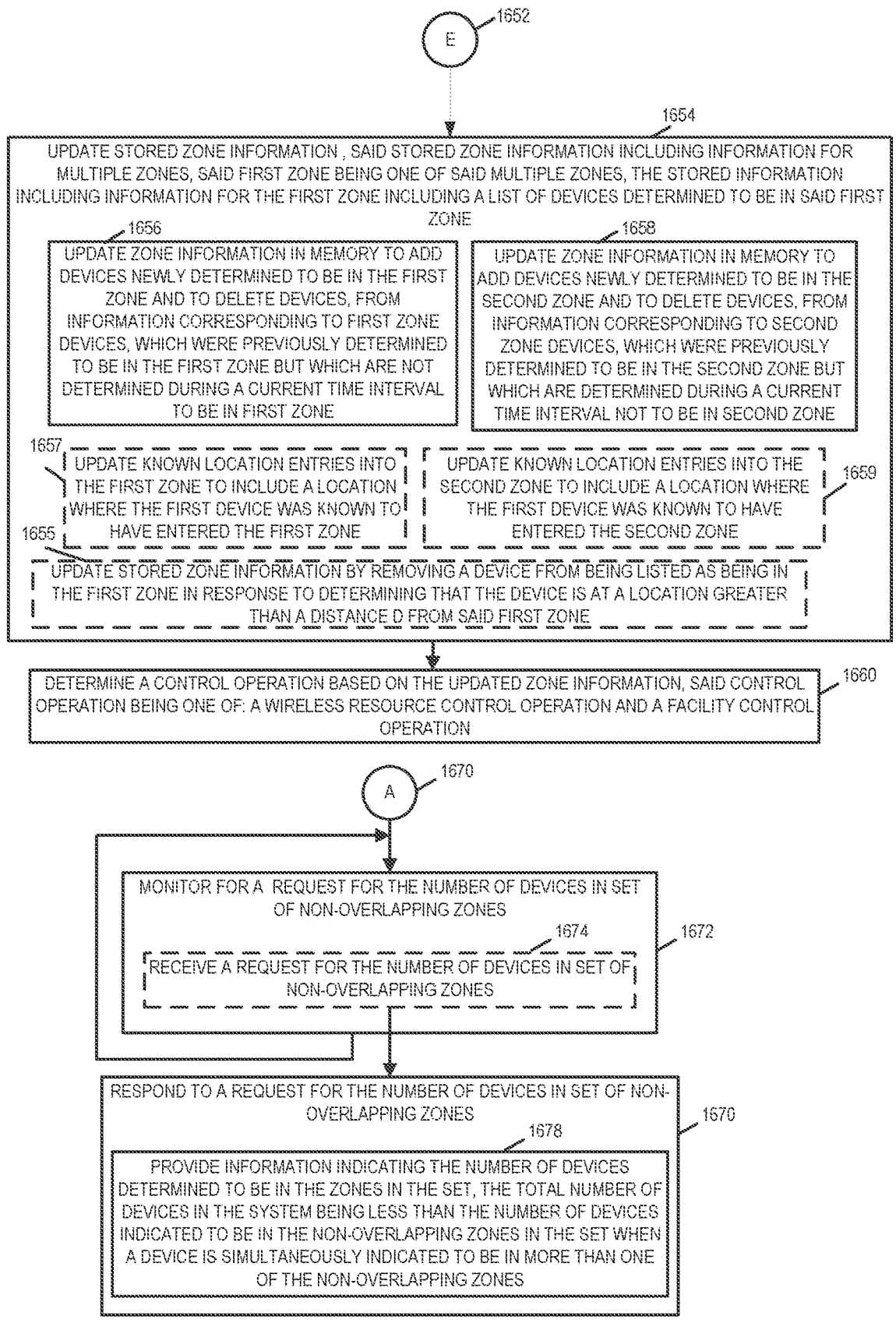
FIG. 16D is a fourth part of a flowchart of an exemplary method of operating a device, e.g., a server, e.g., a location/zone tracking server, in accordance with an exemplary embodiment.
Figure 16E:
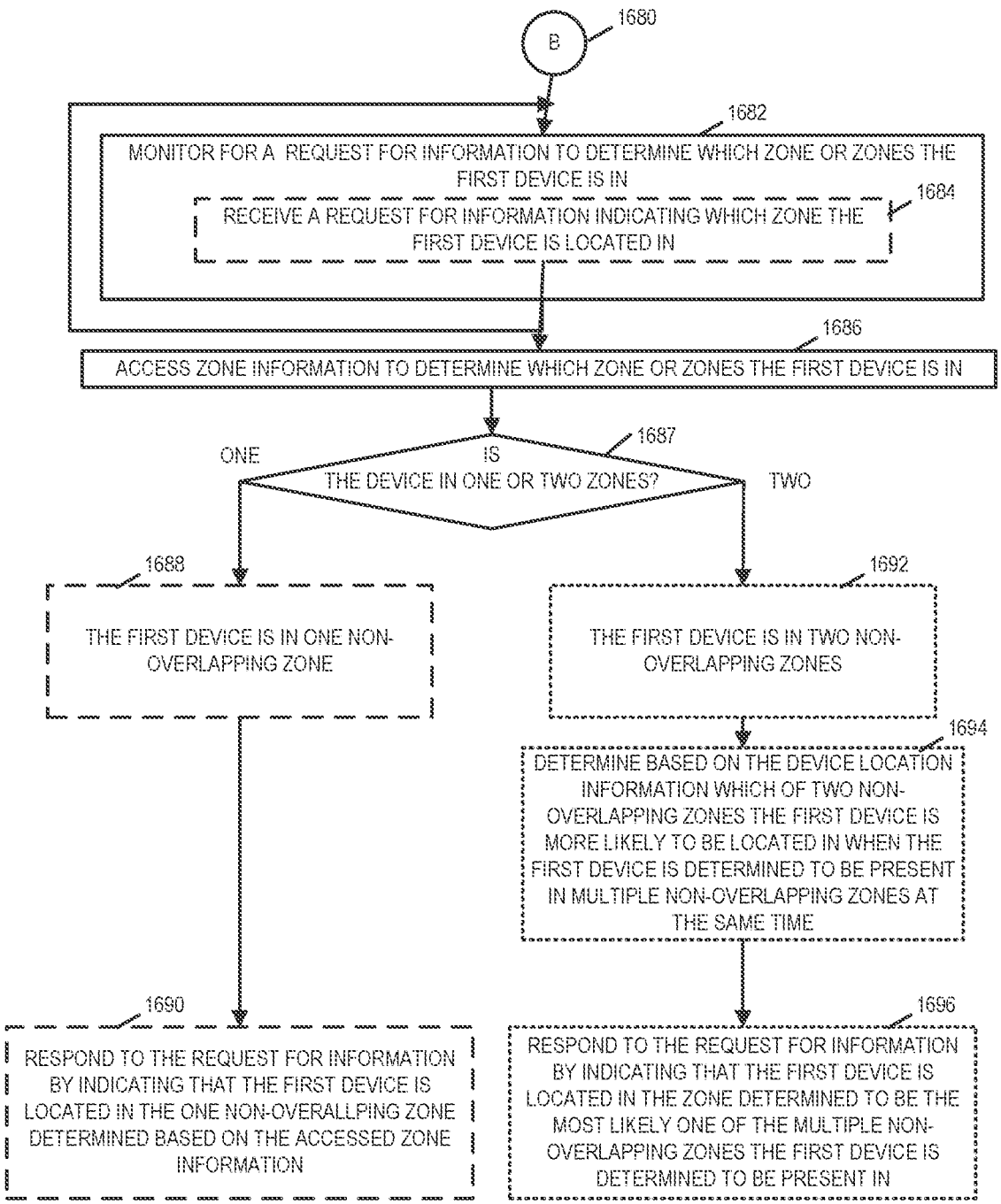
FIG. 16E is a fifth part of a flowchart of an exemplary method of operating a device, e.g., a server, e.g., a location/zone tracking server, in accordance with an exemplary embodiment.

FIG. 15 is a drawing 1500 illustrating another example of the third zone presence determination threshold being used by the device, said third zone presence determination threshold being a second out-of-zone threshold corresponding to a determined device location being outside known zone entry area within the zone. Drawing 1500 illustrates exemplary device 1 156 of system 100 of FIG. 1, which has been located in zone 4 110 for a long time, e.g., greater than 10 RSSI based location determination times. Location/zone tracking server 150 has previously determined that device 1 156 is present in zone 4 110, is not present in zone 1 104, is not present in zone 2 106, and is not present in zone 3 108. Stored zone presence information, e.g., stored in location/zone tracking server 150, indicates that device 1 156 is only present in zone 4, as indicated by box 1502. The most recent RSSI based location determination of device 1 156, performed by location/zone tracking server 150, is indicated by solid black triangle 1504, and the determined location 1504 is located within zone 3 108. The location/zone tracking server 150 is aware that determined location 1504 is within zone 3 108 since the server includes information, e.g. geographical information, corresponding to the zones. The location/zone tracking server 150 is also aware that determined location 1504 is not within a known zone entry area for zone 3 108 since the server includes information, e.g. geographical information corresponding to known zone entry locations. In this example, the location/zone tracking server 150 determines to use a second out-of-zone presence determination threshold, e.g., a value of 7, with regard to performing a new zone presence determination corresponding to zone 3 108, since the stored zone presence information indicates that device 1 156 is not present in zone 3 108, and the most recent RSSI based location determination for device 1 1504 is not located within a known zone entry area for zone 3 108.

In this example of FIG. 15, the location zone tracking server 150 has stored the location 1504 as a potential new zone entry location. In this example, device 1 156 did actually enter zone 3 106 through new door 120. Subsequently, location/zone tracking server 150 will test as to whether the potential new zone entry location is a valid entry location for zone 3, e.g., based on subsequent location determinations for device 1 156. In this example, device 1 156 remains in zone 3 108 following entry into zone 3 108, e.g., for a relatively long time, e.g., more than 20 RSSI based location determination time intervals. In this example, the test validates that the potential zone entry location is a valid zone entry location, and server 150 adds a new entry to its stored list of known zone entry locations for zone 3 108, the added new entry defining a region in zone 3 108 as an entry area, said entry area including location 1504. In accordance with yet another embodiment, rather than marking the specific zone as an entry, the system notifies the operator about an abnormality in the RSSI based calculation in that specific area.

FIG. 16, comprising the combination of FIG. 16A, FIG. 16B, FIG. 16C, FIG. 16D, and FIG. 16E, is a flowchart 1600 of an exemplary method of operating a device, e.g., a server, e.g., a location/zone tracking server, in accordance with an exemplary embodiment. The method of flowchart 1600 is, e.g. implemented by the location/tracking server 150 of FIGS. 1, 5 and 7 and/or by the location/tracking server 900 of FIG. 9.

Operation starts in operation 1602 in which the server is powered on and initialized. Operation proceeds from start operation 1602 to operation 1604. Operation also proceeds from operation 1602, via connecting node A 1670 to operation 1672. In addition, operation proceeds from operation 1602, via connecting node B 1680 to operation 1682.

Returning to operation 1604, in operation 1604 the server receives received signal strength indications corresponding to signals received by a first device or transmitted by said first device and received by another devices, e.g., access points. Operation 1604 is performed on an ongoing basis, e.g., respectively in accordance with a predetermined schedule and/or at a predetermined rate. Operation proceeds from operation 1604 to operation 1606.

In operation 1606 the server determines for each of several consecutive time periods a location of a first device, the determined locations forming a set of device location information. Operation 1606 includes operation 1608, in which the server uses the received signal strength indication, e.g., RSSI information, to determine the location of the first device at one or more points in time. Operation proceeds from operation 1606 to operation 1610.

In operation 1610 the server stores the device location information for said consecutive time periods in memory. Operation proceeds from operation 1610, via connecting node C 1612 to operation 1614. In operation 1614 the server determines a first zone threshold number of location determinations to use to determine whether the first device is present in the first zone. Operation 1614 includes operations 1616, 1618, 1620, and 1622. In operation 1616 the server checks stored information to determine: i) if the stored information indicates that the first device is not present in the first zone, e.g., by the absence of the first device from the list of devices in the first zone, or ii) if the stored information indicates that the first device is present in the first zone. Operation proceeds from operation 1616 to operation 1618.

In operation 1618 if the determination of operation 1616, based on the stored information, is that the first device is not present in the first zone, then operation proceeds from operation 1618 to operation 1620. In operation 1618 if the determination of operation 1616, based on the stored information, is that the first device is present in the first zone, then operation proceeds from operation 1618 to operation 1622.

In operation 1622 the server determines the first zone threshold number to be an in-zone threshold number.

Returning to operation 1620, in operation 1620 the server determines the first zone threshold number to be an out of zone threshold number. Operation 1620 includes operations 1621, 1624, 1626 and 1628. In operation 1621 the server determines that the first device location indicates that the first device has newly entered the first zone. Operation proceeds from operation 1621 to operation 1624. In operation 1624 the server determines if the first device has newly entered the first zone at a location which is a known entry location. If the determination of operation 1624 is that the first device has newly entered the first zone at a location which is a known entry location, then operation proceeds from operation 1624 to operation 1626. In operation 1626 the server uses a first out of zone threshold when said first device is determined to have newly entered the first zone at a location which is a known entry location. If the determination of operation 1624 is that the first device has newly entered the first zone at a location which is not a known entry location, then operation proceeds from operation 1624 to operation 1628. In operation 1628 the server uses a second out of zone threshold when said first device is determined to have newly entered the first zone at a location which is not a known entry location.

In some embodiments, the first zone threshold number is lower when stored information indicates that the first device has been determined, based on previous location information, to be present in the first zone than when stored information indicates that the first device is not present in the first zone. In some embodiments, the server uses a higher number for the first threshold number when it is determined that the stored information indicates that the first device is not in said first zone than when the stored information indicates that the first device is in the first zone.

Operation proceeds from operation 1614 to operation 1630. In operation 1630 the server uses the determined first zone threshold number of location determinations and stored location information to determine if the first device is present in the first zone. For each iteration of operation 1630, the server performs one of operation 16301 and operation 16302. In operation 16301 the server determines that the first device is present in the first zone, e.g., in response to the number of determined first device locations in an evaluation window which are determined to be located within the first zone being greater than the first zone threshold number. In operation 16302 the server determines that the first device is not present in the first zone, e.g., in response to the number of determined first device locations in an evaluation window which are determined to be located within the first zone not being greater than the first zone threshold number. Operation 1630 may, and sometimes does, include operation 1631, in which the server detects entry of the first device into the first zone. Operation proceeds from operation 1630, via connecting node D 1632 to operation 1634.

In operation 1634 the server determines a second zone threshold number of location determinations to use to determine whether the first device is present in the second zone. Operation 1634 includes operations 1636, 1638, 1640, and 1642. In operation 1636 the server checks stored information to determine: i) if the stored information indicates that the first device is not present in the second zone or ii) if the stored information indicates that the second device is present in the second zone. Operation proceeds from operation 1636 to operation 1638.

In operation 1638 if the determination of operation 1636, based on the stored information, is that the first device is not present in the second zone, then operation proceeds from operation 1638 to operation 1640. In operation 1638 if the determination of operation 1636, based on the stored information, is that the first device is present in the second zone, then operation proceeds from operation 1638 to operation 1642.

In operation 1642 the server determines the second zone threshold number to be an in-zone threshold number.

Returning to operation 1640, in operation 1640 the server determines the second zone threshold number to be an out of zone threshold number. Operation 1640 includes operations 1641, 1644, 1646 and 1648. In operation 1641 the server determines that the first device location indicates that the first device has newly entered the second zone. Operation proceeds from operation 1641 to operation 1644. In operation 1644 the server determines if the first device has newly entered the second zone at a location which is a known entry location. If the determination of operation 1644 is that the first device has newly entered the second zone at a location which is a known entry location, then operation proceeds from operation 1644 to operation 1646. In operation 1646 the server uses a first out of zone threshold when said first device is determined to have newly entered the second zone at a location which is a known entry location. If the determination of operation 1644 is that the first device has newly entered the second zone at a location which is not a known entry location, then operation proceeds from operation 1644 to operation 1648. In operation 1648 the server uses a second out of zone threshold when said first device is determined to have newly entered the second zone at a location which is not a known entry location.

In some embodiments, said second zone threshold number is lower when stored information indicates that the first device has previously been determined to be in said second zone than when stored information indicated that the first device is not present in the second zone.

In some embodiments, the first zone threshold number is lower than the second zone threshold number when the stored information indicates that the first device was previously determined to be present in the first zone and indicates that the first device is not present in the second zone.

In some embodiments, the stored information may, and sometimes does, indicate that the first device is present in multiple different non-overlapping geographic zones at the same time.

Operation proceeds from operation 1634 to operation 1650. In operation 1650 the server uses the determined second zone threshold number of location determinations and stored location information to determine if the first device is present in the second zone. For each iteration of operation 1650, the server performs one of operation 16501 and operation 16502. In operation 16501 the server determines that the first device is present in the second zone, e.g., in response to the number of determined first device locations in an evaluation window which are determined to be located within the second zone being greater than the second zone threshold number. In operation 16502 the server determines that the first device is not present in the second zone, e.g., in response to the number of determined first device locations in an evaluation window which are determined to be located within second zone not being greater than the second zone threshold number. Operation 1650 may, and sometimes does, include operation 1651, in which the server detects entry of the first device into the second zone. Operation proceeds from operation 1650, via connecting node E 1652, to operation 1654.

In operation 1654 the server updates stored zone information, said stored zone information including information for multiple zones, said first zone being one of said multiple zones, the stored information included a list of devices determined to be in the first zone. Operation 1654 includes operation 1655, operation 1656 and/or operation 1658 depending on the embodiment and the determinations made. In operation 1656 the server updates zone information in memory to add devices determined to be in the first zone and to delete devices, from information corresponding to the first zone devices, which were previously determined to be in the first zone but which are not determined during a current time to be in the first zone. In some embodiments in operation 1655, stored zone information is updated by removing a device from being listed as being in the first zone in response to the device being determined to be located at a distance D or more outside the first zone. In some cases once determined to be in a zone the device will be listed in a zone until it is determined to be at a distance D or more from the zone or it is no longer detected as being in the zone for a certain period of time, e.g., a predetermined period of time.

In embodiments where operation 1654 includes operation 1658, in operation 1658 the server updates zone information in memory to add devices determined to be in the second zone and to delete devices, from information corresponding to the second zone devices, which were previously determined to be in the second zone but which are not determined during a current time to be in the second zone.

Operation 1654 may, and sometimes does, include operation 1657. In operation 1657 the server updates known location entries into the first zone to include a location where the first device was known to have entered the first zone, e.g., the server adds a new entry location to a list of known entry locations for zone 1.

Operation 1654 may, and sometimes does, include operation 1659. In operation 1659 the server updates known location entries into the second zone to include a location where the first device was known to have entered the second zone, e.g., the server adds a new entry location to a list of known entry locations for zone 2.

Operation proceeds from operation 1654 to operation 1660. In operation 1660 the server determines a control operation to be executed based on the updated zone information, said control operation being one of; a wireless resource control operation and a facility control operation. In some embodiments, the control operation is powering on a number of wireless transmitters/receivers on an access point in zone based on the determined number of devices present in the zone. In some embodiments, a facility control operation is, e.g., turning on lights, controlling the amount of ventilation, and/or unlock or indicate the location of exit doors selected to be made available for use based on the determined device location information. Operation 1660 includes performing the determined control operation in at least some embodiments.

Returning to operation 1672, in operation 1672 the server continuously monitors for a request for the number of devices in a set of non-overlapping zones. Operation 1672 may, and sometimes does, includes operation 1674, in which the server receives a request for the number of devices in a set of non-overlapping zones. Operation proceeds from operation 1674, to operation 1670.

In operation 1670 the server responds to a request for the number of devices in a set of non-overlapping zones. Operation 1670 includes operation 1678 in which the sever provides information indicating the number of devices determined to be in the zones in the set, the total number of devices in the system being less than the number of devices indicated to be in the non-overlapping zones in the set when a device is simultaneously indicated to be in more than one of non-overlapping zones.

Returning to operation 1682, in operation 1682 the server continuously monitors for a request for information to determine which zone or zones the first device is in. Operation 1682 may, and sometimes does, include operation 1684, in which the server receives a request for information indicating which zone the first device is located in. Operation proceeds from operation 1684 to operation 1686.

In operation 1686 the server accesses zone information to determine which zone or zones the first device is in. Operation proceeds from operation 1686 to operation 1687 in which a determination is made as to whether the first device is in one or two zones. If the first device is in one zone operation proceeds to operation 1688 but if the first device is in two zones operation proceeds to operation 1692.

In operation 1688 the server determines based on the accessed zone information that the first device is in one non-overlapping zone. Operation proceeds from operation 1688 to operation 1690 in which the first device responds to the request for information by indicating that the first device is located in the one non-overlapping zone determined based on the accessed zone information.

In operation 1692 the server determines based on the accessed information that the first device is in two non-overlapping zones. Operation proceeds from operation 1692 to operation 1694. In operation 1694 the server determines based on first device location information which of the two non-overlapping zones the first device is most likely to be located in when the first device is determined to be present in multiple non-overlapping zones at the same time. Operation proceeds from operation 1694 to operation 1696 in which the server responds to the request for information by indicating that the first device is located in the zone determined to be the most likely one of the multiple non-overlapping zones the first device is determined to be present in.

Various aspects and/or features of some embodiments will now be described. Various features are directed to a method for identifying population density in real time and initiating a process for improving services for said population. Under specific conditions the method may predict population density even before user is adversely affected by the increase in population density.

A system in accordance with at least some of the disclosed embodiments continuously monitors messages between a wireless device such as user equipment (UE) and access points (AP). More specifically, the system monitors the received signal strength indicator (RSSI) from each mobile device at numerous access points (APs) and uses it to determine the location of users carrying mobile devices.

The first operation in one exemplary process of identifying population density is to define the areas of interest in which population density is of interest. We will refer to these areas of interest as zones. Zones can be defined by a system administrator by entering geometric parameters of a zone such as X Y coordinated of rectangular or square zone, entering the center and radius or circular zone, etc. Similarly, system administrator may use a mouse or a stylus to draw zone on a map presented on a screen of devices such as PC, mobile phone, tablet, etc. In accordance with yet another embodiment, a zone can be defined by proximity to specific access points. For example a location determination server may determine that a user as being in zone 1 if the RSSI it measures from AP1 is greater than 30, in zone 2 if the RSSI it measures from AP2 is greater 20 and the RSSI it measures from AP3 is greater than 50. In accordance with yet another embodiment, a more complex RSSI based zones can be defined by incorporating a complex mathematical/logical RSSI relationships. For example a device may be defined to be in a specific zone if the RSSI it measures from AP1 is greater than 30 and smaller 40, and the RSSI it measures from AP2 is greater than 35 and smaller 42.

Once the boundaries of the various zones have been defined, the various APs of the system monitor the RSSI from each user terminal (UT). In accordance with a specific embodiment each UT measures the RSSI of signal it receives from multiple access points (APs) and reports the values to a location engine attached to the wireless network. The location of each UT is determined by a location engine attached to the wireless network. For each UT, the location engine receives RSSI corresponding to multiple APs and determines the location of that UT based on the reported RSSIs. The RSSI is measured periodically, e.g., once per second and is used to update the location of each UT.

Similarly, rather than determining the location by measuring the RSSI from various APs by each UE and reporting it to a location management system via the associated AP, those skilled in the art should appreciate that the same results can be derived in a system wherein each AP measures the RSSI from each UE and reports it accordingly to the location management server.

In either case, RSSI measurements are taken periodically, e.g., once per second, and the location of the user is therefore estimated based on these RSSI measurements. In a specific example, the location management system estimates the location of each UE once every second.

Each zone has an associated population counter which keeps track of the number of users within this specific zone (number of visitors). Each count in the population counter has an associated user id and a time stamp indicating the time the specific user/visitor entered into the specific zone. When a user enters a zone in the first time the counter is incremented, and a new entry is created with the user ID and the time the user entered into the zone. When a user remains in a zone, each time the zone engine, in collaboration with the location engine, reports that the user is still in the zone, the time stamp associated with this specific user is updated to reflect the last time the user has been identified as being in the specific zone. A user is considered to enter a zone in the location engine detected the presence of the user in a zone more than a first threshold T1, e.g., 3, consecutive times. In accordance with an alternative embodiment, user is considered to enter a specific zone if he was present inside zone boundaries more than first threshold times within a given time period.

The zone location management server continuously monitors the coordinates of each user. If the system determines that the user is outside the zone for more than predetermined second threshold times T2, e.g., 4, the system checks to see if the user is farther than a predetermined distance, e.g., 2 feet from the zone. Only if the user moved out of a zone more than a predetermined distance the system marks the user as being out of the said zone. Upon determining that a user left a specific zone, the location management server removes the user from the specific zone and the population counter of this zone is decremented by one. In addition, the entry of the specific user Id and its associated time stamp are removed from the population counter of this specific zone. In accordance with one embodiment, the system estimates the size of the jitter in the location determination and uses it to determine the threshold D. For example, the system may, and often does, set the threshold D to be equal to the size of the jitter. By removing the user from a zone only when he has been identified to be at least a distance of D from the zone, the system ensures that resources are deallocated from the zone only when the user (or multiple users) moved away from the zone for sure.

Determination of user location based on RSSI measurements is prone to errors due to noise in the RSSI. Even when a user is static in a specific location, consecutive RSSI based location estimation yield slightly different location estimations. The jitter in the estimated user location challenges the ability of the system to determine the specific zone in which user is. For a small zone and a large jitter, the UE may appear, based on the RSSI based location estimation, as if the user is moving continuously in and out of the zone.

Various methods to disambiguate the location of a user in a specific zone are described. The use of a specific disambiguation method is determined by the specific application for which the count of users in a zone.

In accordance with one particular exemplary embodiment, user is counted as being in a specific zone if he was observed in that zone at least T1 times within specific time window W. For example, the user was observed inside a zone three times within a time window of five consecutive seconds. Because the uncertainty in identifying the precise location of users, this method may count a user as being in multiple zones at the same time. This may occur when zones are adjacent and the user is located close to the boundary between the two (or more) zones. Counting users as being in multiple zones is beneficial in many scenarios. For example two adjacent stores may want to place advertisements in their windows. By counting users who are close to both stores, each store can obtain the number of potential shoppers next to its window or entrance. Similarly, zones and specifically the count of the number of people in a specific zone can be utilized to determine how many people are in a specific queue waiting for service. When the system determines that a queue is getting to be longer than a specific threshold L, a new service station, e.g., store checkout point of sale, may be opened. Similarly, the system may identify the number of visitors in a queue for a specific ride in amusement park. When the length of a queue to a specific ride exceeds a specific threshold L, a new ride may be opened to alleviate the load on the crowded ride thus increasing the level of satisfaction of the visitors.

In accordance with yet another preferred method, the system counts the number of times a user is identified as being inside a specific zone within a specific time period P. During a specific time period a user may be identified as being inside multiple zones. For example, a user may be identified as being C1 times in zone 1, C2 times in zone 2 and Cn times in zone k within a given time period. In this case, a heat map of the location of the user may be drawn based on the percent of time the user has been identified in each zone. The heat map would show the user as being in zone 1 $C1/(C1+C2+ \ldots +Ck)$, in zone 2 $C2/(C1+C2+ \ldots +Ck)$, etc. As described above, the heat-map is utilized to determine the number of visitors in each zone and as such determine locations for placing advertisements, dynamically determine the number of servers required at any time to serve users awaiting in queues, determine utilization of rooms and as such help determine which meeting should be held in which room, determine at the end of an event e.g., baseball game, the size and location of crowds, and based on that determine when exit doors should be opened and how many doors should be opened, etc.

In accordance with another embodiment, a new set of zones can be defined. Specifically, assume that the initial set of zones is defined as $\{Z1, Z2, \ldots Zn\}$. As discussed above, the system determines the number of times (or consecutive times) a mobile device is inside each one of zones {C1, C2, . . . Cn}. The probability that the mobile device is in a specific zone i can be then estimated by Ci/(C1+C2+ . . . +Cn). In accordance with this embodiment, new set of more granular zones can be defined based on these estimated probabilities. For example a mobile terminal can be defined as being in a specific new zone if the probability Ci/(C1+C2+ . . . +Cn)>Pi for all 1<i<n.

As described above, the same process is used for all the UEs associated with the network and as such the system can and often does detects the number of users in each zone. Additionally, the system may identify the path traversed by each user and use this information to assign resources to optimize the experiences of users. For example, a resource can be a specific advertisement. In a shopping mall, if a system identifies multiple UEs leaving from a men store to a hallway, the system may, and often does, display advertisements for men items. Similarly, if the system identifies multiple UEs leaving from a women store to a hallway, the system may, and often does, display advertisements for women items.

The embodiments herein may be better understood by referring to the following description in conjunction with the accompanying drawings in which like reference numerals indicate identically or functionally similar elements.

Figure 17:
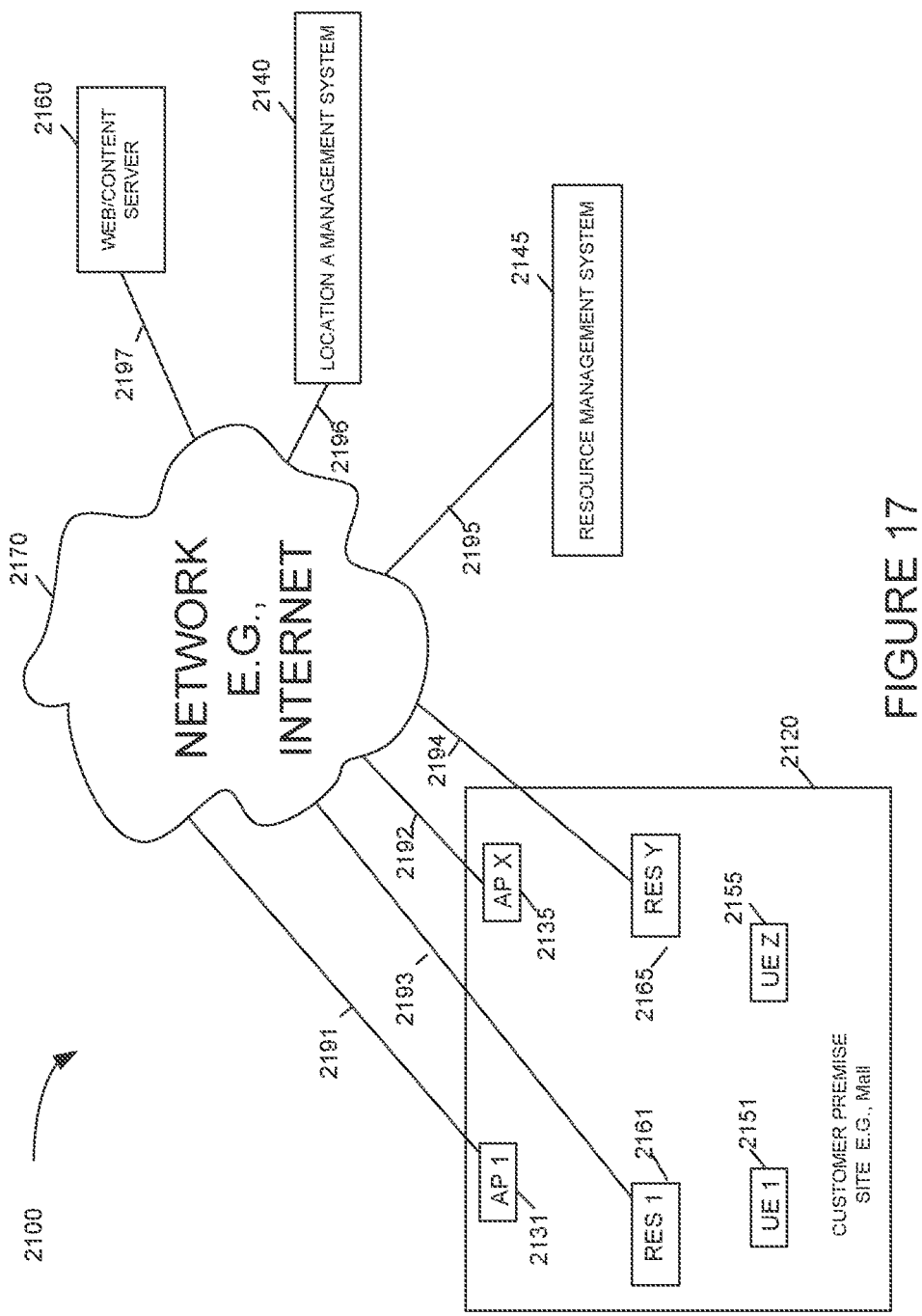
FIG. 17 is a block diagram illustrating an embodiment of a network environment.

FIG. 17 is a drawing of an exemplary system, 2100, implemented in accordance with an exemplary embodiment. Exemplary system 2100 includes a physical location, 2120, such as an enterprise, a shopping mall, stadium, city streets, etc. Access points AP1, 2131, through AP X, 2135, are located throughout the physical location and provide wireless connectivity to user equipment UE1, 2151 through UE Z, 2155. Access points AP1, 2131, through AP X, 2135, are connected to network 2170 such as intranet, internet, etc. via links 2191 and 2192. Resources RES1, 2161, through RES Y, 2165, are located throughout physical location 2120. These resources are connected to the network, 2170, via links 2193 and 2194. The type and level/amount of resources is controlled by the resource management system, 2145, based on the number of users (or population density) in each zone. The resource management system is connected to network 2170 via link 2195. The number of users in each zone is determined by the location management system, 2140, which is connected to the network via link 2196. In an exemplary embodiment, the web/content server, 2160, which is connected to network 2170 via link 2197, stores content such as videos and advertisement and renders it to the various resources such as video displays, 2161 through 2165, based on instructions from the resource management system 2145.

As explained above, the location of e.g., UE1 can be determined by having UE1, 2151, measure the RSSI of the radio signals it receives from AP1, 2131, through AP X, 2135, and report these RSSIs to the location management system, 2140, via the AP it is associated and connected to network 2170. Alternatively, AP1, 2131, through AP X, 2135, can measure the RSSI of the signal they receive from UE1 and report it to the location management system 2140 via network 2170 to the location management system 2140.

Figure 18:
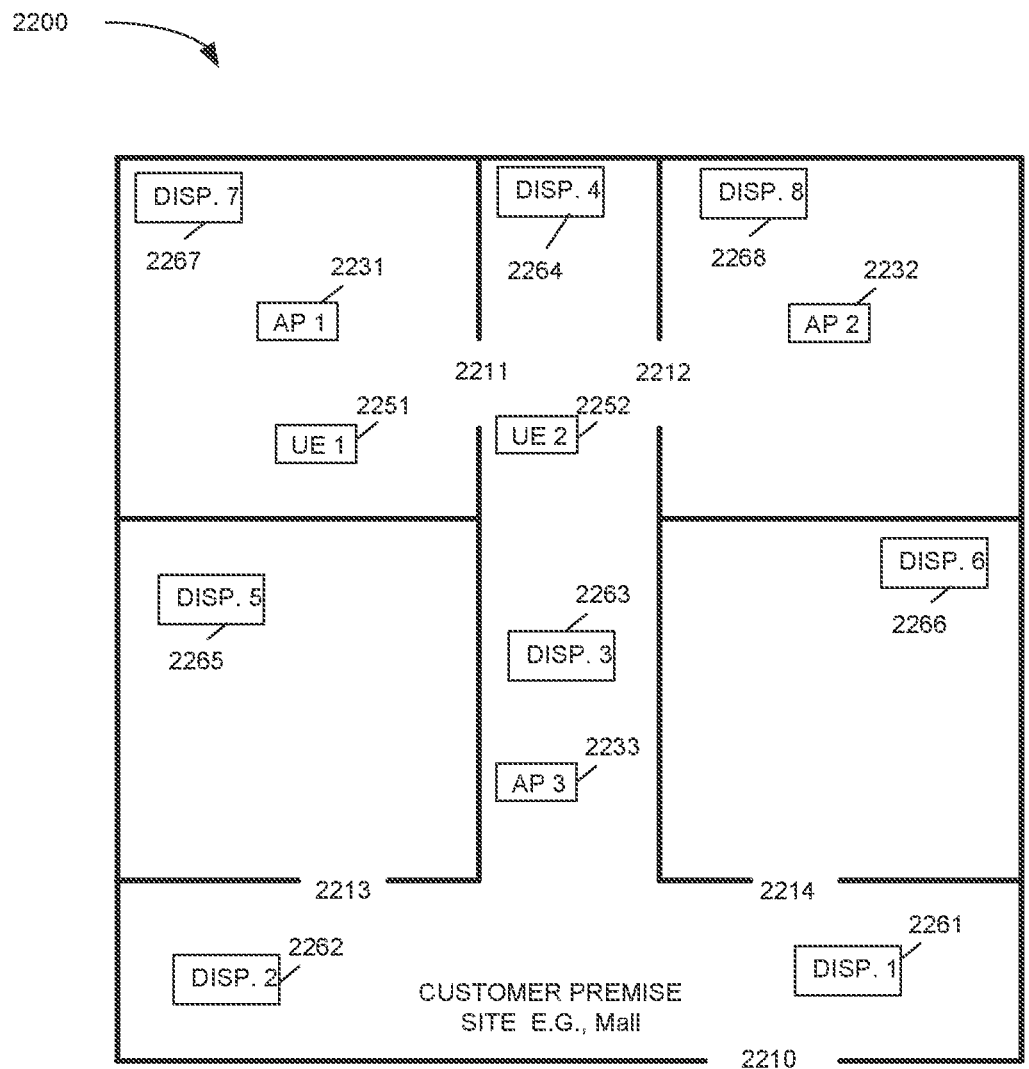
FIG. 18 is an exemplary illustration of physical location such as a shopping mall.

FIG. 18 is an exemplary illustration 2200 of a physical location (such as location 2120 of FIG. 17). The location has an entrance 2210, four rooms/shops with respective doors, 2211, 2212, 2213, and 2214. The room may be reached via a hallway that connects the respective rooms with the main entrance. Access points AP1, 2231, AP2, 2232, and AP3, 2233, (such as access points AP1, 2131, through AP X, 2135 of FIG. 17) are located throughout the physical location and provide wireless connectivity to user equipment such as UE1, 2251, and UE2, 2252 (similar to UE1, 2151 through UE Z, 2155 of FIG. 17). Displays DISP1, 2261, DISP2, 2262, DISP3, 2263, DISP4, 2264, DISP5, 2265, DISP6, 2266, DISP7, 2267, and DISP8, 2268, (such as resource RES1, 2161, through RES Y, 2165 of FIG. 17), are located throughout the physical location. The content to be projected on these displays in controlled by a resource management system (such as block 2145 of FIG. 17).

Figure 19:
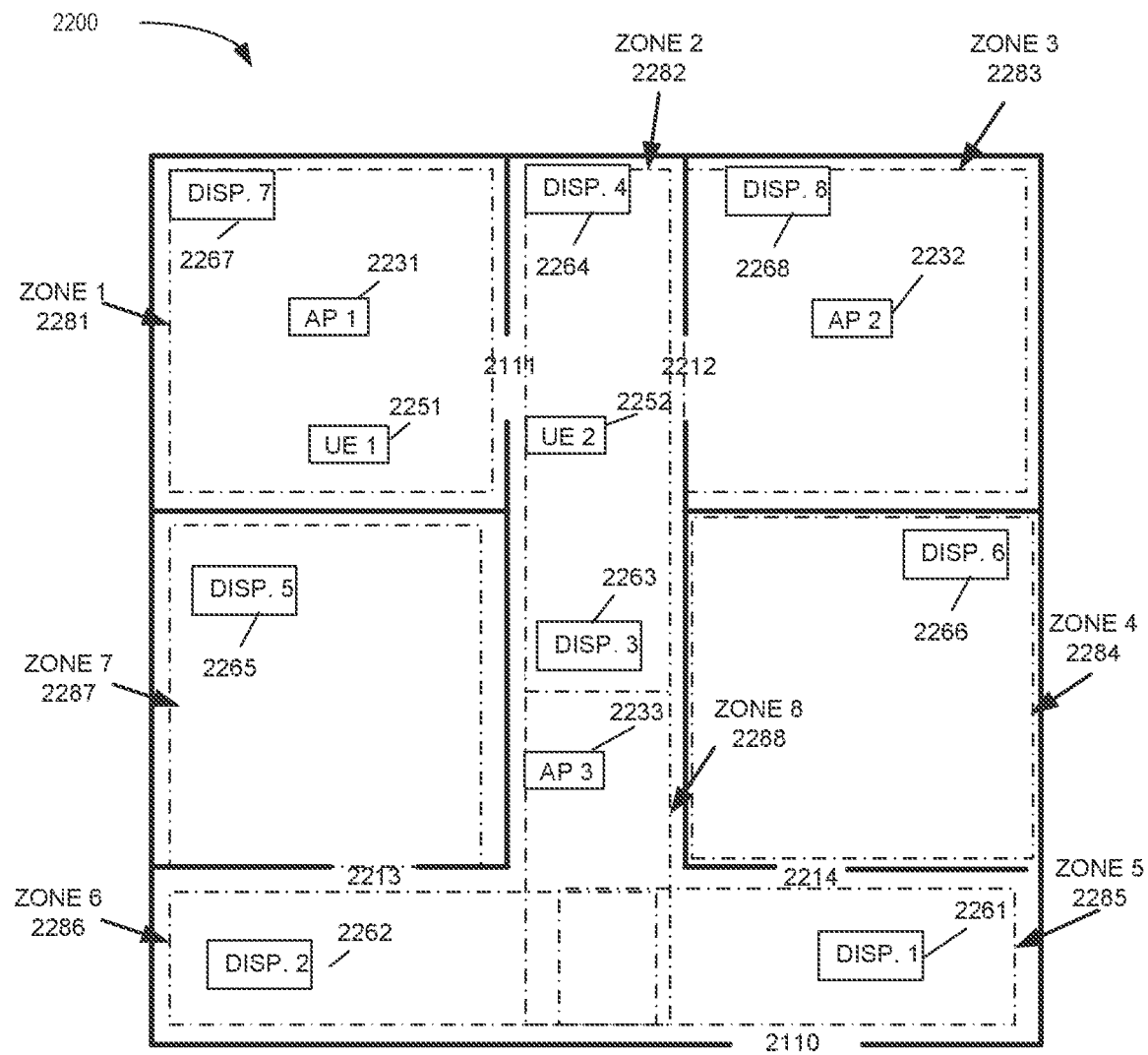
FIG. 19 is an exemplary illustration of physical location such as a shopping mall of FIG. 18 with the added zones.

FIG. 19 is an exemplary illustration 2200 of FIG. 18 with the added zone definitions configured by a system administrator. Zone 1, 2281, zone 3, 2283, zone 4, 2284, and zone 7, 2287, are used to determine which store a UE is in. Zone 2, 2282, zone 5, 2285, zone 6, 2286, and zone 8, 2288, are used to determine the UEs that are in a hallway and the specific portion of a hallway a UE is in.

Figure 20:
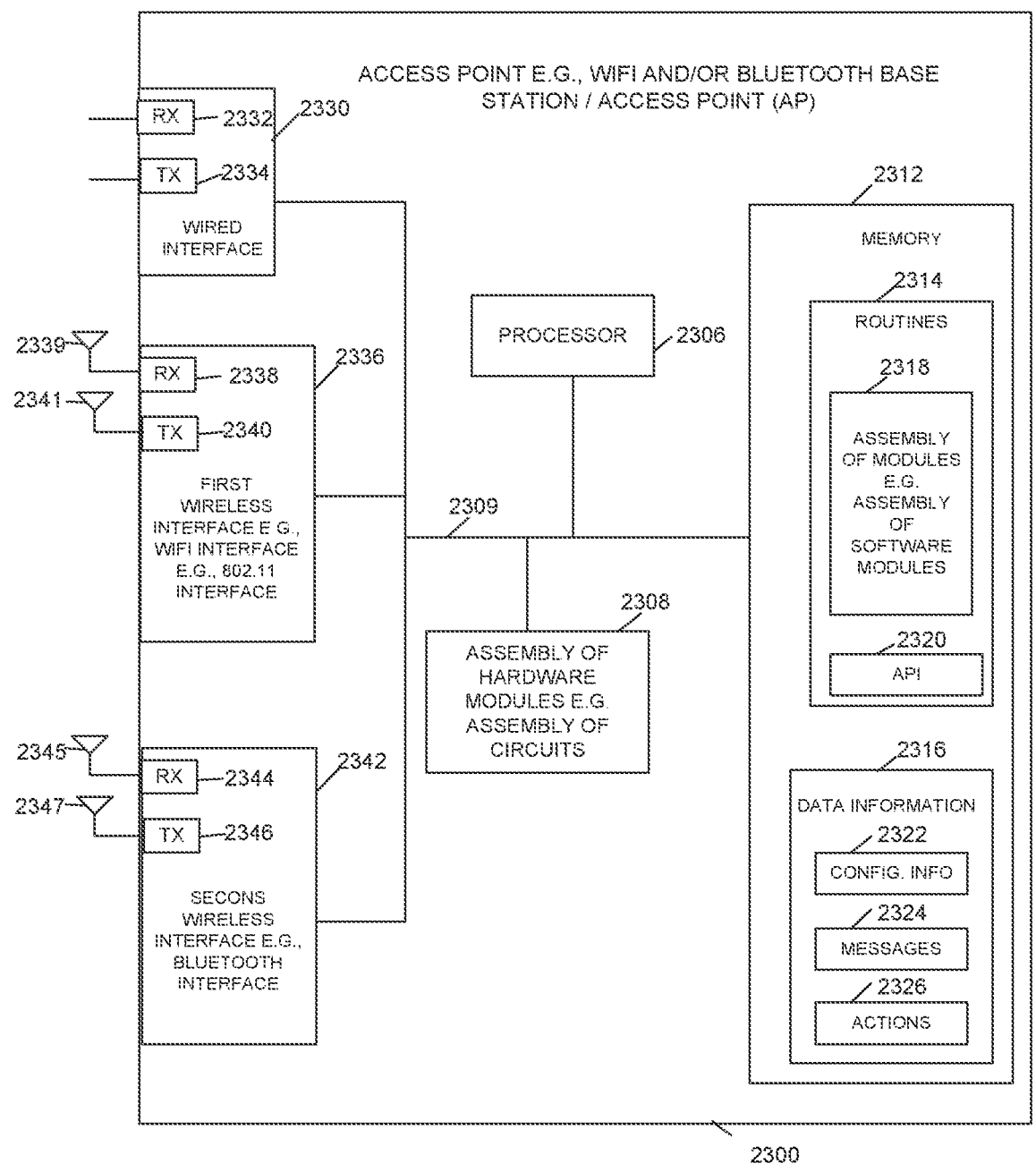
FIG. 20 is a block diagram illustrating an embodiment of wireless access point.

FIG. 20 is a drawing of an exemplary access point 2300 (such as access points AP1, 2131, through AP X, 2135 of FIG. 17) in accordance with an exemplary embodiment.

Access point 2300 includes wired interfaces 2330, wireless interfaces 2336, 2342, a processor 2306, e.g., a CPU, a memory 2312, and an assembly of modules 2308, e.g., assembly of hardware module, e.g., assembly of circuits, coupled together via a bus 2309 over which the various elements may interchange data and information. Wired interface 2330 includes receiver 2332 and transmitter 2334. The wired interface couples the access point 2300 to a network and/or the Internet 2170 of FIG. 17. First wireless interfaces 2336 may support a Wi-Fi interface, e.g. 802.11 interface, includes receiver 2338 coupled to receive antenna 2339, via which the access point may receive wireless signals from communications devices, e.g., wireless terminals, and transmitter 2340 coupled to transmit antenna 2341 via which the access point may transmit wireless signals to communications devices, e.g., wireless terminals. Second wireless interface 2342 may support Bluetooth interface which includes receiver 2344 coupled to receive antenna 2345, via which the access point may receive wireless signals from communications devices, e.g., wireless terminals, and transmitter 2346 coupled to transmit antenna 2347 via which the access point may transmit wireless signals to communications devices, e.g., wireless terminals.

Memory 2312 includes routines 2314 and data/information 2316. Routines 2314 include assembly of modules 2318, e.g., an assembly of software modules, and Application Programming Interface (API) 2320. Data/information 2316 includes configuration information 2322, message event stream capture 2324 and in a specific embodiment collection actions 2326 such as forwarding measurements of RSSI from UEs to the location management system or/and, measuring RSSI from various UEs and forwarding the measurements to the location management system (such as 2140 of FIG. 17).

Figure 21:
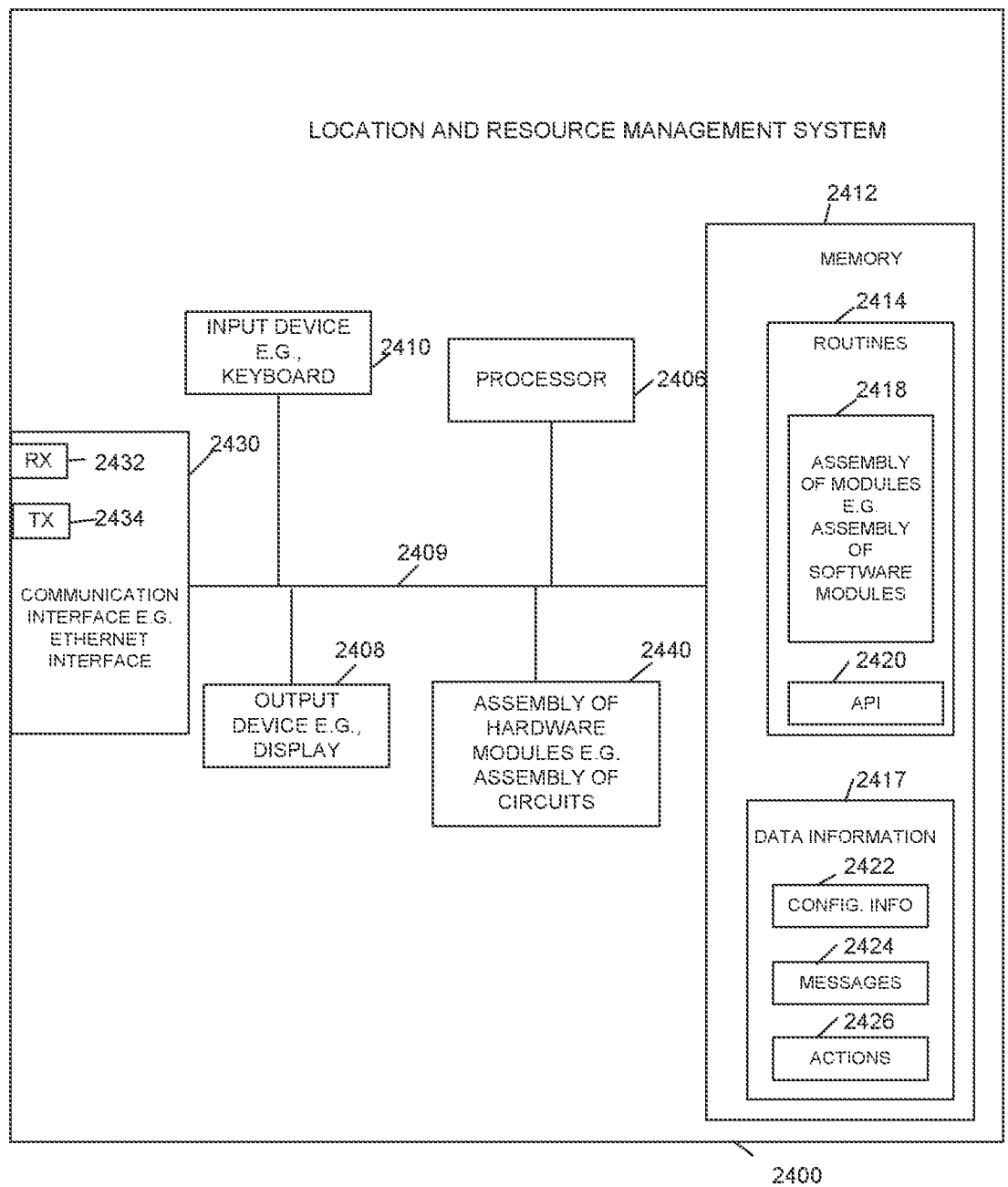
FIG. 21 provides a block diagram illustrating an embodiment of location and resource management system that determines the zone a specific UE should be assigned.

FIG. 21 is a drawing of an exemplary location management system 2400, e.g., a location management server (such as block 2140 of FIG. 17), a resource management server (such as block 2145 of FIG. 17), in accordance with an exemplary embodiment. In some embodiments, location management system 2400 of FIG. 21 is location management system, 2140, of FIG. 17. Location management system 2400 includes a communications interface 2430, e.g., an Ethernet interface, a processor 2406, an output device 2408, e.g., display, printer, etc., an input device 2410, e.g., keyboard, keypad, touch screen, mouse, etc., a memory 2412 and an assembly of modules 2440, e.g., assembly of hardware module, e.g., assembly of circuits, coupled together via a bus 2409 over which the various elements may interchange data and information.

Communications interface 2430 couples the location monitoring system 2400 to a network and/or the Internet. Communications interface 2430 includes a receiver 2432 via which the location monitoring system can receive data and information, e.g., RSSI measured by each UE indicative of the signal strength it received from the various APs, RSSI measured by each AP indicative of the signal strength it measured from each. Communications interface 2430 includes also a transmitter 2434 via which the location monitoring system reports to the resource manager (such as block 2145 of FIG. 17), the zones in which various users are identified, the history of locations each UE traversed, and the density of population in each zone.

Memory 2412 includes routines 2414 and data/information 2417. Routines 2414 include assembly of modules 2418, e.g., an assembly of software modules, and Application Programming Interface (API) 2420. Data/information 2417 includes configuration information 2422, captured message event stream 2424, such as messages with various RSSI measurements (or just various RSSI measurement) and collection of actions, 2426, to be taken based on the various RSSI measurements such as determining events of UE entering or exiting a specific zone.

Figure 22:
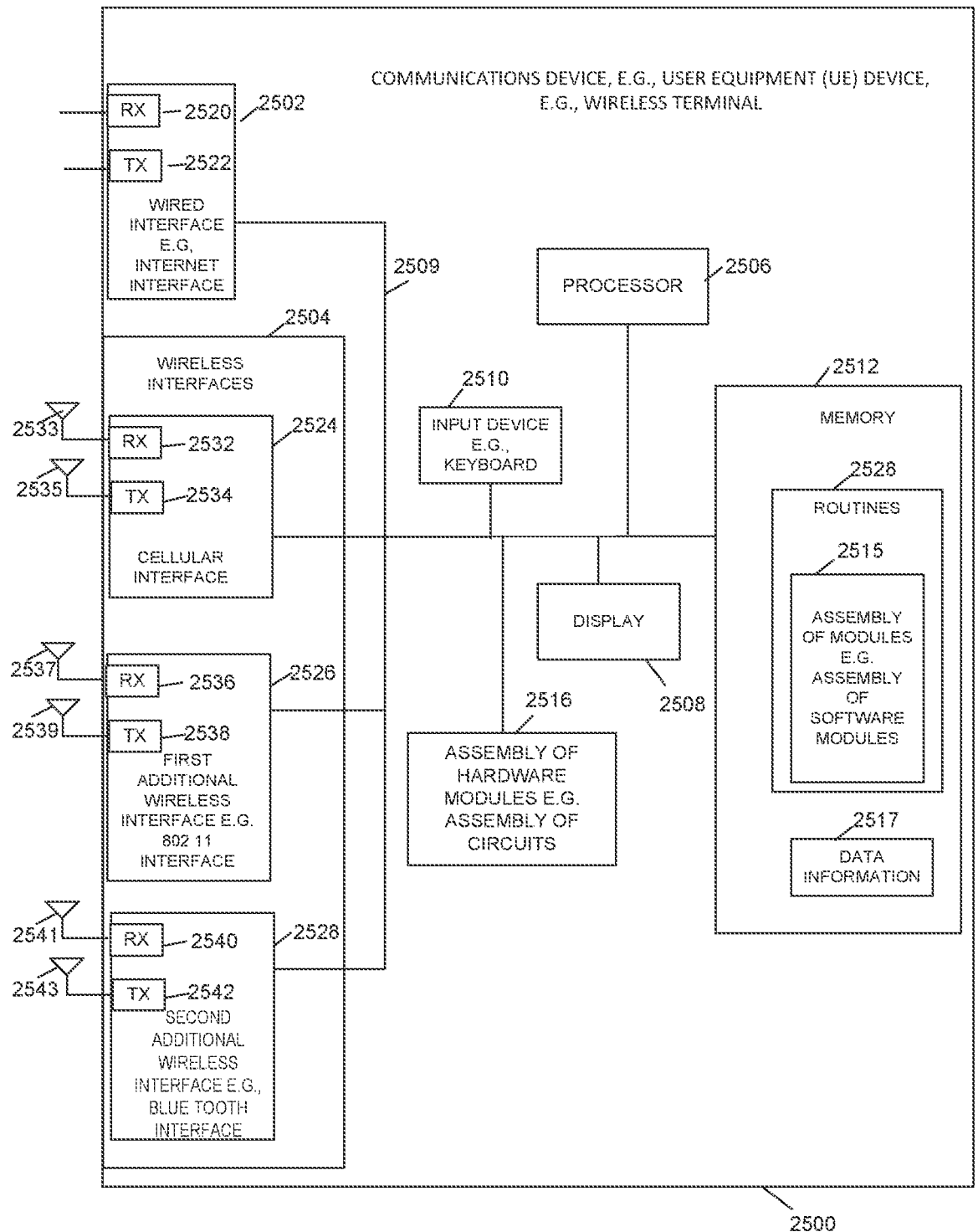
FIG. 22 is a block diagram illustrating an embodiment of communication device such as UE.

FIG. 22 is a drawing of an exemplary client such as UE 2500 (e.g., user equipment UE1, 2151 through UE Z, 2155 of FIG. 17) in accordance with an exemplary embodiment.

UE 2500 includes wired interfaces 2502, wireless interfaces 2504, a processor 2506, e.g., a CPU, a memory 2512, and an assembly of modules 2516, e.g., assembly of hardware module, e.g., assembly of circuits, coupled together via a bus 2509 over which the various elements may interchange data and information. Wired interface 2502 includes receiver 2520 and transmitter 2522. The wired interface couples the UE 2500 to a network and/or the Internet 2170 of FIG. 17.

The wireless interface 2504 includes cellular interface 2524, first wireless interface 2526, e.g., 802.11 WiFi interface, and a second wireless interface 2528, e.g., Bluetooth interface. The cellular interface 2524 includes a receiver 2532 coupled to receiver antenna 2533 via which the user equipment may receive wireless signals from access points, e.g., AP1, 2131, through AP X, 2135 of FIG. 17, and transmitter 2534 coupled to transmit antenna 2535 via which the user equipment may transmit wireless signals to AP1, 2131, through AP X, 2135 of FIG. 17. First wireless interfaces 2526 may support a Wi-Fi interface, e.g. 802.11 interface, includes receiver 2536 coupled to receive antenna 2537, via which the UE may receive wireless signals from communications devices, e.g., APs, and transmitter 2538 coupled to transmit antenna 2539 via which the UE may transmit wireless signals to communications devices, e.g., APs. Second wireless interface 2528 may support Bluetooth interface which includes receiver 2540 coupled to receive antenna 2541, via which the UE may receive wireless signals from communications devices, e.g., APs, and transmitter 2542 coupled to transmit antenna 2543 via which the UE may transmit wireless signals to communications devices, e.g., APs.

Memory 2512 includes routines 2528 and data/information 2517. Routines 2528 include assembly of modules 2515, e.g., an assembly of software modules. Data/information 2517 may include configuration information as well as any additional information required for normal operations of UE 2500.

Figure 23:
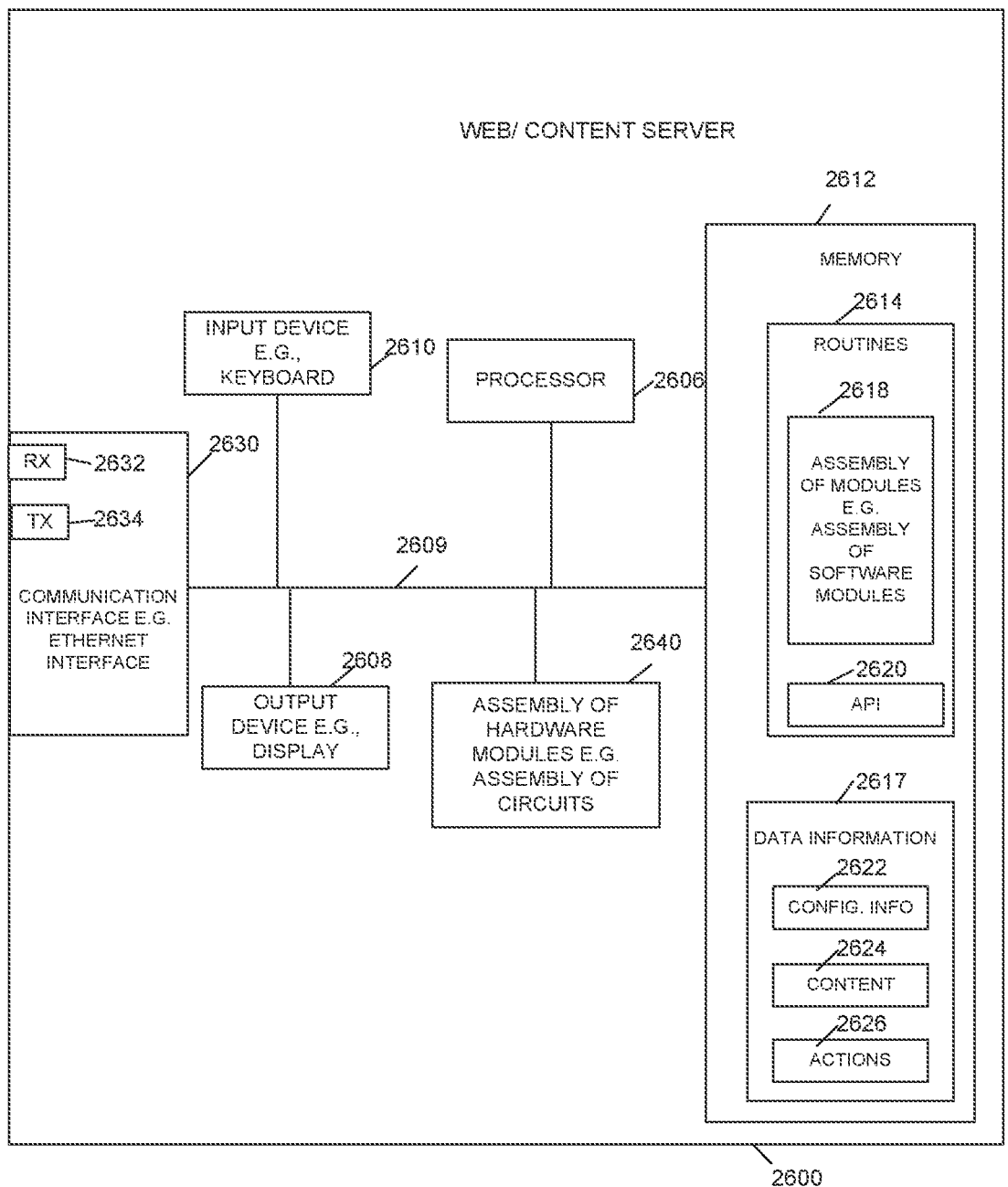
FIG. 23 is a block diagram illustrating a node of a network server such as a web/content server.

FIG. 23 is a drawing of an exemplary web/content server, 2600, in accordance with an exemplary embodiment. In some embodiments, web/content system 2600 of FIG. 23 is web/content system, 2160, of FIG. 17. Web/content system 2600 includes a communications interface 2630, e.g., an Ethernet interface, a processor 2606, an output device 2608, e.g., display, printer, etc., an input device 2610, e.g., keyboard, keypad, touch screen, mouse, etc., a memory 2612 and an assembly of modules 2640, e.g., assembly of hardware module, e.g., assembly of circuits, coupled together via a bus 2609 over which the various elements may interchange data and information.

Communications interface 2630 couples the web/content server 2600 to a network and/or the Internet such as network 2170 of FIG. 17.

Communications interface 2630 includes a receiver 2632 via which the web/content server can receive control information, e.g., instructions regarding which content should be presented on the various display screens DISP1, 2261, DISP2, 2262, DISP3, 2263, DISP4, 2264, DISP5, 2265, DISP6, 2266, DISP7, 2267, and DISP8, 2268 of FIG. 18. Communications interface 2430 includes also a transmitter 2434 via which the web/content server renders a content to each one of the displays in the various zones.

Memory 2612 includes routines 2614 and data/information/content 2617. Routines 2614 include assembly of modules 2618, e.g., an assembly of software modules, and Application Programming Interface (API) 2620. Data/information/content 2617 includes configuration information 2622, content 2624, and collection of actions, 2626, to be taken based on the instructions from the resource management server 2145.

Figure 24:
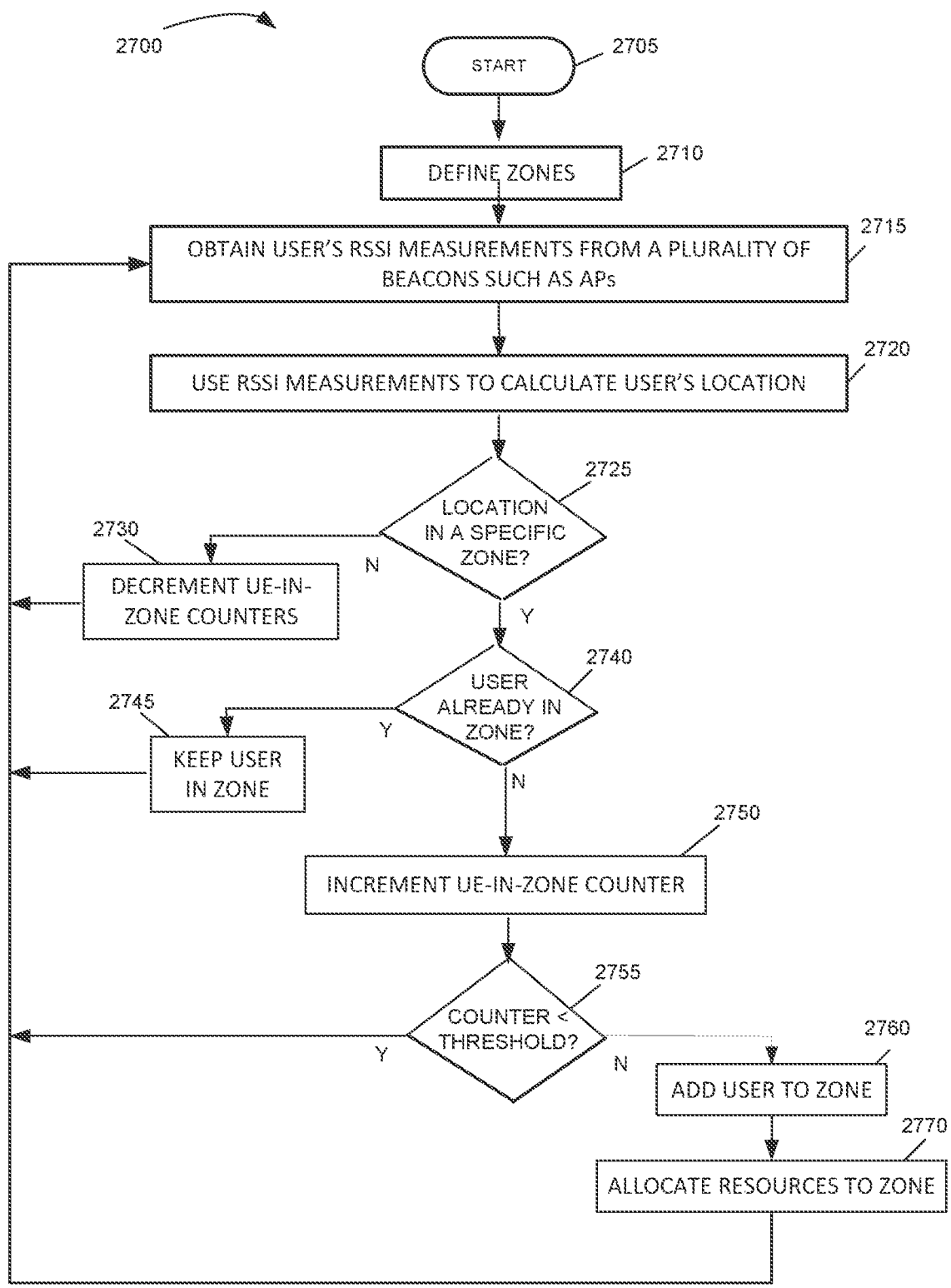
FIG. 24 is a flowchart illustrating an embodiment of a process for determining an event of UE entering a zone.

FIG. 24 is a flowchart illustrating an embodiment of process 2700 wherein it is assumed that at least one UE is not marked as being in a zone. The method described a process by which the location management system determines if a UE should be marked as being in a specific zone. The process starts at operation 2705 and proceeds to operation 2710 where the system administrator defines the boundaries of zones. The administrator may do that by entering the coordinates of each zone, determine the shape of each zone and enter the parameters of the shape, e.g., the enter the X,Y coordinates of a polygon, or draw the shape of each zone on a computer screen, etc. Alternatively, the boundaries of each zone may be programmed into the system.

The process proceeds to operation 2715 where each UE receives radio signals from plurality of beacons such as access points AP1, 2131, through AP X, 2135, of FIG. 17, measures the RSSI of each one of the received signals, and forwards it via the associated AP to the location management system, 2140, of FIG. 17. In accordance with an alternate embodiment, multiple APs such as AP1, 2131, through AP X, 2135, of FIG. 17, measure the RSSI they receive from each one of the user equipment UE1, 2151, through UE z, 2155, and forward it to the location management system, 2140, of FIG. 17.

In either case, the method proceeds to operation 2720 where the location management system, 2140, of FIG. 17, uses the RSSI signals to estimate the X, Y, coordinates of each UE. The method then proceeds to operation 2725 where the system examines the X, Y, coordinates and determine whether these coordinates fall within any of the zones which were defined in operation 2710. The determination is made for each zone separately and the process from this operation forward is repeated for each one of the predetermined zones.

If the calculated X, Y, coordinates of a UE do not fall within the predefined zone, the method continues to operation 2730 wherein if the UE-in-zone counter for this specific zone is greater than zero, the method decrements the counter. The process then loops through all of the other zones.

Once each of the zones are examined, the process loops back to operation 2715 and awaits the next set of messages with the RSSI measurements.

However, if it is determined in operation 2725 that the X, Y coordinates of the UE fall within a specific zone, the process proceeds to operation 2740 where the method determines whether the user is already marked in that specific zone. If it is determined that the user is already marked as being in that zone, the method proceeds to operation 2745 where it maintains the user as being in that zone. The method loops to operation 2725 (not shown) and examines if the user should be marked also as being in other zones. Once all of the zones were examined, the process loops back to operation 2715 and awaits the next set of messages with the RSSI measurements.

However if in operation 2740 the method determines that the UE is not yet marked as being in the specific zone, the method proceeds to operation 2750 where the UE-in-zone counter for this UE and specific zone is incremented.

The method proceeds to operation 2755 where the UE-in-zone counter is compared against a predetermined threshold. If the UE-in-zone counter is smaller than the threshold, the method loops to operation 2725, not shown, and examines if the user should be marked also as being in other zones. Once all of the zones were examined, the process loops back to operation 2715 and awaits the next set of messages with the RSSI measurements.

However, if in operation 2755 it is determined that the UE-in-zone counter is equal to the threshold or greater than the threshold, the method moves to operation 2760 where the user is marked as being in the specific zone. As part of adding a user to a zone the number of UEs in that specific zone is incremented and the updated count of users in that zone is provided to the resource management system, 2145, of FIG. 17. The resource management uses its internal policies to determine if an action should be taken to modify the resource allocation in the overall system.

The method then proceeds to operation 2770 wherein the resource allocation management system, 2145, of FIG. 17 determines if the new count of UEs in specific zone necessitates any changes in the allocation of the overall system resources. For example, the system may determine if the new change in population distribution requires changing of advertisements that are being rendered or about to be rendered to a specific display.

The method loops to operation 2725, not shown, and examines if the user should be marked also as being in other zones. Once all of the zones were examined, the process loops back to operation 2715 and awaits the next set of messages with the RSSI measurements.

Figure 25:
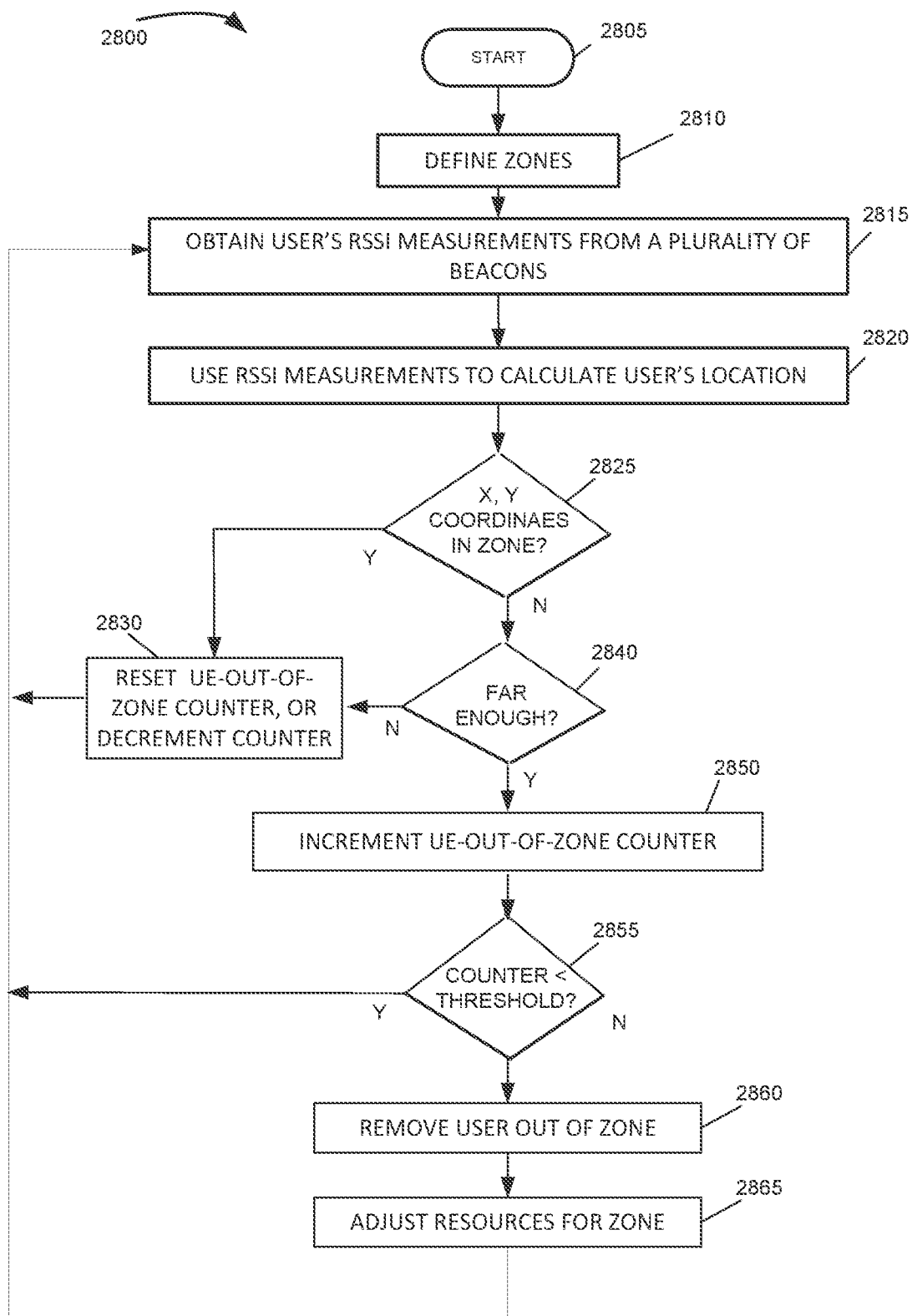
FIG. 25 is a flowchart illustrating an embodiment of a process for determining an event of UE leaving a zone.

FIG. 25 is a flowchart illustrating an embodiment of process 2800 wherein it is assumed that the UE has been marked as being in at least one specific zone. The process describes a method by which the location management system determines if a UE should be removed from being marked in a specific zone, or alternatively, be marked as not being in the specific zone. The method starts in operation 2805 and proceeds to operation 2810 wherein the system administrator defines the boundaries of zones. This operation is similar to operation 2710 of process 2700, and in accordance with one embodiment, operations 2710 and operation 2810 are the same process that can be performed at different times or at the same time. The method proceeds to operation 2815 which may be the same process as described in operation 2715 of FIG. 24, and similarly the process continues to operation 2820.

The method then proceeds to operation 2820 which is identical to operation 2720 wherein the system determines the X, Y, coordinates of the UE based on the RSSI signals as explained above. In operation 2825 the method examines whether the X, Y coordinates of the UE are within the boundaries of any specific zone. The process of operation 2825 is performed for each one of the specific zones for which the UE was marked as being in that zone.

If operation 2825 determines that the user is still in the zone, the process moves to operation 2830 where the UE-out-of-zone counter is reset to zero. In accordance with another embodiment, the UE-out-of-zone counter, if it is greater than zero, is just decremented rather than reset to zero. The process then loops back to operation 2825, not shown, and the same examination is performed for all the zones in which the UE was marked as being in that zone. When all of the zones were examined, the process loops back to operation 2815 where the system obtains new RSSI information and the process repeats.

However, if in operation 2825 it is determined that the X, Y coordinates are out of the specific zone, the method proceeds to operation 2840 wherein the system determines whether the UE is far enough from the sais zone. Specifically, as explained above the system administrator configures a distance D which is a required distance away from a zone that a UE needs to be in order to trigger an out of zone event. Alternatively, the distance D can be a preprogramed parameter of the system. In accordance with one specific embodiment, the method draws a circle of radios D around the X, Y coordinates of the UE (which were calculated in operation 2820). The operation determines that the UE is farther than D from a zone if the circle of radius D is not overlapping with the said zone.

If in operation 2840 it is determined that the UE is not far enough, the process continues to operation 2830. However, if operation 2840 determines that the UE is out of the zone at least a distance of D, the process proceeds to operation 2850 where the UE-out-of-zone counter is increased.

The process proceeds to operation 2855 where the method examines whether the UE-out-of-zone counter is greater than a predetermined second threshold. If it is determined that the UE-out-of-zone counter is equal to or greater than a predetermined second threshold, the method proceeds to operation 2860 where the UE is marked as being out of the specific zone and all of the corresponding counters are adjusted accordingly. Specifically, the number of UEs in the zone is decremented, and the new count is reported to the resource management system, 2145 of FIG. 17.

The process proceeds to operation 2865 where the resource management system may examines the new distribution of UEs in the various zones and may reduce or vary the resources assigned to the specific zone.

The process then loops back to operation 2825, not shown, and the same examination is performed for all the zones in which the UE was marked as being in that zone. When all of the zones were examined, the process loops back to operation 2815 where the system obtains new RSSI information and the process repeats.

Similarly, if in operation 2855 the method determines that the UE-out-of-zone counter is smaller than a predetermined second threshold, the method loops back to operation 2825, not shown, and the same examination is performed for all the zones in which the UE was marked as being in that zone. When all of the zones were examined, the process loops back to operation 2815 where the system obtains new RSSI information and the process repeats.

Figure 26:
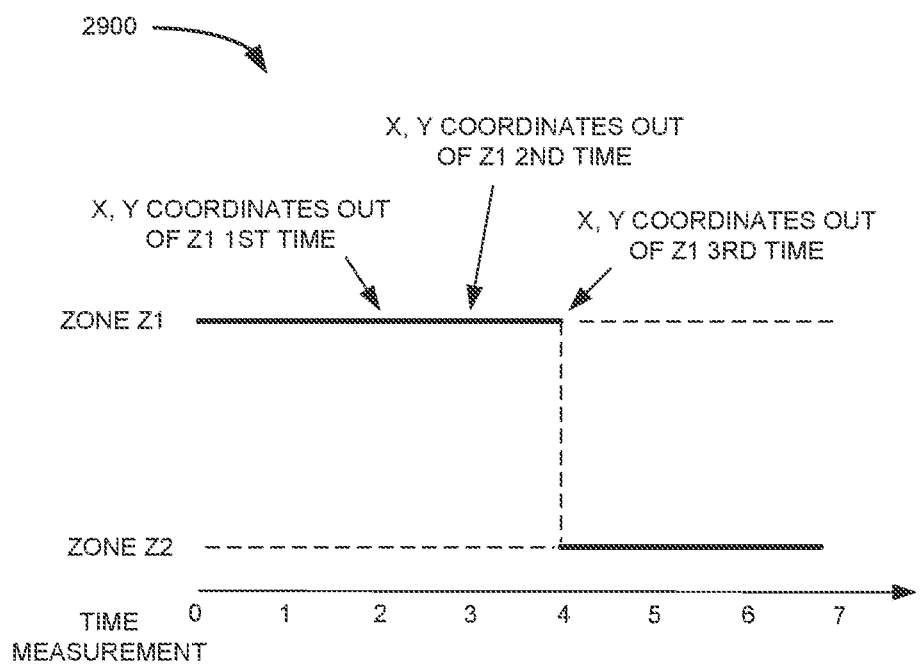
FIG. 26 illustrates a transition of a UE between zones when T1=T2.
Figure 27:
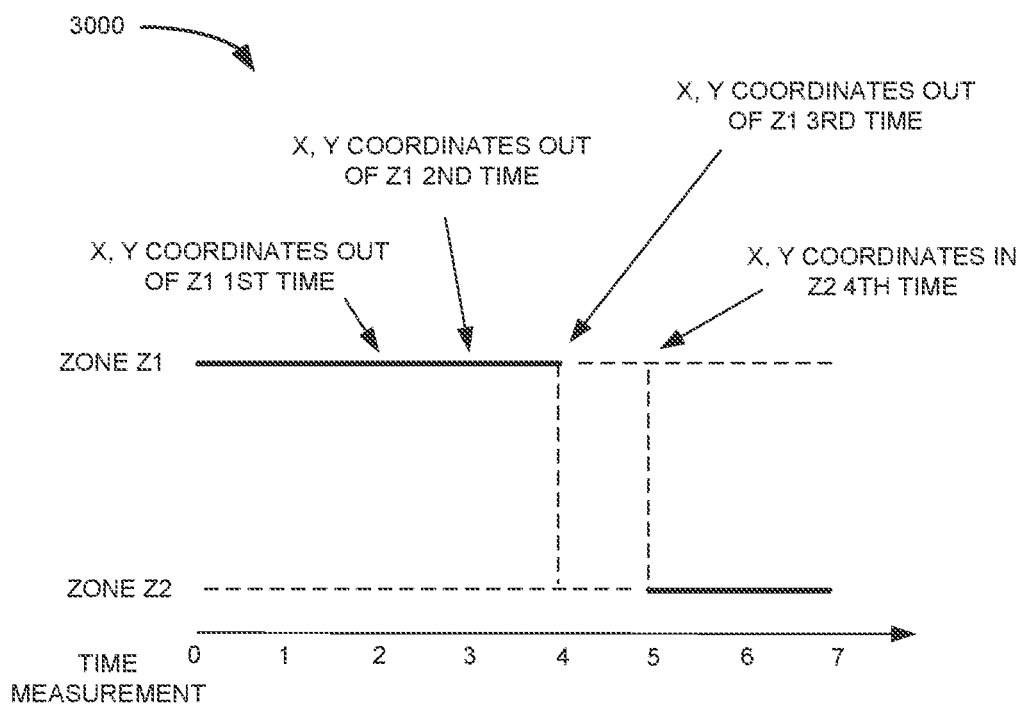
FIG. 27 illustrates a transition of a UE between zones when T1>T2.
Figure 28:
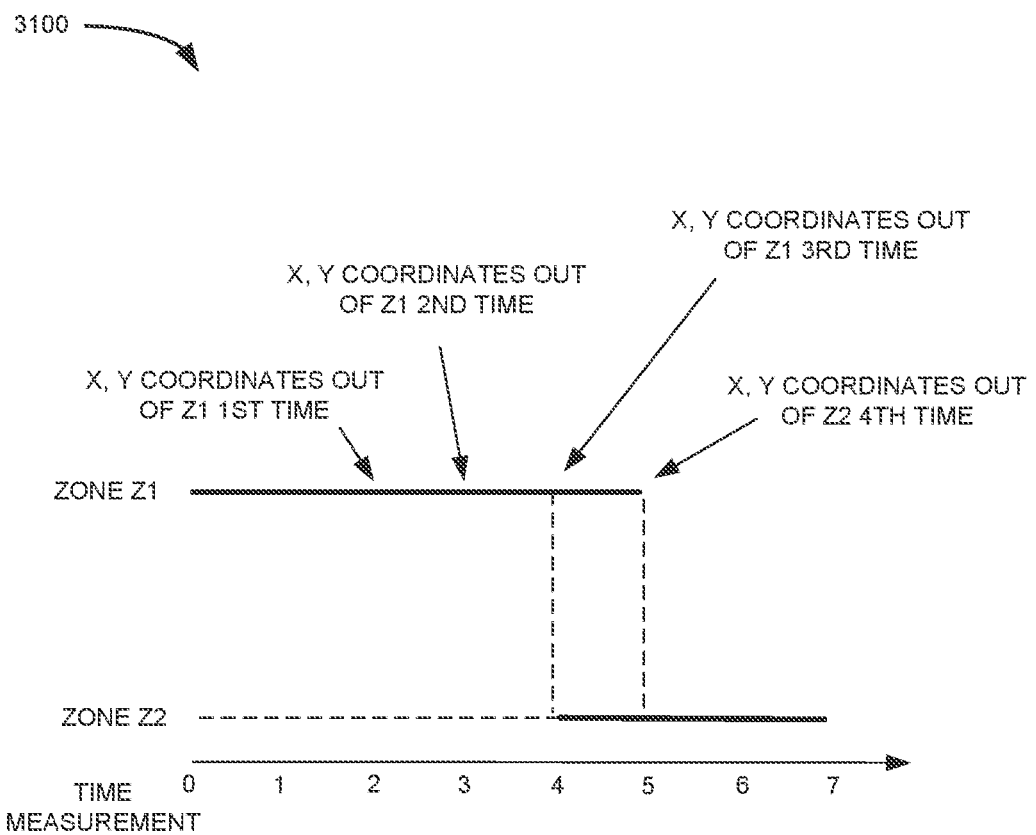
FIG. 28 illustrates a transition of a UE between zones when T1<T2.

FIGS. 26, 27, and 28 illustrate an example of marking a UE as being in a specific zone. More specifically, the FIGS. 26, 27 and 28 illustrate the functionality of the thresholds T1 and T2 on marking a UE as transitioning between zones (exit event from one zone and entry event into another zone). For sake of simplicity we assume that the distance D of FIG. 25 is set to zero, the two zones, Z1 and Z2 are adjacent, and a UE is moving from zone Z1 to zone Z2.

Example 1

Referring to drawing 2900 of FIG. 26, the first example examines the behavior of the location management system, 2140, when the system administrator sets T1 to be equal to T2 (e.g., T1=T2=3). At times 0 and 1 it is assumed the UE has been marked as being in zone Z1. At time 2 the location management system identifies that the X, Y coordinates of the UE are out of zone Z1 and in zone Z2. The location management system updates the UE-out-of-zone counter for the UE and zone Z1 to 1, and the UE-in-zone counter for the UE and zone 2 to 1. At time 3 the location management system identifies again that the X, Y coordinates of the UE are out of zone Z1 and in zone Z2. The location management system updates the UE-out-of-zone counter for the UE and zone Z1 to 2, and the UE-in-zone counter for the UE and zone 2 to 2. At time 4 the location management system identifies again that the X, Y coordinates of the UE are out of zone Z1 and in zone Z2. The location management system updates the UE-out-of-zone counter for the UE and zone Z1 to 3, and the UE-in-zone counter for the UE and zone 2 to 3. At this time since the counters are equal to their respective threshold, T1=T2=3, the UE is identified as being 3 consecutive times out of zone Z1, as well as being 3 consecutive times in zone Z2. Therefore, at time 4, as soon as the UE leaves zone 1 it is immediately marked as being in zone 2.

Example 2

Referring to drawing 3000 of FIG. 27 the second example examines the behavior of the location management system, 2140, when the system administrator sets T1 to be greater than T2, (e.g., T1=4 and T2=3). At times 0 and 1 it is assumed the UE has been marked as being in zone Z1. At time 2 the location management system identifies that the X, Y coordinates of the UE are out of zone Z1 and in zone Z2. The location management system updates the UE-out-of-zone counter for the UE and zone Z1 to 1, and the UE-in-zone counter for the UE and zone 2 to 1. At time 3 the location management system identifies again that the X, Y coordinates of the UE are out of zone Z1 and in zone Z2. The location management system updates the UE-out-of-zone counter for the UE and zone Z1 to 2, and the UE-in-zone counter for the UE and zone 2 to 2. At time 4 the location management system identifies again that the X, Y coordinates of the UE are out of zone Z1 and in zone Z2. The location management system updates the UE-out-of-zone counter for the UE and zone Z1 to 3, and the UE-in-zone counter for the UE and zone 2 to 3. At this time since the UE-out-of-zone counter for the UE and zone Z1 is equal to the threshold T2=3, the UE is marked as being out of zone Z1. However since the UE-in-zone counter for the UE and zone Z2 are still smaller than the value f the threshold T1=4, the UE is not marked yet as being in zone Z2. At time 5 the location management system identifies again that the X, Y coordinates of the UE are out of zone Z1 and in zone Z2. Since the UE is marked as being out of zone Z1, the location management system does not need to update the UE-out-of-zone counter for the UE and zone Z1. However the UE-in-zone counter for the UE and zone 2 is updated to 4. At this time since the UE-in-zone counter for the UE and zone Z2 is equal to the threshold, T1=4, the UE is marked as being in zone Z2 at time 5.

Example 3

Referring to drawing 3100 of FIG. 28 the third example examines the behavior of the location management system, 2140, when the system administrator sets T1 to be smaller than T2, (e.g., T1=3 and T2=4). At times 0 and 1 it is assumed the UE has been marked as being in zone Z1. At time 2 the location management system identifies that the X, Y coordinates of the UE are out of zone Z1 and in zone Z2. The location management system updates the UE-out-of-zone counter for the UE and zone Z1 to 1, and the UE-in-zone counter for the UE and zone 2 to 1. At time 3 the location management system identifies again that the X, Y coordinates of the UE are out of zone Z1 and in zone Z2. The location management system updates the UE-out-of-zone counter for the UE and zone Z1 to 2, and the UE-in-zone counter for the UE and zone 2 to 2. At time 4 the location management system identifies again that the X, Y coordinates of the UE are out of zone Z1 and in zone Z2. The location management system updates the UE-out-of-zone counter for the UE and zone Z1 to 3, and the UE-in-zone counter for the UE and zone 2 to 3. At this time since the UE-out-of-zone counter for the UE and zone Z1 is smaller than the threshold T2=4, the UE is kept marked as being in zone Z1. However since the UE-in-zone counter for the UE and zone Z2 are equal to the value f the threshold T1=3, the UE is marked as being in zone Z2. At this time the UE is marked as being simultaneously in both zones 1 and 2. At time 5 the location management system identifies again that the X, Y coordinates of the UE are out of zone Z1 and in zone Z2. The system updates the UE-out-of zone for the UE and zone Z1 to 4. Since the UE is already marked as being in zone Z2, there is no need to update its UE-in-zone counter for zone Z2. Since the UE-out-of-zone for the UE and zone Z1 equals the threshold T2=4, the system marks the UE as exiting out of zone Z1. Consequently, between times 4 and 5 the UE is marked as simultaneously being in both zones Z1 and Z2.

Figure 29:
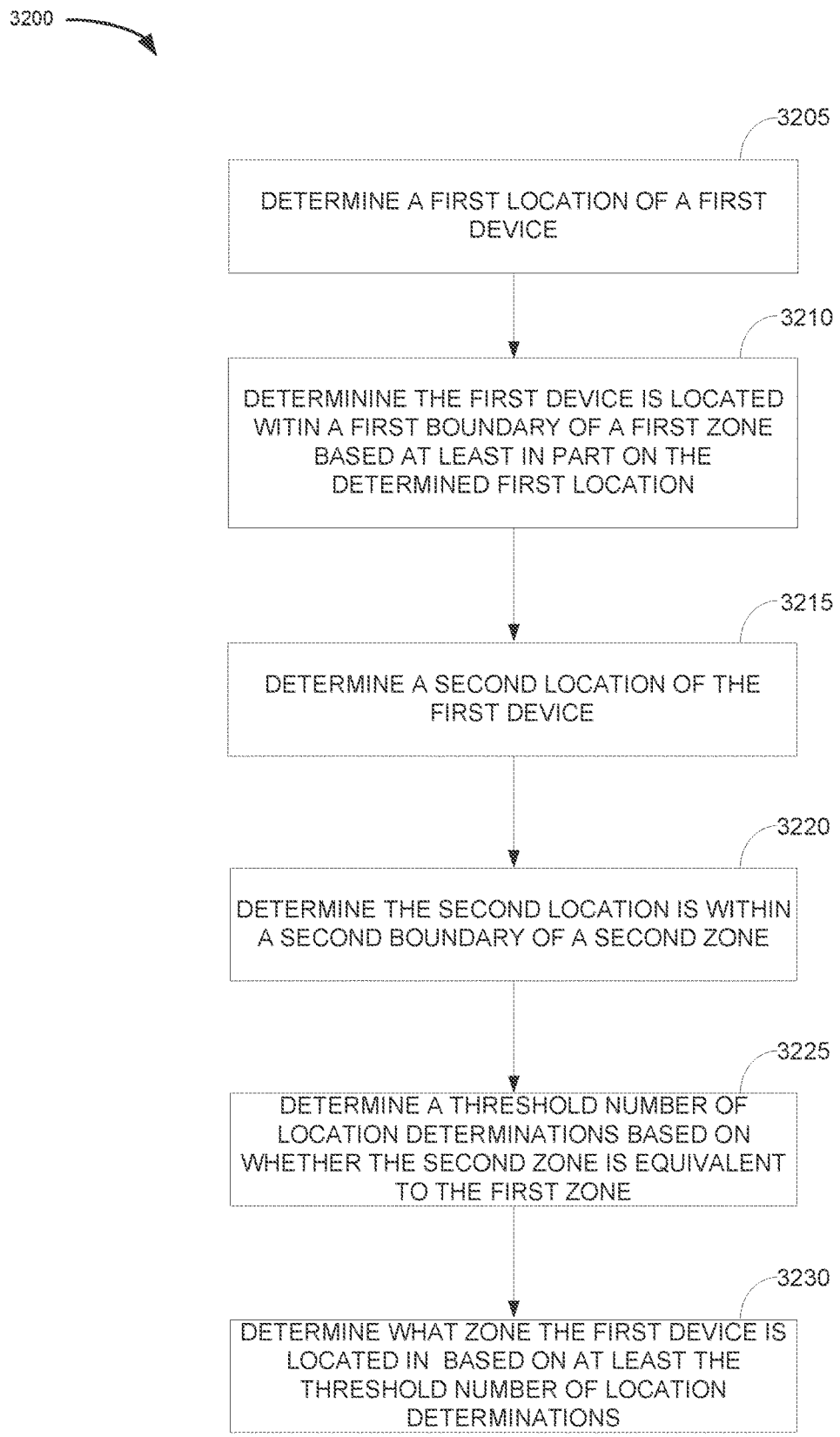
FIG. 29 is a flowchart of a process for determining in which zone a UE is located.

FIG. 29 is a flowchart 3200 of one example process for determining a location of a UE. In some aspects, one or more of the functions discussed below with respect to FIG. 29 is performed by hardware processing circuitry. In some embodiments, one or more electronic memories (e.g. 920) store instructions (e.g. 922) that when executed configure hardware processing circuitry (e.g. 904) to perform one or more of the functions discussed below with respect to FIG. 29.

In operation 3205, a first location of a first device is determined. In some embodiments, the first location is determined based on a plurality of RSSI measurements. The RSSI measurements are either received by or from the first device. For example, as discussed above, in some embodiments, a UE reports RSSI information for a plurality of access points. An estimate of the UE's location is then determined based on the RSSI information and position information for each of the plurality of APs. In some embodiments, a plurality of APs determines RSSI information for signals received from the UE. This information is then used to determine a position estimate or location for the UE based on the RSSI information and position information for each of the plurality of APs. As discussed with respect to FIG. 29, a location determination determines a single position estimate. Multiple position estimates may be needed to conclude that the first device is in a particular zone, as discussed further below.

Operation 3210 determines the first device is located within a first boundary of a first zone based at least in part on the determined first location. As discussed above, some of the disclosed embodiments define regions or zones of a particular area, such as a building, store, or other geographic area. In some aspects, operation 3210 performs multiple location determinations over a period of time. When a number of consecutive determinations indicate locations within the first zone, operation 3210 determines the first device is located within the first zone.

In operation 3215, a second location of the first device is determined. For example, similar to the location determination discussed above with respect to operation 3205, operation 3215 may include receiving RSSI information for signals transmitted by and/or received by the first device. The signals are exchanged between the first device and a plurality of access points. Based on the RSSI information and position information for the plurality of access points, an estimate of a position of the first device is determined (e.g. the second location). For example, the RSSI information is used, in some embodiments, to determine a distance between the first device and each of the plurality of access points. Then, using triangulation, an estimate of the first device's position is determined based on the distances.

In operation 3220, a determination is made that the second location is within a second boundary of a second zone. In operation 3225, a threshold number of location indications is defined. The threshold number is defined based on whether the second zone is equivalent to the first zone. In other words, as discussed above, some of the disclosed embodiments require a larger number of location determinations be made before concluding that the first device has moved to a different zone. In contrast, if location determinations indicate the first device is remaining within an equivalent zone (e.g. no change of zones is detected), such a conclusion can be supported via a smaller number of location determinations or position estimates.

In operation 3230, a determination of what zone the first device is located in is made. The determination is based on at least the threshold number of location determinations. For example, if at least the threshold number of location indications (e.g. position estimates based on RSSI information) within a time period or the threshold number of contiguous location indications indicate a single zone, then the process 3200 concludes or determines that the first device is within that single zone. Operation 3230 may include writing a result of the determination to a storage, such as a database, hard disk, or other stable storage. The determination of which zone the first device is in may be used, as disclosed above, for a variety of purposes, such as providing services and/or control operations. As discussed above, some embodiments may control the opening and/or closing or locking of doors based on presence or absence of devices within a threshold distance of the door.

As discussed above, some embodiments determine whether a device's location is within a zone entry region. If a location or position estimate of a device indicates the device is within a zone entry region, and the position estimate of the device indicates a new zone, then a fewer number of position estimates is needed to conclude the first device is within the new zone. In contrast, in these embodiments, if position estimates of the first device indicate the device has moved into a new zone, but the initial position estimates of the new zone are not for a portion of the new zone that corresponds to an entry region of the new zone, then a higher number of position estimates or location determinations is necessary to conclude the first device has transitioned to the new zone.

In some embodiments, the location of zone entry regions are statically defined. In other embodiments, zone entry regions are dynamically defined. For example, some of the disclosed embodiments identify position estimates within a first zone, and then identify a first portion (in time) of those position estimates or locations. The first portion can be of varying size depending on embodiment. These embodiments recognize that the first portion of position estimates when a device enters a new zone can be indicative of an entry region (e.g. doorway) for the first zone. If a threshold number of position estimates indicate the device is in the first zone, then a first portion of those position estimates are used to define an entry region for the zone.

Figure 30:
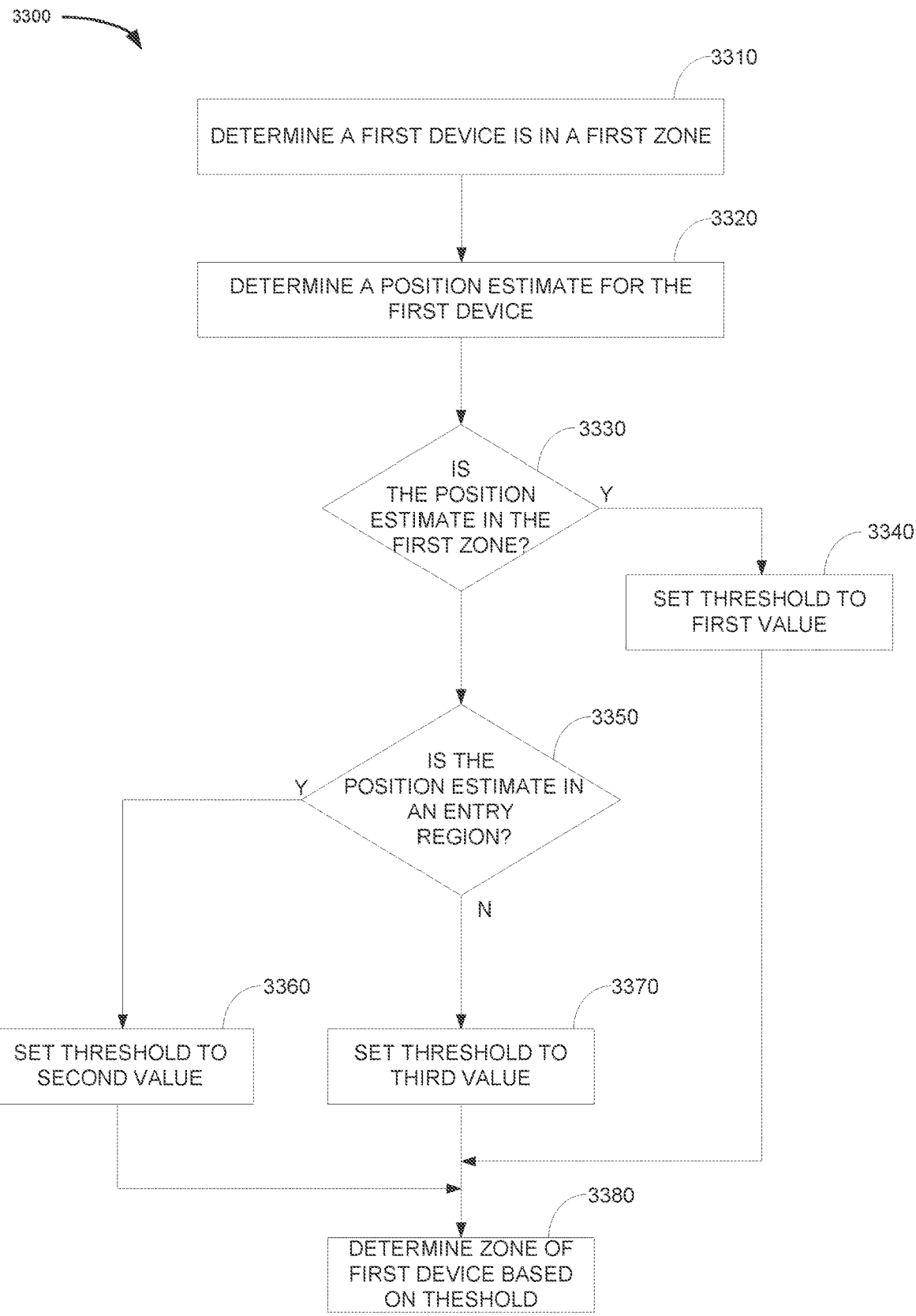
FIG. 30 is a flowchart for determining a location of a UE.

FIG. 30 is a flowchart 3300 of one example process for determining a location of a UE. In some aspects, one or more of the functions discussed below with respect to FIG. 30 are performed by hardware processing circuitry. In some embodiments, one or more electronic memories (e.g. 920) store instructions (e.g. 922) that when executed configure hardware processing circuitry (e.g. 904) to perform one or more of the functions discussed below with respect to FIG. 30.

In operation 3310, a determination is made that a first device is in a first zone. As discussed above, one or more position estimates for a UE are determined via RSSI measurements values for signals received by and/or from the UE. The RSSI measurements, along with transmit power indications, define a distance between a transmitting device and receiving device. The distances are derived from the RSSI measurements. Triangulation is used in some embodiments to determine a position estimate for the UE based on its estimated distance from each of a plurality of access points. As discussed above, some of the disclosed embodiments define boundaries for regions or zones. The disclosed embodiments define criterion for determining when a particular device is present in a particular zone. As discussed above, a threshold number of position estimates within a zone are needed, at least in some embodiments, before the disclosed embodiments determine a device is within a zone. Operation 3310 determines, via position estimates for the first device, that the first device is located within a first zone.

In operation 3320, a position estimate for the first device is determined. As discussed above, the position estimate is determined, in at least some embodiments, via RSSI measurements for signals received from and/or transmitted by the first device.

Decision operation 3330 determines whether the position estimate places the first device within the first zone (e.g. the zone the first device has most recently been determined to be in via operation 3310). If the position estimate indicates the same zone as a current or most recent zone determination for the first device, process 3300 moves from decision operation 3330 to operation 3340, which sets a threshold to a first value. Otherwise, if the position estimate indicates a different zone, process 3300 moves from decision operation 3330 to decision operation 3350, which determines whether the position estimate indicates the first device is within an entry region of a second zone (different from the first zone). If the position estimate does indicate an entry region, process 3300 moves from decision operation 3350 to operation 3360, which sets the threshold to a second value. Process continues to step 3380. Otherwise, if the position estimate does not indicate an entry region, but still does indicate a second zone different from the first zone, then process 3300 moves from decision operation 3350 to operation 3370, which sets the threshold to a third value. In some embodiments, the first value is smaller than both the second value and third values. In some embodiments, the second value is smaller than the third value. Process 3300 then moves to operation 3380, which determines a zone of the first device based on the determined threshold. The threshold defines a number of contiguous position estimates that are required to determine the first device is in a particular zone. Thus, for example, if the threshold is three (3), then three contiguous position estimates must indicate the device is within a particular zone. When that criterion is met, the disclosed embodiments record a determination that the first device is within that particular single zone. If any of the three position estimates indicate a different zone, then no zone determination can be made, and additional position estimates will be needed before a zone determination is made.

The techniques of various embodiments may be implemented using software, hardware and/or a combination of software and hardware. Various embodiments are directed to apparatus, e.g., management entities, e.g., a location/zone tracking server, a network monitoring node, routers, gateways, access points, DHCP servers, DNS servers, AAA servers, user equipment devices, e.g., wireless nodes such as mobile wireless terminals, base stations, communications networks, communications systems. Various embodiments are also directed to methods, e.g., method of controlling and/or operating a communications device or devices, e.g., a location/zone tracking server, a network management node, an access point, wireless terminals (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the disclosure.

In some embodiments, the processor or processors, e.g., CPUs, of one or more devices, e.g., communications devices such as network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., a network management device such as a server, e.g., a location/zone tracking server, an access point, a user equipment, etc., with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node such as a server, e.g. a location/zone tracking server, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including cellular, WiFi, Bluetooth and BLE, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), WiFi, Bluetooth, BLE, and/ or various other types of communications techniques which may be used to provide wireless communications links between access nodes and wireless nodes. In some embodiments the access nodes are implemented as base stations which establish communications links with user equipment devices, e.g., mobile nodes, using WiFi, Bluetooth, BLE, OFDM and/or CDMA. In various embodiments the wireless nodes are implemented as notebook computers, personal data assistants (PDAs), or other portable devices including receiver/transmitter circuits and logic and/or routines, for implementing the methods.

Example 1 is a method, comprising: receiving, by a wireless terminal location tracking server, received signal strength indication (RSSI) measurement values for a first wireless terminal from an access point, determining, by the wireless terminal tracking server, a first location of the first wireless terminal based on the RSSI measurement values; determining, by the wireless terminal tracking server, the first wireless terminal is located within a first boundary of a first zone based at least in part on the determined first location; determining, by the wireless terminal tracking server, a second location of the first wireless terminal that is different from the first location; determining, by the wireless terminal tracking server, the second location is within a second boundary of a second zone; determining, by the wireless terminal tracking server, a threshold number of location determinations based on whether the second zone is equivalent to the first zone; and determining, by the wireless terminal tracking server, whether the first wireless terminal is within the second boundary of the second zone based on at least the threshold number of location indications.

In Example 2, the subject matter of Example 1 optionally includes wherein the determining of the threshold number of location determinations determines a first threshold number in response to the first zone being equivalent to the second zone or a larger second threshold number otherwise.

In Example 3, the subject matter of Example 2 optionally includes determining whether the second location indicates the first wireless terminal is within an entry region of the second zone, and determining the second threshold number to be a first value in response to the second location indicating the first wireless terminal is within an entry region and a second larger value otherwise.

In Example 4, the subject matter of Example 3 optionally includes determining a number of consecutive location determinations that indicate the first wireless terminal is within the boundaries of the second zone, wherein the determination of whether the second location indicates the first wireless terminal is within an entry region of the second zone is based on the number.

In Example 5, the subject matter of Example 4 optionally includes wherein the determination of whether the second location indicates the first wireless terminal is within an entry region of the second zone is in response to the number being below a predetermined threshold.

In Example 6, the subject matter of Example 5 optionally includes wherein the determination that the first wireless terminal is in the first zone comprises determining a number of location determinations indicating the first wireless terminal is in the first zone is above a threshold.

In Example 7, the subject matter of Example 6 optionally includes identifying a first set of location determinations of the number of location determinations that indicate the first wireless terminal is in the first zone, the first set of location determinations determined before other location indications of the number of location determinations; and defining an entry region of the first zone based on the first set of location determinations.

In Example 8, the subject matter of Example 7 optionally includes determining whether location determinations for a second wireless terminal are within the defined entry region; setting a threshold based on the determining; and determining if the second wireless terminal is within the first zone based on the threshold.

In Example 9, the subject matter of any one or more of Examples 1-8 optionally include receiving second RSSI measurements of signals generated or received by the first wireless terminal, wherein the determination of the second location is based on the RSSI measurements.

Example 10 is a wireless terminal tracking system, comprising: hardware processing circuitry; one or more memories storing instructions that when executed configure the hardware processing circuitry to perform operations comprising: receiving, by a wireless terminal location tracking server, received signal strength indication (RSSI) measurement values for a first wireless terminal from an access point, determining, by the wireless terminal tracking server, a first location of the first wireless terminal based on the RSSI measurement values; determining, by the wireless terminal tracking server, the first wireless terminal is located within a first boundary of a first zone based at least in part on the determined first location; determining, by the wireless terminal tracking server, a second location of the first wireless terminal that is different from the first location; determining, by the wireless terminal tracking server, the second location is within a second boundary of a second zone; determining, by the wireless terminal tracking server, a threshold number of location determinations based on whether the second zone is equivalent to the first zone; and determining, by the wireless terminal tracking server, whether the first wireless terminal is within the second boundary of the second zone based on at least the threshold number of location indications.

In Example 11, the subject matter of Example 10 optionally includes wherein the determining of the threshold number of location determinations determines a first threshold number in response to the first zone being equivalent to the second zone or a larger second threshold number otherwise.

In Example 12, the subject matter of Example 11 optionally includes the operations further comprising determining whether the second location indicates the first wireless terminal is within an entry region of the second zone, and determining the second threshold number to be a first value in response to the second location indicating the first wireless terminal is within an entry region and a second larger value otherwise.

In Example 13, the subject matter of Example 12 optionally includes the operations further comprising determining a number of consecutive location determinations that indicate the first wireless terminal is within the boundaries of the second zone, wherein the determination of whether the second location indicates the first wireless terminal is within an entry region of the second zone is based on the number.

In Example 14, the subject matter of Example 13 optionally includes wherein the determination of whether the second location indicates the first wireless terminal is within an entry region of the second zone is in response to the number being below a predetermined threshold.

In Example 15, the subject matter of Example 14 optionally includes wherein the determination that the first wireless terminal is in the first zone comprises determining a number of location determinations indicating the first wireless terminal is in the first zone is above a threshold.

In Example 16, the subject matter of Example 15 optionally includes the operations further comprising: identifying a first set of location determinations of the number of location determinations that indicate the first wireless terminal is in the first zone, the first set of location determinations determined before other location indications of the number of location determinations; and defining an entry region of the first zone based on the first set of location determinations.

In Example 17, the subject matter of Example 16 optionally includes the operations further comprising determining whether location determinations for a second wireless terminal are within the defined entry region; setting a threshold based on the determining; and determining if the second wireless terminal is within the first zone based on the threshold.

In Example 18, the subject matter of any one or more of Examples 10-17 optionally include the operations further comprising receiving second RSSI measurements of signals generated or received by the first wireless terminal, wherein the determination of the second location is based on the RSSI measurements.

Example 19 is a non-transitory computer readable storage medium comprising instructions that when executed configure hardware processing circuitry to perform operations comprising: receiving, by a wireless terminal location tracking server, received signal strength indication (RSSI) measurement values for a first wireless terminal from an access point, determining, by the wireless terminal tracking server, a first location of the first wireless terminal based on the RSSI measurement values; determining, by the wireless terminal tracking server, the first wireless terminal is located within a first boundary of a first zone based at least in part on the determined first location; determining, by the wireless terminal tracking server, a second location of the first wireless terminal that is different from the first location; determining, by the wireless terminal tracking server, the second location is within a second boundary of a second zone; determining, by the wireless terminal tracking server, a threshold number of location determinations based on whether the second zone is equivalent to the first zone; and determining, by the wireless terminal tracking server, whether the first wireless terminal is within the second boundary of the second zone based on at least the threshold number of location indications.

In Example 20, the subject matter of Example 19 optionally includes the operations further comprising determining whether the second location indicates the first wireless terminal is within an entry region of the second zone, and determining the threshold number of location determinations to be a first value in response to the second location indicating the first wireless terminal is within an entry region and a second larger value otherwise.

What is claimed is:

1. A method performed by processing circuitry, the method comprising:
based on determining that a wireless terminal is located within a first zone, determining, based on at least one first criterion, that the wireless terminal has not left the first zone;
determining, based on at least one second criterion, that the wireless terminal is located within a second zone; and
counting the wireless terminal as being located within both the first zone and the second zone for purposes on providing service to the wireless terminal.

2. The method of claim 1, wherein providing service to the wireless terminal further comprises providing one or more location services to the wireless terminal based on the determinations that the wireless terminal is located in both the first zone and the second zone.

3. The method of claim 1, wherein counting the wireless terminal as being located within both the first zone and the second zone comprises:
determining a first number of wireless terminals located within the first zone, the first number of wireless terminals including the wireless terminal; and
determining a second number of wireless terminals located within the second zone, the second number of wireless terminals including the wireless terminal.

4. The method of claim 3, wherein providing service to the wireless terminal further comprises:
allocating one or more resources to the wireless terminals included in first zone, including the wireless terminal, based on the first number of wireless terminals determined to be present in the first zone; and
allocating one or more resources to the wireless terminals included in the second zone, including the wireless terminal, based on the second number of wireless terminals determined to be present in the second zone.

5. The method of claim 1, wherein the first zone and the second zone are non-overlapping zones.

6. The method of claim 1, wherein the first zone corresponds to a first geographical zone and the second zone corresponds to a second geographical zone.

7. The method of claim 1, wherein the first zone corresponds to a first floor of a building and the second zone corresponds to a second floor of the building that is different than the first floor.

8. The method of claim 1, wherein the first zone corresponds to a first portion of a floor of a building and the second zone corresponds to a second portion of the floor of the building, wherein the second portion of the floor is different than the first portion of the floor.

9. The method of claim 1, further comprising determining, based on wireless terminal location information for the wireless terminal, a first probability that the wireless terminal is located in the first zone and a second probability that the wireless terminal is located in the second zone.

10. The method of claim 9, further comprising determining, based on the first probability or the second probability, that the wireless terminal is located in one of the first zone or the second zone.

11. The method of claim 1 further comprising:
determining, based on location information for the wireless terminal, whether the wireless terminal is located within a defined distance of the first zone; and
determining that the wireless terminal is located within the second zone when the wireless terminal is not located within the defined distance of the first zone.

12. The method of claim 1, wherein the at least one second criterion used to determine that the wireless terminal is located within the second zone is different than the at least one first criterion used to determine that the wireless terminal has not left the first zone.

13. A system, comprising:
hardware processing circuitry; and one or more memories storing instructions that when executed configure the hardware processing circuitry to:
- based on determining that a wireless terminal is located within a first zone, determine, based on at least one first criterion, that the wireless terminal has not left the first zone;
- determine, based on at least one second criterion, that the wireless terminal is located within a second zone; and
- count the wireless terminal as being located within both the first zone and the second zone for purposes on providing service to the wireless terminal.

14. The system of claim 13, wherein to provide service to the wireless terminal, the instructions configure the hardware processing circuitry to provide one or more location services to the wireless terminal based on the determinations that the wireless terminal is located in both the first zone and the second zone.

15. The system of claim 13, wherein to count the wireless terminal as being located within both the first zone and the second zone, the instructions configure the hardware processing circuitry to:
- determine a first number of wireless terminals located within the first zone, the first number of wireless terminals including the wireless terminal; and
- determine a second number of wireless terminals located within the second zone, the second number of wireless terminals including the wireless terminal.

16. The system of claim 15, wherein to provide service to the wireless terminal, the instructions configure the hardware processing circuitry to:
- allocate one or more resources to the wireless terminals included in first zone, including the wireless terminal, based on the first number of wireless terminals determined to be present in the first zone; and
- allocate one or more resources to the wireless terminals included in the second zone, including the wireless terminal, based on the second number of wireless terminals determined to be present in the second zone.

17. The system of claim 13, wherein the first zone and the second zone are non-overlapping zones.

18. The system of claim 13, wherein the instructions further configure the hardware processing circuitry to determine, based on wireless terminal location information for the wireless terminal, a first probability that the wireless terminal is located in the first zone and a second probability that the wireless terminal is located in the second zone.

19. The system of claim 13, wherein the at least one second criterion used to determine that the wireless terminal is located within the second zone is different than the at least one first criterion used to determine that the wireless terminal has not left the first zone.

20. A non-transitory computer readable storage medium comprising instructions that, when executed, cause hardware processing circuitry to:
- based on determining that a wireless terminal is located within a first zone, determine, based on at least one first criterion, that the wireless terminal has not left the first zone;
- determine, based on at least one second criterion, that the wireless terminal is located within a second zone; and
- count the wireless terminal as being located within both the first zone and the second zone for purposes on providing service to the wireless terminal.

* * * * *